US007311949B2

United States Patent
Yoshizawa et al.

(10) Patent No.: US 7,311,949 B2
(45) Date of Patent: Dec. 25, 2007

(54) COMPOSITION, OPTICAL FILM, POLARIZING PLATE AND LIQUID CRYSTAL DISPLAY

(75) Inventors: Masataka Yoshizawa, Minami-ashigara (JP); Yoshihisa Tsukada, Minami-ashigara (JP); Shinichi Morishima, Minami-ashigara (JP); Makoto Takahashi, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 218 days.

(21) Appl. No.: 10/995,217

(22) Filed: Nov. 24, 2004

(65) Prior Publication Data
US 2006/0035037 A1    Feb. 16, 2006

(30) Foreign Application Priority Data

Nov. 26, 2003  (JP)  ............................. 2003-394998
Jun. 25, 2004  (JP)  ............................. 2004-188333
Sep. 16, 2004  (JP)  ............................. 2004-270127

(51) Int. Cl.
*G02B 5/00*   (2006.01)
*G02B 5/30*   (2006.01)
*C09K 19/52*  (2006.01)

(52) U.S. Cl. .................. 428/1.1; 428/1.3; 428/1.31; 252/299.01

(58) Field of Classification Search ................. 428/1.1, 428/1.3, 1.31; 252/299.01, 299.5, 299.62
See application file for complete search history.

(56) References Cited

U.S. PATENT DOCUMENTS 5,693,253 A  * 12/1997  Ohnishi et al.  ......... 252/299.01
6,540,940 B1 *  4/2003  Negoro et al.  ......... 252/299.01
6,726,966 B2 *  4/2004  Negoro et al.  ............. 428/1.23
7,037,443 B2 *  5/2006  Shuto et al.  ........... 252/299.01

FOREIGN PATENT DOCUMENTS

JP    2001-330725   * 11/2001

OTHER PUBLICATIONS

English translation by computer for JP 2001-330725, http://www4.ipdl.ncipi.go.jp/Tokujitu/PAJdetail.ipdl?N0000=60&N0120=01&N2001=01&N3001=2001-330725.*

* cited by examiner

*Primary Examiner*—Shean C Wu
(74) *Attorney, Agent, or Firm*—Buchanan Ingersoll & Rooney PC

(57) ABSTRACT

A novel optical film is disclosed. The film comprises an optically anisotropic layer formed of a composition comprising at least one liquid crystal compound and at least one polymer having a fluoro-aliphatic group and a hydrophilic group selected from the group consisting of a carboxyl group (—COOH), a sulfo group (—SO$_3$H), a phosphono group {—PO(OH)$_2$} and salts thereof; and a substrate supporting the layer.

19 Claims, No Drawings

COMPOSITION, OPTICAL FILM, POLARIZING PLATE AND LIQUID CRYSTAL DISPLAY

TECHNICAL FIELD

The present invention relates to optical films comprising an optically anisotropic layer in which liquid crystal molecules are fixed in an alignment state, and polarizing plates and liquid crystal displays comprising the optical film. The present invention also relates to optical films excellent in capability of optically compensation, and polarizing plates and liquid crystal displays comprising the optical film. The present invention also relates to compositions useful for preparation of optical compensatory sheets or the like.

RELATED ART

Optical compensatory sheets are employed in a variety of liquid-crystal displays to eliminate image coloration and to broaden the viewing angle. Stretched birefringent films have conventionally been employed as optical compensatory sheets. Further, in recent years, instead of optical compensatory sheets formed of a stretched birefringent film, the use of optical compensatory sheets comprising an optically anisotropic layer formed of discotic liquid-crystal molecules on a transparent substrate has been proposed.

Generally, discotic liquid-crystal molecules are highly birefringent. Further, discotic liquid-crystal molecules have various orientation modes. Thus, the use of discotic liquid-crystal molecules permits the achievement of optical properties that are unachievable in conventional stretched birefringent films. An optical compensatory sheet comprising a transparent substrate and an optically anisotropic layer thereon in which liquid crystal molecules are aligned such that a tilt angle of the molecules varies along with a distance from the substrate, so called in hybrid alignment state, is useful for broadening the viewing angles of liquid crystal displays employing TN (Twisted Nematic) mode or OCB (Optically Compensatory Bend) mode. For example, an optical compensatory sheet comprising an optically anisotropic layer in which discotic liquid crystal molecules are aligned with a tilt angle from 5 to 50 degree is disclosed in U.S. Pat. No. 5,583,679 or U.S. Pat. No. 5,646,703. The optically anisotropic layer is generally produced by coating a discotic liquid-crystal composition comprising discotic liquid-crystal molecules on an alignment layer, aligning the discotic liquid-crystal molecules by heating up to a temperature exceeding the orientation temperature and fixing the aligned liquid crystal molecules.

On the other hand, it is necessary for preparing an optically anisotropic layer having desired optical characteristics to control alignment of discotic liquid crystal molecules in the layer since discotic liquid-crystal molecules have various orientation phases.

It is described in JPA No. 1999-352328 (the term "JPA" as used herein means an "unexamined published Japanese patent application (Kohkai Tokkyo Kohou)") that addition of cellulose esters of low fatty acids and either fluorine-containing surfactants or 1,3,5-triazin based compounds allows discotic liquid-crystal molecules to align in homeotropic alignment state where the mean tilt angle of molecules is not greater than 5°.

It is disclosed in JPA No. 1996-95030 that partially esterified celluloses are added to optically anisotropic layers in order to obtain a tilt angle larger than that usually found at an air interface, 50 degree.

It is disclosed in JPA No. 2001-330725 that compounds having a fluorinated-alkyl group and a hydrophilic group (sulfo group binding to a benzene ring through a linking group), are added to optically anisotropic layers in order to control a tilt angle of discotic liquid crystal molecules.

It is described in JP-A No. 2002-20363 that compounds giving an excluded volume effect are added to optically anisotropic layers in order to control alignments of liquid crystal molecules.

Under prior art, optical compensatory sheets to be used in small or middle size liquid crystal displays not greater than 15-inches have been mainly researched and developed. Recently, however, it is required to develop optical compensatory sheets to be used in bright and large size liquid crystal displays not smaller than 17-inches. When a conventional optical compensatory sheet was disposed on a polarizing plate as a protective film and the stacked product was employed in a large size liquid crystal display, uneven brightness was found on the display panel. This defect was undistinguished when the stacked product was employed in a small size or a middle size liquid crystal display. And, thus, it is required to develop optical compensatory sheets for reduction of light leakage in response to growing in seize and in brightness. It is described in JPA 1999-148080 that a composition comprising a so-called leveling agent and polymerizable liquid crystal is used in order to reduce unevenness in brightness. However, the inventors found that the composition is capable of homogenous alignment and, however, is not capable of complicated alignment such as hybrid alignment.

SUMMARY OF THE INVENTION

When the inventors actually used the known optical compensatory sheets for liquid-crystal displays, they found that some displays gave light leakage in a oblique direction or some displays were not sufficiently improved in a viewing angle, and, thus, that the compensation abilities of the known optical compensatory sheets are still not enough. One reason that sufficient optical compensation couldn't be obtained is that liquid-crystalline molecules in the optically anisotropic layer were aligned with an insufficient tilt angle. Thus, it is required to provide techniques for aligning liquid-crystalline molecules with a sufficient tilt angle. On the other hand, a hybrid-alignment in monodomain phase can be achieved by aligning a liquid-crystal composition under heating. And, therefore, when an alignment time is shortened for manufacturing efficiency, defects may be developed in the alignment easily. Thus, it is also required to provide techniques for shortening times necessary to align liquid-crystalline molecules in a monodomain phase. For example, although a high tilt angle at an air interface can be obtained when an optically anisotropic layer is produced using a composition added the partly esterified cellulose, the manufacturing efficiency may extremely lower because it takes long time to align molecules without defects due to a high viscosity of the composition. Therefore, it is strongly required to provide techniques for controlling a tilt angle at an air interface without preventing alignment defects from disappearing.

One object of the present invention is to provide a novel optical film, comprising a layer giving an optical anisotropy brought about by a hybrid alignment of liquid-crystalline molecules with an improved tilt angle, excellent in optical compensation. Especially, it is to provide an optical film and a polarizing plate, comprising an optically anisotropic layer formed of a composition comprising at least one discotic liquid-crystal compound, in which the discotic liquid-crystalline molecules are aligned in a hybrid alignment with an improved tilt angle at an air interface, capable of contributing to improving viewing angles of liquid crystal displays employing TN-mode, OCB-mode or the like. Another object of the present invention is to provide an optical film and a polarizing plate capable of contributing to displaying high-quality images without contributing unevenness in displaying. And another object of the present invention is to provide a liquid-crystal display improved in viewing-angle property.

From one aspect, the present invention provides a composition comprising at least one polymer having at least one fluoro-aliphatic group and at least one hydrophilic group selected from the group consisting of a carboxyl group (—COOH), a sulfo group (—SO$_3$H), a phosphonoxy group {—OP(=O)(OH)$_2$} and salts thereof in side chain and at least one liquid crystal compound.

As embodiments of the present invention, there are provided the composition wherein the polymer is a copolymer comprising a repeating unit derived from a monomer having at least one fluoro-aliphatic group and a repeating unit represented by a formula (1):

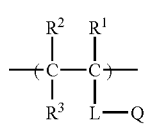

Formula (1)

wherein $R^1$, $R^2$ and $R^3$ respectively represent a hydrogen atom or a substituent; L represents a divalent linking group selected from the Linking Group shown below or a divalent linking group consisting of two or more selected from the Linking Group shown below;

(Linking Group)

a single bond, —O—, —CO—, —NR$^4$— where R$^4$ represents a hydrogen atom, an alkyl group, an aryl group or an aralkyl group), —S—, —SO$_2$—, —P(=O)(OR$^5$)— where R$^5$ represents an alkyl group, an aryl group or an aralkyl group), an alkylene group and arylene group;

Q represents a carboxyl group (—COOH) or a salt thereof, a sulfo group (—SO$_3$H) or a salt thereof or a phosphonoxy group {—OP(=O)(OH)$_2$} or a salt thereof; the composition wherein the liquid crystal compound is a discotic compound;

the composition, wherein the discotic compound is triphenylene liquid crystal; the composition wherein the polymer comprises a repeating unit derived from a monomer having a fluoro-aliphatic group in 40 wt % or more; and the composition wherein the weight-average molecular weight of the polymer is 100,000 or less.

The composition may further comprise another polymer comprising a repeating unit derived from a monomer having a fluoro-aliphatic group represented by a formula (A):

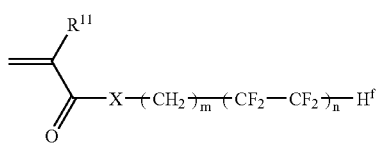

Formula (A)

wherein $R^{11}$ represents a hydrogen atom or a methyl group;

X represents an oxygen atom, a sulfur atom or —N(R$^{12}$)—, where R$^{12}$ represents a hydrogen atom or a C$_{1-4}$ alkyl group; H$^f$ represents a hydrogen atom or a fluorine atom; m is an integer from 1 to 6 and n is an integer from 2 to 4.

The another polymer may further comprise a repeating unit derived from a monomer represented by a formula (B):

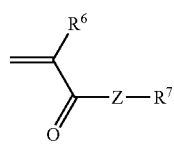

Formula (B)

Wherein $R^6$ represents a hydrogen atom or a methyl group;

Z represents a divalent linking group; $R^7$ represents an optionally substituted poly (alkyleneoxy) group or an optionally substituted linear, branched or cyclic C$_{1-20}$ alkyl group.

From another aspect, the present invention provides an optical film comprising an optically anisotropic layer formed of the composition described above.

In one embodiment, the optical film comprises an optically anisotropic layer formed of the composition comprising at least one discotic compound as a liquid crystal compound. In the optically anisotropic layer, a tilt angle θ1 of discotic compound molecules at an interface of the layer satisfies 0°≦θ1≦30° and a tilt angle θ2 of discotic compound molecules at another interface of the layer satisfies 50°≦θ2.

From another aspect, the present invention provides an optical film comprising an optically anisotropic layer formed of a composition comprising at least one liquid crystal compound and at least one polymer having a fluoro-aliphatic group and a hydrophilic group selected from the group consisting of a carboxyl group (—COOH), a sulfo group (—SO$_3$H), a phosphono group {—PO(OH)$_2$} and salts thereof; and a substrate supporting the layer.

As embodiments of the present invention, there are provided the optical film wherein the polymer has the hydrophilic group at the end of main chain, the optical film wherein the polymer was produced by polymerization initiated by a polymerization initiator having at least one hydrophilic group selected from the group consisting of a carboxyl group (—COOH), a sulfo group (—SO$_3$H), a phosphono group {—PO(OH)$_2$} and salts thereof; the optical film wherein the polymer comprises at least one repeating unit derived from a monomer represented by a formula (A1);

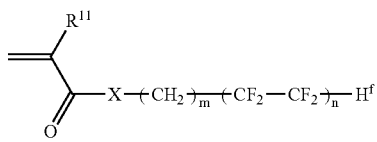

Formula (A1)

wherein $R^{11}$ represents a hydrogen atom or a methyl group;

X represents an oxygen atom, a sulfur atom or —N(R$^{12}$)—, where R$^{12}$ represents a hydrogen atom or a C$_{1-4}$ alkyl group; H$^f$ represents a hydrogen atom or a fluorine atom; m is an integer from 1 to 6 and n is an integer from 2 to 4; the optical film wherein the polymer further comprises at least one repeating unit derived from a monomer represented by a Formula (B1);

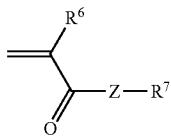

Formula (B1)

wherein R$^6$ represents a hydrogen atom or a methyl group; Z represents a divalent linking group, R$^7$ represents an optionally substituted poly (alkyleneoxy) group or an optionally substituted linear, branched or cyclic C$_{1-20}$ alkyl group; and the optical film wherein the liquid crystal compound is a discotic liquid crystal compound.

From another aspect, the present invention provides a polarizing plate comprising a polarizing film and an optical film described above; and a liquid crystal display comprising an optical film described above.

It is noted that, in the present invention, the term "hybrid alignment" is used for any alignments in which liquid-crystalline molecules are aligned with a tilt angle, or in other words an angle formed by their long axes (for example, in the cases of discotic compounds, their disc-like core) and a horizontal plane of the layer (in an embodiment comprising the optically anisotropic layer and a substrate supporting the layer, the horizontal plane is equal to a surface of the substrate), varying according to a distance from a substrate supporting the optically anisotropic layer, or in other words varying in a depth-direction. The hybrid alignment is achieved by aligning liquid-crystalline molecules in an area between two interfaces (for example, when the layer is formed on an alignment layer, one is an interface between the alignment layer and a liquid-crystal composition and another is an interface between an air and a liquid-crystal composition, and, however, two interfaces does not always mean those for the optically anisotropic layer transferred from on the alignment layer to on another substrate or the like) with tilt angles being different between at the two interfaces. When an optically anisotropic layer is formed on an alignment layer, a hybrid alignment is achieved by aligning liquid-crystalline molecules with a tilt angle at an interface between an optically-anisotropic layer (a liquid-crystal composition) and an alignment layer, referred to as "an alignment layer interface", and with a different tilt angle at an interface between an air and an optically anisotropic layer (a liquid-crystal composition), referred to as "an air interface". Examples of the manner of changing in a tilt angle include continuous increase, continuous decrease, intermittent increase, intermittent decrease, change comprising continuous increase and continuous decrease and intermittent change comprising increase and decrease. Embodiments of the intermittent changes comprise an area in which the tilt angle doesn't change in depth-direction. According to the present invention, it is preferred that the tilt angle increases or decreases as a whole whether the tilt angle change continuously or not. It is more preferred that the tilt angle increases as a whole with the position of the molecules being far from the substrate, and it is much more preferred that the tilt angle increases continuously as a whole with the position of the molecules being far from the substrate.

In the specification, ranges indicated with "to" mean ranges including the numerical values before and after "to" as the minimum and maximum values.

DETAILED DESCRIPTION OF THE INVENTION

The present invention relates to an optical film comprising an optically anisotropic layer formed of a composition comprising at least one liquid crystal compound and at least one polymer having a fluoro-aliphatic group and at least one hydrophilic group, occasionally referred to as "fluoride-polymer" hereinafter. The optical film is preferably used as an optically compensatory sheet.

Fluoride-Polymer Employed in the First Embodiment

In the first embodiment of the present invention, a composition comprising at least one liquid crystal compound and at least one polymer, having a fluoro-aliphatic group and at least one hydrophilic group selected from the group consisting of a carboxyl group (—COOH), a sulfo group (—SO$_3$H), a phosphonoxy group {—OP(=O)(OH)$_2$} and salts thereof, in a side chain is used for producing the optically anisotropic layer. The presence of the fluoride-polymer allows liquid-crystal molecules to align with a large tilt angle, especially, at an air interface. As a result, a layer exhibiting an optically anisotropic property, which is brought about by a hybrid-alignment of liquid-crystal molecules, can be produced stably. When the composition further comprises another polymer comprising a unit derived from a compound represented by a formula (A), the coating properties are more improved, and, thus, unevenness ("mura"), cissing ("hajiki") or the like is reduced.

In the first embodiment, a polymer having a fluoro-aliphatic group and a hydrophilic group selected from the group consisting of a carboxyl group (—COOH), a sulfo group (—SO$_3$H), a phosphonoxy group {—OP(=O)(OH)$_2$} and salts thereof in a side chain is used as a fluoride-polymer. Various polymer types are described on pages 1 to 4 in "Revision Chemistry of Polymer Synthesis (Kaitei Porimar Gousei no Kagaku)" written by OHTSU TAKAYUKI and published by Kagaku-Doj in Publishing Company, Inc in 1968, and the fluoride-polymer may be selected the described polymer types such as polyolefins, polyesters, polyamides, polyimides, polyurethanes, polycarbonates, polysulfones, polyethers, polyacetals, polyketones, polyphenylene-oxides, polyphenylene-sulfides, polyarylates, PTFEs, polyvinylidene-fluorides or cellulose derivatives. The fluoride-polymer is desirably selected from polyolefins. The fluoride-polymer employed in the first embodiment has a fluoro-aliphatic group in a side chain. The carbon number of the fluoro-aliphatic group is desirably from 1 to 12 and more desirably from 6 to 10. The aliphatic group may has a chain or cyclic structure, and the chain structure may be linear or branched. Among those, linear C$_{6-10}$ fluoro-aliphatic groups are preferred. The fluorine-substitution degree of the fluoro-aliphatic group is desirably decided, however not to be limited to, such that not less than 50%, more desirably not less than 60%, of all carbon atoms in the corresponding aliphatic group are replaced with fluorine atoms. The fluoro-aliphatic group in a side chain may bind to a main chain through a linking group such as an ester linkage, amide linkage, imido linkage, urethane linkage, urea linkage, ether linkage, thioether linkage or aromatic ring. The fluoro-aliphatic group may be derived from a fluoro aliphatic compound prepared by a telomerization method, occasionally referred to as telomer method, or an oligomemerization, occasionally referred to as oligomer method. Examples of preparation of the fluoride-aliphatic compound are described on pages 117 to 118 in "Synthesis and Function of Fluoride Compounds (Fussokagoubutsu no Gousei to Kinou)" overseen by ISHIKAWA NOBUO and published by CMC Publishing Co., Ltd in 1987; and on pages 747 to 752 in "Chemistry of Organic Fluorine Compounds II", Monograph 187, Ed by Milos Hudlicky and Attila E. Pavlath, American Chemical Society 1995; and the like. The telomerization method is a method for producing a telomer by carrying out radical polymerization of fluorine-containing compound such as tetrafluoroethylene in the presence of an alkylhalide such as iodide, having a large chain-transfer constant number, as a telogen. One example is shown in Scheme-I Scheme 1

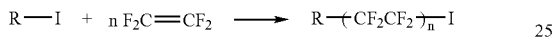

The obtained fluorine-terminated telomers are usually terminal-modified properly as shown in Scheme 2, to give fluoro aliphatic compounds. These compounds are, if necessary, transferred to a desired monomer structure, and then used for preparing fluoro-aliphatic containing polymers.

Scheme 2

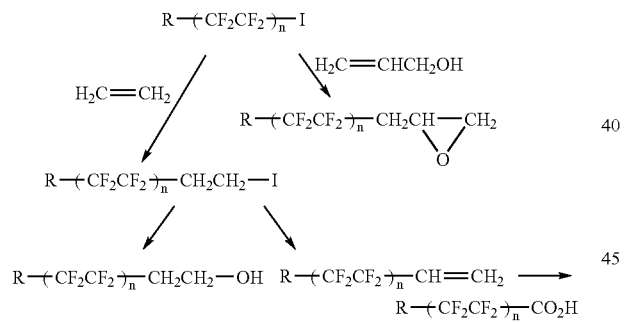

Fluoro-aliphatic group containing monomers selected from a group (A1) are preferably used for preparing the fluoride-polymer.

Formula (A1)

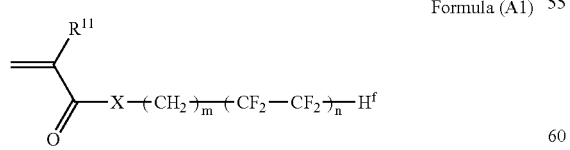

In the formula (A1), $R^{11}$ is hydrogen or methyl; X is oxygen (O), sulfur (S) or —N($R^{12}$)— where $R^{12}$ represents a hydrogen atom or a $C_{1-4}$ alkyl group and desirably a hydrogen atom or methyl; $H^f$ is hydrogen or fluorine; m is an integer from 1 to 6 and n is an integer from 2 to 4.

X is desirably oxygen, $H^f$ is desirably hydrogen, m is desirably 1 or 2 and n is desirably 3 or 4, and mixtures thereof may be used.

Examples of the fluoride monomer which can be used for preparing the fluoride-polymer employed in the first embodiment include, however not to be limited to, compounds shown below.

F-1
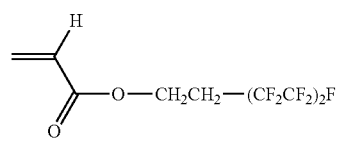

F-2
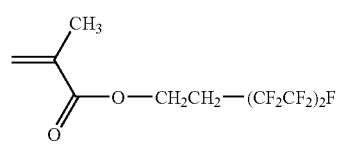

F-3
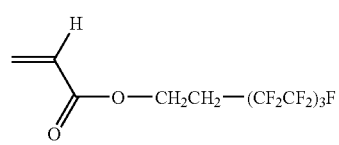

F-4
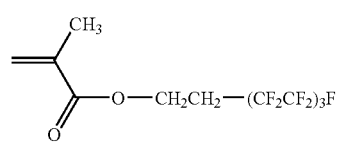

F-5
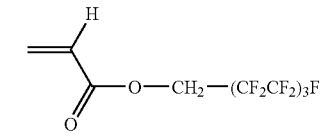

F-6
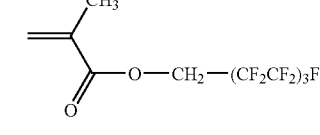

F-7
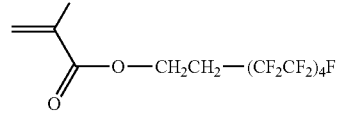

F-8

F-9
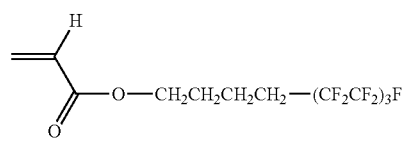

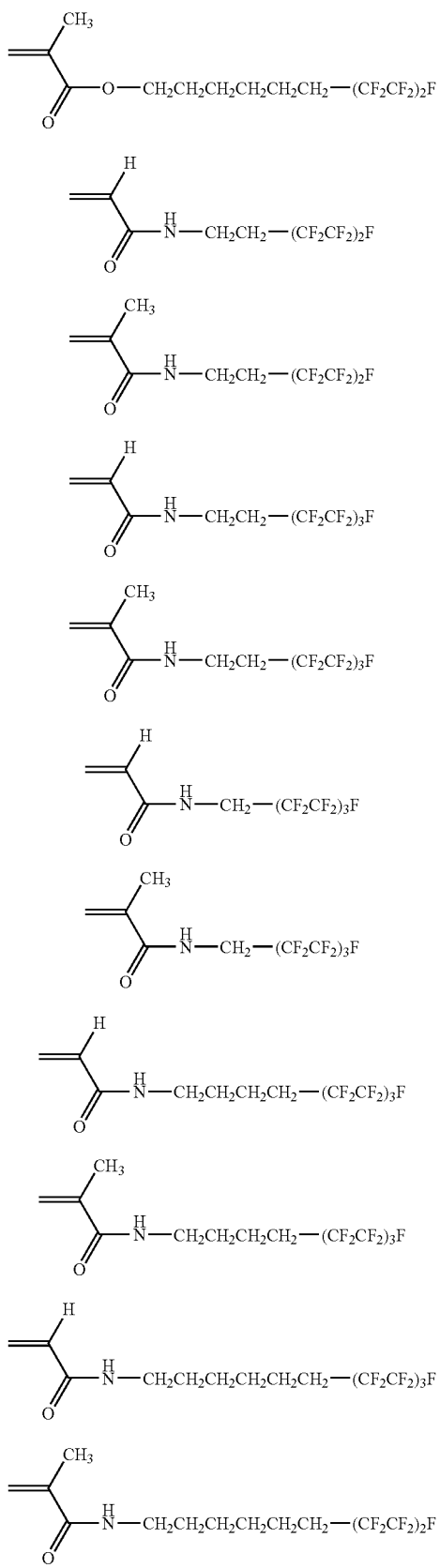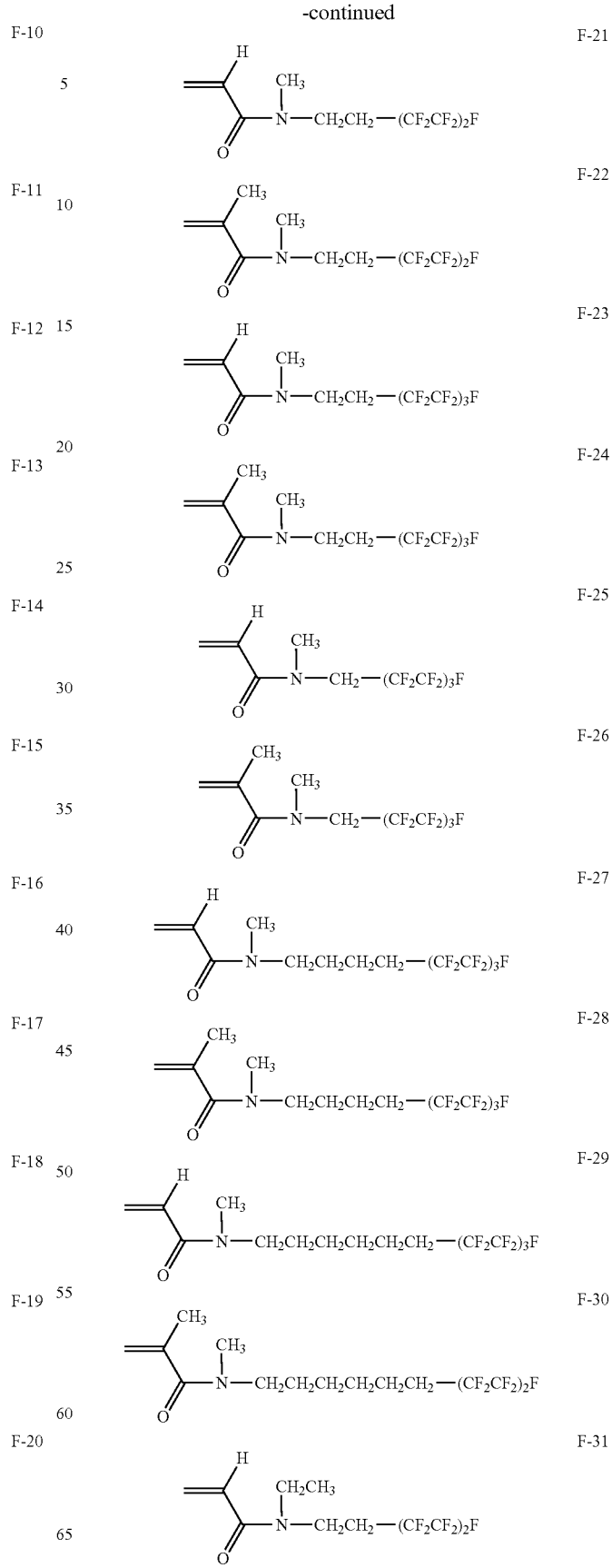

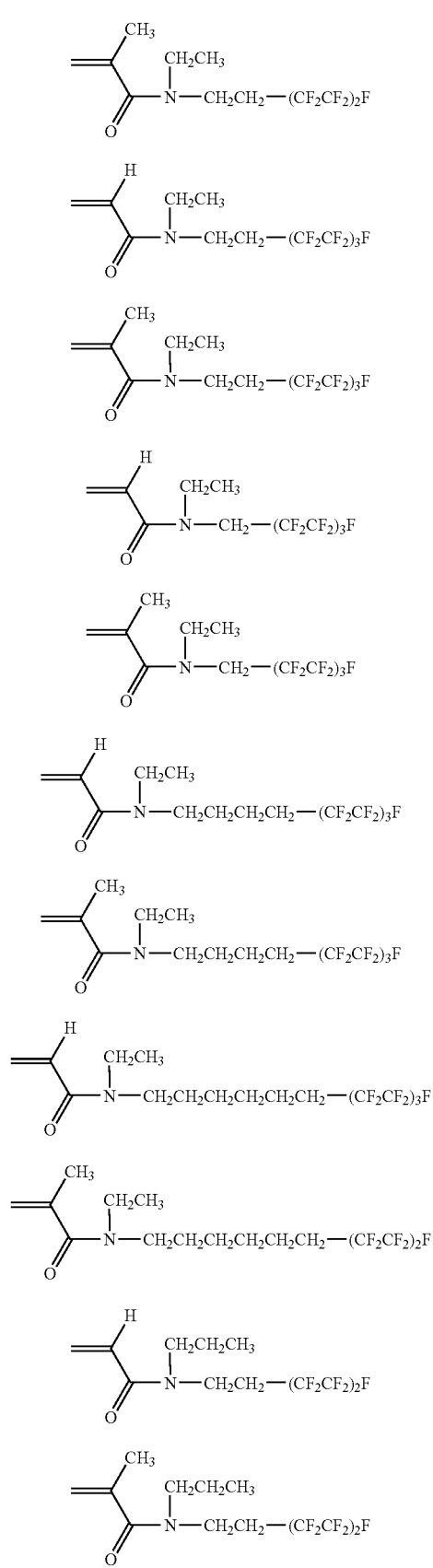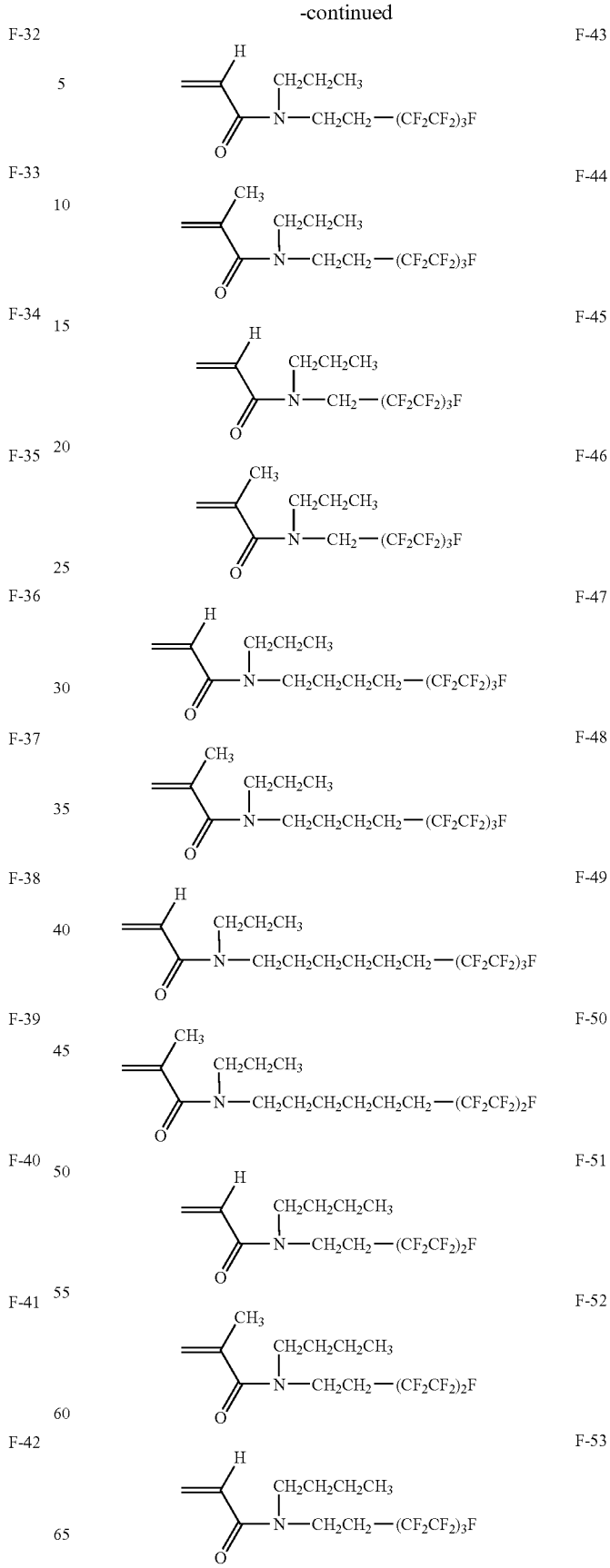

-continued

F-54: Methacrylamide with N-(CH₂CH₂CH₃) and N-CH₂CH₂—(CF₂CF₂)₃F substituents $$\text{CH}_2=\text{C}(\text{CH}_3)-\text{C}(=\text{O})-\text{N}(\text{CH}_2\text{CH}_2\text{CH}_3)-\text{CH}_2\text{CH}_2-(\text{CF}_2\text{CF}_2)_3\text{F}$$

F-55: Acrylamide $$\text{CH}_2=\text{CH}-\text{C}(=\text{O})-\text{N}(\text{CH}_2\text{CH}_2\text{CH}_3)-\text{CH}_2-(\text{CF}_2\text{CF}_2)_3\text{F}$$

F-56: Methacrylamide $$\text{CH}_2=\text{C}(\text{CH}_3)-\text{C}(=\text{O})-\text{N}(\text{CH}_2\text{CH}_2\text{CH}_3)-\text{CH}_2-(\text{CF}_2\text{CF}_2)_3\text{F}$$

F-57: Acrylamide $$\text{CH}_2=\text{CH}-\text{C}(=\text{O})-\text{N}(\text{CH}_2\text{CH}_2\text{CH}_3)-\text{CH}_2\text{CH}_2\text{CH}_2\text{CH}_2-(\text{CF}_2\text{CF}_2)_3\text{F}$$

F-58: Methacrylamide $$\text{CH}_2=\text{C}(\text{CH}_3)-\text{C}(=\text{O})-\text{N}(\text{CH}_2\text{CH}_2\text{CH}_3)-\text{CH}_2\text{CH}_2\text{CH}_2\text{CH}_2-(\text{CF}_2\text{CF}_2)_3\text{F}$$

F-59: Acrylamide $$\text{CH}_2=\text{CH}-\text{C}(=\text{O})-\text{N}(\text{CH}_2\text{CH}_2\text{CH}_3)-\text{CH}_2\text{CH}_2\text{CH}_2\text{CH}_2\text{CH}_2-(\text{CF}_2\text{CF}_2)_3\text{F}$$

F-60: Methacrylamide $$\text{CH}_2=\text{C}(\text{CH}_3)-\text{C}(=\text{O})-\text{N}(\text{CH}_2\text{CH}_2\text{CH}_3)-\text{CH}_2\text{CH}_2\text{CH}_2\text{CH}_2\text{CH}_2-(\text{CF}_2\text{CF}_2)_2\text{F}$$

F-61: Thioester of acrylic acid $$\text{CH}_2=\text{CH}-\text{C}(=\text{O})-\text{S}-\text{CH}_2\text{CH}_2-(\text{CF}_2\text{CF}_2)_2\text{F}$$

F-62: Thioester of methacrylic acid $$\text{CH}_2=\text{C}(\text{CH}_3)-\text{C}(=\text{O})-\text{S}-\text{CH}_2\text{CH}_2-(\text{CF}_2\text{CF}_2)_2\text{F}$$

F-63: Thioester of acrylic acid $$\text{CH}_2=\text{CH}-\text{C}(=\text{O})-\text{S}-\text{CH}_2\text{CH}_2-(\text{CF}_2\text{CF}_2)_3\text{F}$$

F-64: Thioester of methacrylic acid $$\text{CH}_2=\text{C}(\text{CH}_3)-\text{C}(=\text{O})-\text{S}-\text{CH}_2\text{CH}_2-(\text{CF}_2\text{CF}_2)_3\text{F}$$

F-65: Acrylate ester $$\text{CH}_2=\text{CH}-\text{C}(=\text{O})-\text{O}-\text{CH}_2-(\text{CF}_2\text{CF}_2)_2\text{H}$$

F-66: Methacrylate ester $$\text{CH}_2=\text{C}(\text{CH}_3)-\text{C}(=\text{O})-\text{O}-\text{CH}_2-(\text{CF}_2\text{CF}_2)_3\text{H}$$

F-67: Acrylate ester $$\text{CH}_2=\text{CH}-\text{C}(=\text{O})-\text{O}-\text{CH}_2-(\text{CF}_2\text{CF}_2)_3\text{H}$$

F-68: Methacrylate ester $$\text{CH}_2=\text{C}(\text{CH}_3)-\text{C}(=\text{O})-\text{O}-\text{CH}_2-(\text{CF}_2\text{CF}_2)_3\text{H}$$

F-69: Acrylate ester $$\text{CH}_2=\text{CH}-\text{C}(=\text{O})-\text{O}-\text{CH}_2-(\text{CF}_2\text{CF}_2)_4\text{H}$$

F-70: Methacrylate ester $$\text{CH}_2=\text{C}(\text{CH}_3)-\text{C}(=\text{O})-\text{O}-\text{CH}_2-(\text{CF}_2\text{CF}_2)_4\text{H}$$

F-71: N-substituted maleimide $$\text{Maleimide-N-CH}_2-(\text{CF}_2)_3\text{F}$$

F-72: N-substituted maleimide $$\text{Maleimide-N-CH}_2-(\text{CF}_2)_6\text{F}$$

F-73: N-substituted maleimide $$\text{Maleimide-N-CH}_2-(\text{CF}_2)_7\text{F}$$

F-74: N-substituted maleimide $$\text{Maleimide-N-CH}_2-(\text{CF}_2)_8\text{F}$$

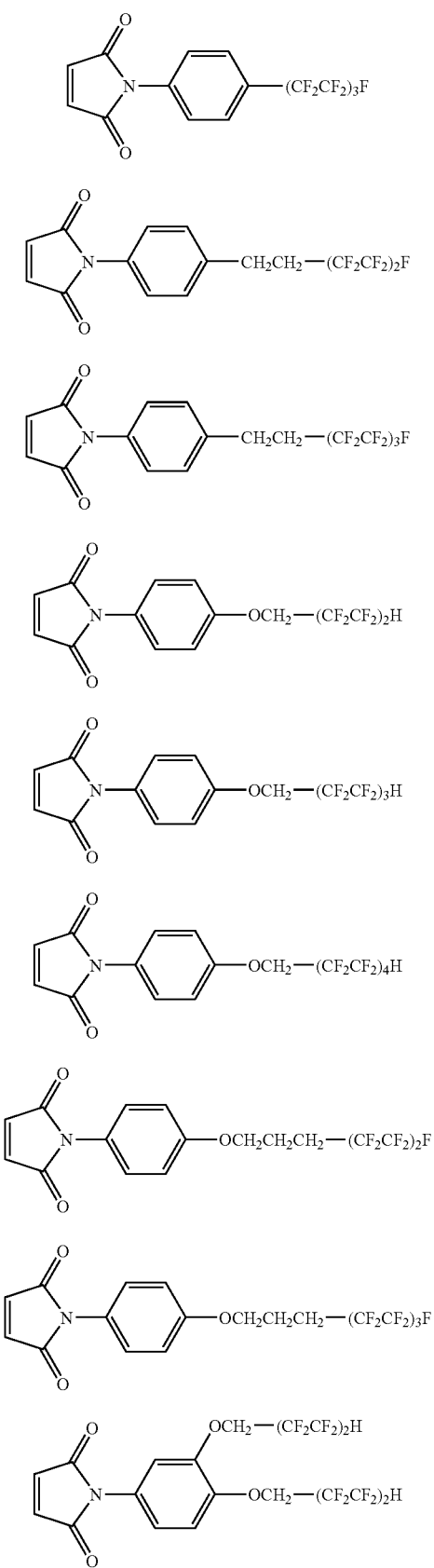
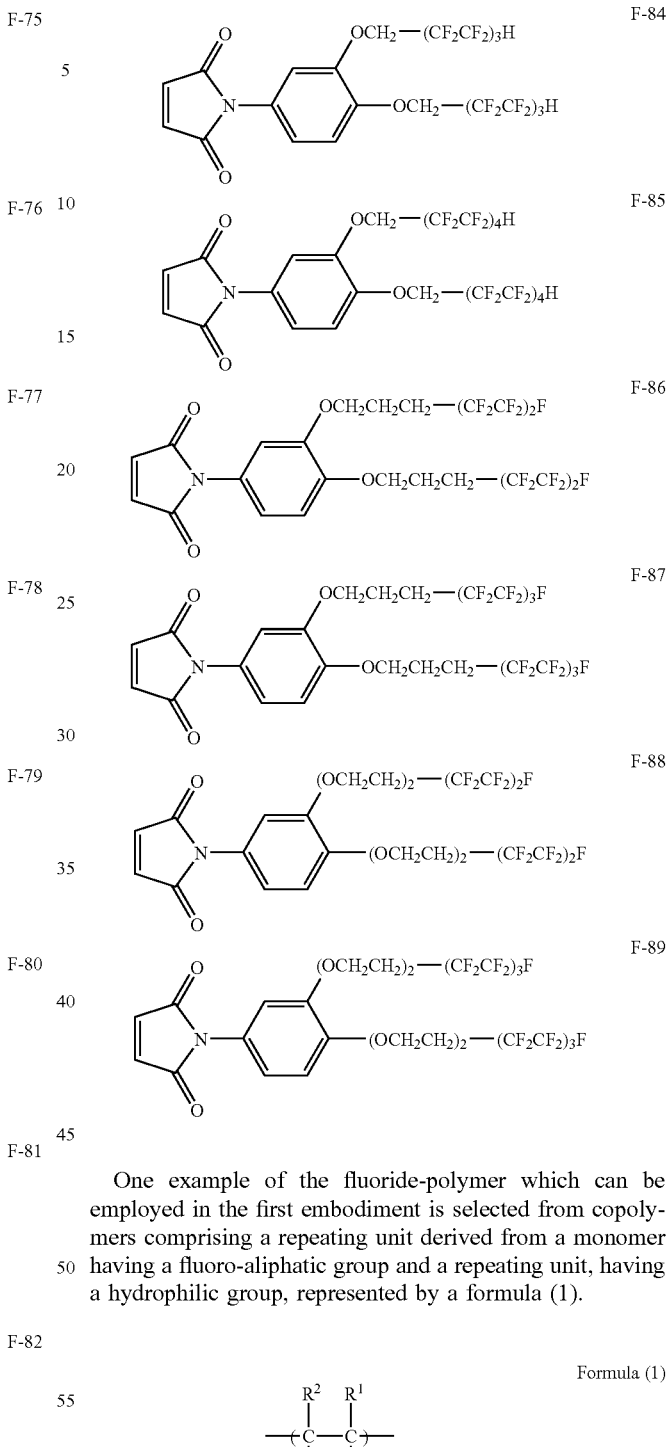

One example of the fluoride-polymer which can be employed in the first embodiment is selected from copolymers comprising a repeating unit derived from a monomer having a fluoro-aliphatic group and a repeating unit, having a hydrophilic group, represented by a formula (1).

Formula (1)

In the formula (1), $R^1$, $R^2$ and $R^3$ respectively represent a hydrogen atom or a substituent. Q is a carboxyl group (—COOH) or a salt thereof, a sulfo group (—SO$_3$H) or a salt thereof or a phoshonoxy group {—OP(=O)(OH)$_2$} or a salt thereof. L is a linking group selected from Linkage Group I shown below or a divalent group consisting of two or more selected from Linkage Group I shown below:

(Linkage Group I)

a single bond, —O—, —CO—, —NR⁴— (R⁴ is a hydrogen atom, an alkyl group, an aryl group or an aralkyl group), —S—, —SO₂—, —P(=O)(OR¹⁵)— (R⁵ is an alkyl group, an aryl group or aralkyl group), an alkylene group and arylene group.

In the formula (1), $R^1$, $R^2$ and $R^3$ respectively represent a hydrogen atom or a substituent selected from Substituent Group I shown below:

(Substituent Group I)

an alkyl group (desirably $C_{1-20}$, more desirably $C_{1-12}$ and much more desirably $C_{1-8}$ alkyl group) such as methyl, ethyl, isopropyl, tert-butyl, n-octyl, n-decyl, n-hexadecyl, cyclopropyl, cyclopentyl or cyclohexyl; an alkenyl group (desirably $C_{2-20}$, more desirably $C_{2-12}$ and much more desirably $C_{2-8}$ alkenyl group) such as vinyl, allyl, 2-butenyl or 3-pentenyl; an alkynyl group (desirably $C_{2-20}$, more desirably $C_{2-12}$ and much more desirably $C_{2-8}$ alkynyl group) such as propargyl or 3-pentynyl; an aryl group (desirably $C_{6-30}$, more desirably $C_{6-20}$ and much more desirably $C_{6-12}$ aryl group) such as phenyl, p-methylphenyl or naphthyl; an aralkyl group (desirably $C_{7-30}$, more desirably $C_{7-20}$ and much more desirably $C_{7-12}$ aralkyl group) such as benzyl, phenethyl or 3-phenylpropyl; a substituted or unsubstituted amino group (desirably $C_{0-20}$, more desirably $C_{0-10}$ and much more desirably $C_{0-6}$ amino group) such as unsubstituted amino, methylamino, dimethylamino, diethylamino or anilino; an alkoxy group (desirably $C_{1-20}$, more desirably $C_{1-16}$ and much more desirably $C_{1-10}$ alkoxy group) such as methoxy, ethoxy or butoxy; an alkoxycarbonyl group (desirably $C_{2-20}$, more desirably $C_{2-16}$ and much more desirably $C_{2-10}$ alkoxy carbonyl group) such as methoxycarbonyl or ethoxycarbonyl; an acyloxy group (desirably $C_{2-20}$, more desirably $C_{2-16}$ and much more desirably $C_{2-10}$ acyloxy group) such as acetoxy or benzoyloxy; an acylamino group (desirably $C_{2-20}$, more desirably $C_{2-16}$ and much more desirably $C_{2-10}$ acylamino group) such as acetylamino or benzoylamino; an alkoxycarbonylamino group (desirably $C_{2-20}$, more desirably $C_{2-16}$ and much more desirably $C_{2-12}$ alkoxycarbonylamino group) such as methoxycarbonyl amino; an aryloxycarbonylamino group (desirably $C_{7-20}$, more desirably $C_{7-16}$ and much more desirably $C_{7-12}$ aryloxycarbonylamino group) such as phenyloxycarbonyl amino group; a sulfonylamino group (desirably $C_{1-20}$, more desirably $C_{1-16}$ and much more desirably $C_{1-12}$ sulfonylamino group) such as methylsulfonylamino group or benzenesulfonylamino group; a sulfamoyl group (desirably $C_{0-20}$, more desirably $C_{0-16}$ and much more desirably $C_{0-12}$ sulfamoyl group) such as unsubstituted sulfamoyl, methylsulfamoyl, dimethylsulfamoyl or phenylsulfamoyl; a carbamoyl group (desirably $C_{1-20}$, more desirably $C_{16}$ and much more desirably $C_{1-12}$ carbamoyl group) such as unsubstituted carbamoyl, methylcarbamoyl, diethylcarbamoyl or phenylcarbamoyl; an alkylthio group (desirably $C_{1-20}$, more desirably $C_{1-16}$ and much more desirably $C_{1-12}$ alkylthio group) such as methylthio or ethylthio; an arylthio group (desirably $C_{6-20}$, more desirably $C_{6-16}$ and much more desirably $C_{6-12}$ arylthio group) such as phenylthio; a sulfonyl group (desirably $C_{1-20}$, more desirably $C_{1-16}$ and much more desirably $C_{1-12}$ sulfonyl group) such as mesyl or tosyl; a sulfinyl group (desirably $C_{1-20}$, more desirably $C_{1-16}$ and much more desirably $C_{1-12}$ sulfinyl group) such as methane sulfinyl or benzenesulfinyl; an ureido group (desirably $C_{1-20}$, more desirably $C_{1-16}$ and much more desirably $C_{1-12}$ ureido group) such as unsubstituted ureido, methylureido or phenylureido; a phosphoric amide (desirably $C_{1-20}$, more desirably $C_{1-16}$ and much more desirably $C^{1-12}$ phosphoric amide) such as diethylphosphoric amide or phenylphosphoric amide; a hydroxy group, a mercapto group, a halogen atom such as fluorine, chlorine, bromine or iodine; a cyano group, a sulfo group, a carboxyl group, a nitoro group, a hydroxamic acid group, a sulfino group, a hydrazino group, an imino group, a hetero cyclic group (desirably $C_{1-30}$ and more desirably $C_{1-12}$ heterocyclic group comprising at least one hetero atom such as nitrogen, oxygen or sulfur) such as imidazolyl, pyridyl, quinolyl, furyl, piperidyl, morpholino, benzoxazolyl, benzimidazolyl or benzthiazolyl; and a silyl group (desirably $C_{3-40}$, more desirably $C_{3-30}$ and much more desirably $C_{3-24}$ silyl group) such as trimethylsilyl or triphenylsilyl. These substituents may be substituted by at least one substituent selected from these. When two substituents are selected, they may be same or different each other. Two or more may, if possible, bond each other to form a ring.

It is preferred that $R^1$, $R^2$ and $R^3$ respectively represent a hydrogen atom, an alkyl group, a halogen atom (such as fluorine, chlorine, bromine or iodine) or a group represented by -L-Q described later; more preferred that $R^1$, $R^2$ and $R^3$ respectively represent a hydrogen atom, a $C_{1-6}$ alkyl group, chlorine or a group represented by -L-Q described later; much more preferred that $R^1$, $R^2$ and $R^3$ respectively represent a hydrogen atom or a $C_{1-4}$ alkyl group; further much more preferred that $R^1$, $R^2$ and $R^3$ respectively represent a hydrogen atom or a $C_{1-2}$ alkyl group; and most preferred that $R^2$ and $R^3$ are hydrogen and $R^1$ is hydrogen or methyl. Examples of the alkyl group include methyl, ethyl, n-propyl, n-butyl and sec-butyl. The alkyl group may have any substituent. Examples of the substituent include a halogen atom, an aryl group, a heterocyclic group, an alkoxyl group, an aryloxy group, an alkylthio group, an arylthio group, an acyl group, a hydroxy group, an acyloxy group, an amino group, an alkoxycarbonyl group, an acylamino group, an oxycarbonyl group, a carbamoyl group, a sulfonyl group, a sulfamoyl group, a sulfonamido group, a sulforyl group and a carboxyl group. It is noted that when the alkyl group has any substituent, the carbon atom number of the alkyl group, described above, is the number of the carbon atoms included in the only alkyl group, and the carbon atoms included in the substituent are not counted. Numbers of carbon atoms included in the other groups described later are defined as same as that of the alkyl group.

L is a divalent linking group selected from the above defined group or any combination of two or more selected from the above identified group. The $R^4$ in —NR⁴— described above represents a hydrogen atom, an alkyl group, an aryl group or an aralkyl group, and desirably a hydrogen atom or an alkyl group. And the $R^5$ in —PO(OR⁵)— represents an alkyl group, an aryl group or an aralkyl group, and desirably an alkyl group. When $R^4$ or $R^5$ is an alkyl group, an aryl group or an aralkyl group, the desired carbon numbers of them are same as those described in Substituent Group I. L desirably contains a single bond, —O—, —CO—, —NR⁴—, —S—, —SO₂—, an alkylene group or arylene group; more desirably contains a single bond, —CO—, —O—, —NR⁴—, an alkylene group or an arylene group; and much more desirably represents a single bond. When L contains an alkylene group, the carbon atom number of the alkylene group is desirably from 1 to 10, more desirably from 1 to 8 and much more desirably from 1 to 6. Preferred examples of the alkylene group include methylene, ethylene, trimethylene, tetrabutylene and hexamethylene. When L contains an arylene group, the carbon atom number of the arylene group is desirably from 6 to 24, more desirably from 6 to 18 and much more desirably from 6 to 12. Preferred examples of the arylene group include phenylene and naphthalene. When L contains a divalent linking group consisting of a combination of an alkylene group and an arylene group, or in other words an aralkyl group, the carbon atom number in the aralkyl group is desirably from 7 to 34, more desirably from 7 to 26 and much more desirably from 7 to 16. Preferred examples of the aralkyl group include phenylene methylene, phenylene ethylene and methylene phenylene. L may have any substituent. Examples of the substituent are same as those exemplified for the substituent of $R^1$, $R^2$ or $R^3$.

Examples of L include, but not limited to, those shown below.

| | |
|---|---|
| L-1 | — (single bond) |
| L-2 | —COO—(CH$_2$)$_2$— |
| L-3 | —COO—(CH$_2$)$_3$— |
| L-4 | —COO—(CH$_2$)$_5$— |
| L-5 | —COO—(CH$_2$)$_8$— |
| L-6 | —COO—(CH$_2$)$_{11}$— |
| L-7 | —COO—(CH$_2$)$_3$—CHCH$_2$— with CH$_3$ branch |
| L-8 | —CONH—(CH$_2$)$_3$— |
| L-9 | —CONH—(CH$_2$)$_5$— |
| L-10 | —CON(CH$_3$)—(CH$_2$)$_8$— |
| L-11 | —CONH—(CH$_2$)$_{11}$— |
| L-12 | -phenylene- |
| L-13 | —COO-phenylene- |
| L-14 | —COO-phenylene- |
| L-15 | —CONH-phenylene- |
| L-16 | —COOCH$_2$CH$_2$OCH$_2$— |
| L-17 | —COO—(CH$_2$CH$_2$O)$_2$—CH$_2$— |
| L-18 | —CONH-phenylene-OCH$_2$— |
| L-19 | —CONH-phenylene-SO$_2$NHCH$_2$CH$_2$— |
| L-20 | -phenylene-CH$_2$— |
| L-21 | -naphthylene- |
| L-22 | -phenylene-OCH$_2$CH$_2$— |
| L-23 | —COO—CH$_2$CH$_2$OCO-phenylene- |
| L-24 | -phenylene-OCH$_2$CH$_2$NHCOCH$_2$CH$_2$— |
| L-25 | -phenylene-(CH$_2$)$_4$— |
| L-26 | —(CH$_2$)$_5$— |
| L-27 | —O—(CH$_2$)$_4$—O—CH$_2$— |

In the formula (1), Q represents a carboxyl group or a carboxylate such as lithium carboxylate, sodium carboxylate, potassium carboxylate, ammonium carboxylate (for example, unsubstituted ammonium carboxylate, tetramethylammonium carboxylate, trimethyl-2-hydroxyethylammonium carboxylate, tetrabutylammonium carboxylate, trimethylbenzylammonium carboxylate or dimethylphanylammonium carboxylate) or pyridinium carboxylate; a sulfo group or a sulfate (examples of a counter cation are same as those exemplified for the carboxylate above); or a phosphonoxy group or a phosphonoxylate (examples of a counter cation are same as those exemplified for the carboxylate above). Q is desirably a carboxyl group, a sulfo group or a phosphonox group, more desirably a carboxyl group or a sulfo group and much more desirably a carboxyl group.

Examples of the monomer corresponding to the repeating unit represented by the formula (1), which can be used for producing the fluoride-polymers to be used in the first embodiment, include, however not to be limited to, those shown below.

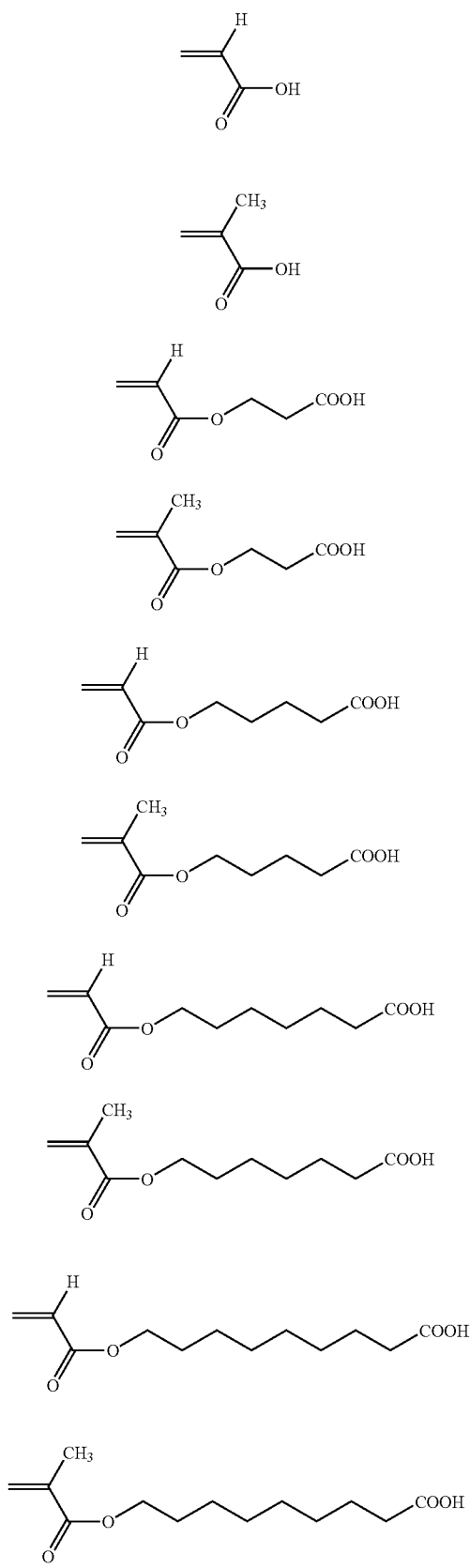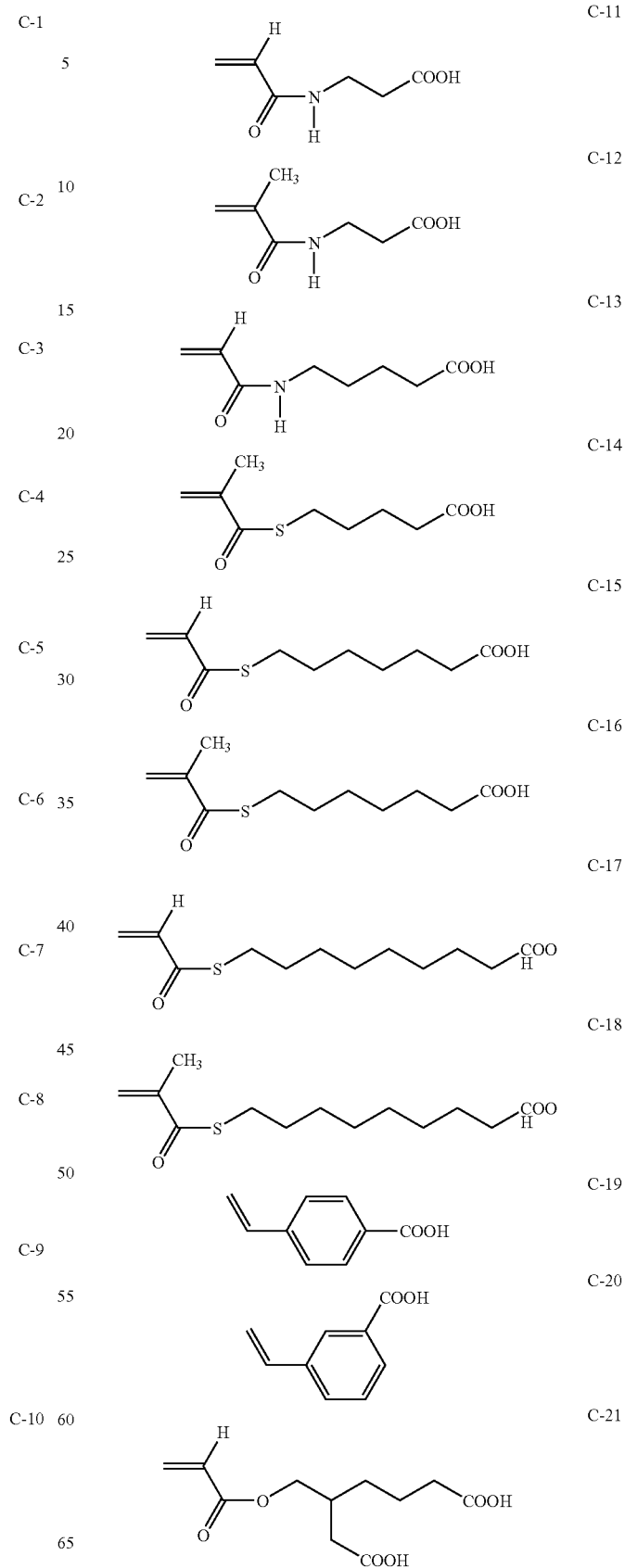

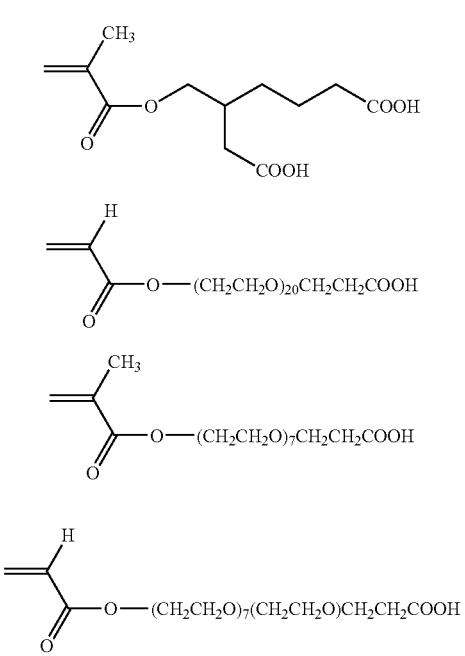

The fluoride-polymer may comprise one repeating unit selected from the formula (1), or plural repeating units selected from the group (1). The fluoride-polymer may further comprise at least one repeating unit other than that selected from the formulae. The other repeating unit is not limited and is desirably selected from units derived from monomers capable of usual radical polymerization. Examples of the monomer which can give the other repeating unit include, however not to be limited to, those shown below. The fluoride-polymer may comprise one repeating unit or plural repeating units selected from those shown below.

(Monomer Group I)

(1) Alkenes:

ethylene, propylene, 1-buten, isobuten, 1-hexene, 1-dodecene, 1-octadecene, 1-eicocene, hexafluoropropene, vinylidene fluoride, chlorotrifluoroethylene, 3,3,3-trifuluoropropylene, tetrafluoroethylene, vinyl chloride, vinylidene chloride or the like;

(2) Dienes:

1,3-butadinene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-a-naphtyl-1,3-butadiene, 1-β-naphtyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene, 2-cyano-1,3-butadiene, 1,4-divinyl cyclohexane or the like;

(3) a,β-unsaturated carboxylic acid derivatives:

(3a) Alkyl acrylates:

methyl methacrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, n-octyl acrylate, tert-octyl acrylate, dodecyl acrylate, phenyl acrylate, benzyl acrylate, 2-chloroethyl acrylate, 2-bromoethyl acrylate, 4-chlorobutyl acrylate, 2-cyanoethyl acrylate, 2-acetoxyethyl acrylate, methoxybenzyl acrylate, 2-chlorocyclohexyl acrylate, furfuryl acrylate, tetrahydrofurfuryl acrylate, 2-methoxyethyl acrylate, G-methoxy polyethyleneglycol acrylate (having additional molar number, n, of 2 to 100), 3-metoxybutyl acrylate, 2-ethoxyethyl acrylate, 2-butoxyethyl acrylate, 2-(2-butoxyethoxy)ethyl acrylate, 1-bromo-2-methoxyethyl acrylate, 1,1-dichloro-2-ethoxyethyl acrylate, glycidyl acrylate or the like;

(3b) Alkyl methacrylates:

methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, n-hexyl methacrylate, cyclohexyl methacrylate, 2-ethylhexyl methacrylate, n-octyl methacrylate, stearyl methacrylate, benzyl methacrylate, phenyl methacrylate, allyl methacrylate, furfuryl methacrylate, tetarahydrofurfuryl methacrylate, crezyl methacrylate, naphthyl methacrylate, 2-methoxyethyl methacrylate, 3-methoxybutyl methacrylate, ω-methoxypolyethyleneglycol methacrylate (having additional molar number, n, of 2 to 100), 2-acetoxyethyl methacrylate, 2-ethoxyethyl methacrylate, 2-butoxyethyl methacrylate, 2-(2-butoxyethoxy)ethyl methacrylate, glycidyl methacrylate, 3-trimetoxysilylpropyl methacrylate, allyl methacrylate, 2-isosyanate ethyl methacrylate or the like;

(3c) Diesters of unsaturated polycarboxylic acids:

dimethyl maleate, dibutyl maleate, dimethyl itaconate, dibutyl itaconate, dibutyl crotonate, dihexyl crotonate, diethyl fumarate, dimethyl fumarate or the like;

(3d) Amides of a,β-unsaturated carboxylic acids:

N,N-dimethyl acrylamide, N,N-diethyl acrylamide, N-n-propyl acrylamide, N-tert-butyl acrylamide, N-tert-octyl acrylamide, N-cyclohexyl acrylamide, N-phenyl acrylamide, N-(2-acetoacetoxyethyl)acrylamide, N-benzyl acrylamide, N-acryloyl morpholine, diacetone acrylamide, N-methyl maleimide or the like;

(4) Unsaturated nitriles:

acrylonitrile, methacrylonitrile or the like;

(5) Styrene or derivatives thereof:

styrene, vinyltoluene, ethylstyrene, p-tert-butylstyrene, p-vinyl methyl benzoate, a-methyl styrene, p-chloromethyl styrene, vinyl naphthalene, p-methoxy styrene, p-hydroxy methyl styrene, p-acetoxy styrene or the like;

(6) Vinyl esters:

vinyl acetate, vinyl propanate, vinyl butyrate, vinyl isobutyrate, vinyl benzoate, vinyl salicylate, vinyl chloroacetate, vinyl methoxy acetate, vinyl phenyl acetate or the like;

(7) Vinyl ethers:

methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, n-eicosyl vinyl ether, 2-ethylhexyl vinyl ether, cyclohexyl vinyl ether, fluorobutyl vinyl ether, fluorobutoxyethyl vinyl ether or the like; and (8) Other monomers N-vinyl pyrrolidone, methyl vinyl ketone, phenyl vinyl ketone, methoxy ethyl vinyl ketone, 2-vinyl oxazoline, 2-isoprppenyl oxazoline or the like.

The monomer which can give other repeating unit not containing fluoro-aliphatic group is desirably selected from the group represented by a formula (B1).

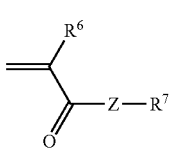

Formula (B1)

In the formula (B1), $R^6$ is hydrogen or methyl, z represents a linking group, $R^7$ represents an optionally substituted poly(alkylene)oxy group or an optionally substituted linear, branched or cyclic $C_{1-20}$ alkyl group. The linking group represented by Z is desirably selected from an oxygen atom, a sulfur atom and —N($R^5$)—. $R^5$ represents a hydrogen atom, a $C_{1-4}$ alkyl group such as methyl, ethyl, propyl or butyl. $R^5$ is desirably methyl. Z desirably represents an oxygen atom, —NH— or —N($CH_3$)—.

In the formula (B1), the poly(alkyleneoxy) group can be represented by $(RO)_x$, where R is an alkylene group and desirably $C_{2-4}$ alkylene group such as —$CH_2CH_2$—, —$CH_2CH_2CH_2$—, —$CH(CH_3)CH_2$— or —$CH(CH_3)CH(CH_3)$—.

The poly(alkyleneoxy) group may have a single type of an alkyleneoxy unit as well as poly(propyleneoxy), may have plural types of alkyleneoxy units (for example a linear propyleneoxy unit, a branched propyleneoxy unit and an ethyleneoxy unit) irregularly-distributed, or may have a unit formed by bonding plural types of alkyleneoxy blocks each other (for example, a unit formed by bonding a linear or branched propyleneoxy block and an ethyleneoxy block each other).

The poly(alkyleneoxy) chain may also comprise a unit formed by bonding plural poly(alkylenoxy) through a single or plural linking groups such as —CONH—Ph—NHCO— where ph is phenylene, or —S—. When the linking group is trivalent or more than trivalent, it is possible to obtain an alkyleneoxy unit having a branched chain structure. The copolymer, which can be used in the first embodiment, may contain a poly(alkylenoxy) group having a molecular weight of 250 to 3000.

Examples of the $C_{1-20}$ alkyl group represented by $R^7$ include linear or branched alkyl groups such as methyl, ethyl, propyl, butyl, pentyl, hexyl, heptyl, octyl, nonyl, decyl, undecyl, dodecyl, tridecyl, tetradecyl, pentadecyl, octadecyl or eicosanyl, single cyclic alkyl groups such as cyclohexyl or cycloheptyl and polycyclic alkyl groups such as bicycloheptyl, bicyclodecyl, tricycloundecyl, tetracyclododecyl, adamantyl, norbornyl or tetracyclodecyl. The poly(alkylenoxy) group or the alkyl group represented by $R^7$ may have a substituent, and examples of the substituent include, however not to be limited to, a hydroxy group, an alkylcarbonyl group, an arylcarbonyl group, an alkylcarbonyloxy group, a carboxyl group, an alkylether group, an arylether group, a halogen atom such as fluorine, chlorine or bromine, a nitro group, a cyano group and an amino group.

The monomer represented by the formula (B1) is desirably selected from alkyl (meth)acrylates or ply(alkyleneoxy) (meth)acrylates.

Examples of the monomer represented by the formula (B1) include, however not to be limited to, those shown below.

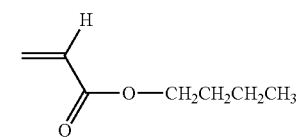
A-1

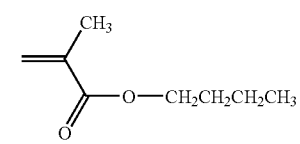
A-2

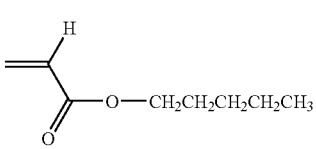
A-3

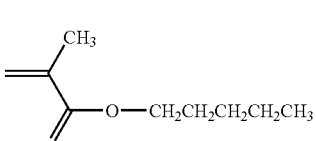
A-4

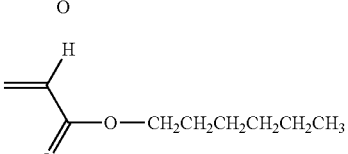
A-5

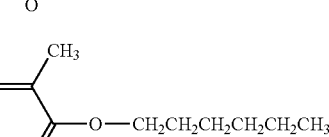
A-6

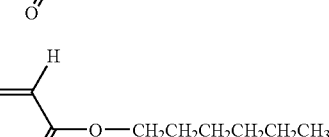
A-7

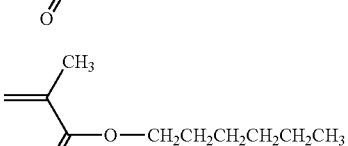
A-8

A-9

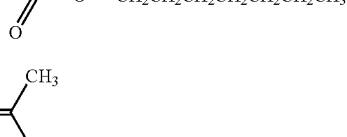
A-10

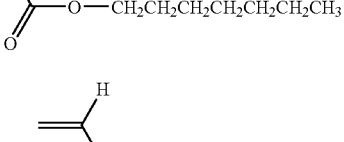
A-11

-continued
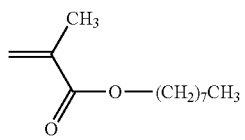 A-12
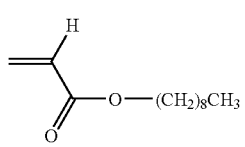 A-13
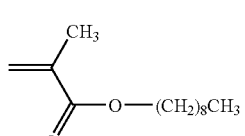 A-14
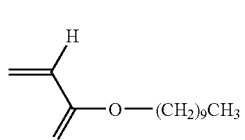 A-15
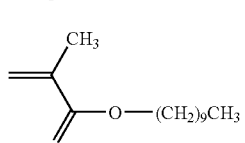 A-16
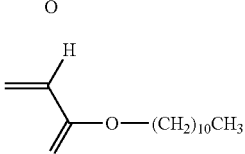 A-17
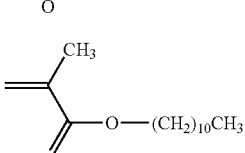 A-18
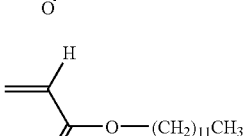 A-19
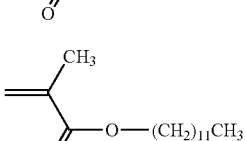 A-20
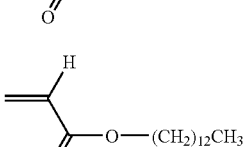 A-21
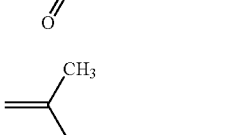 A-22
-continued
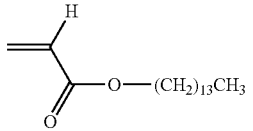 A-23
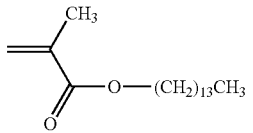 A-24
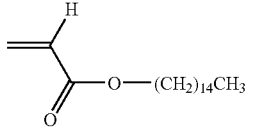 A-25
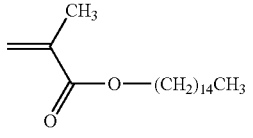 A-26
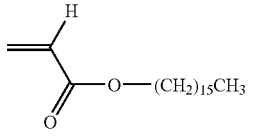 A-27
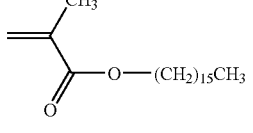 A-28
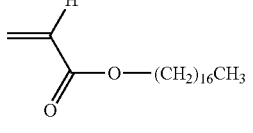 A-29
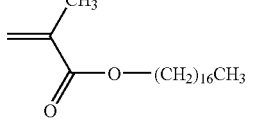 A-30
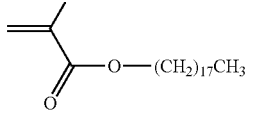 A-31
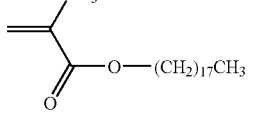 A-32
A-33

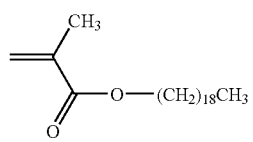 A-34
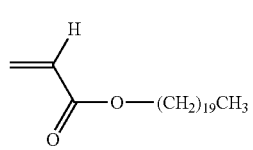 A-35
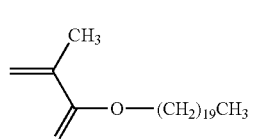 A-36
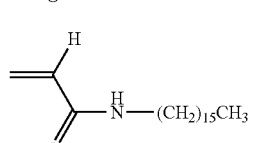 A-37
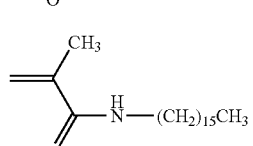 A-38
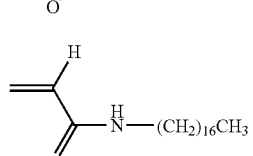 A-39
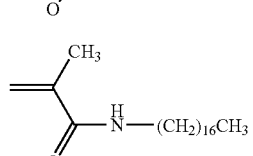 A-40
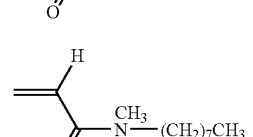 A-41
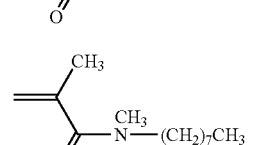 A-42
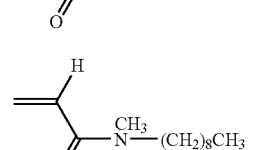 A-43
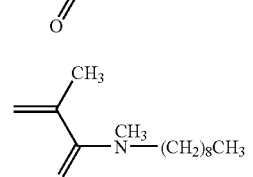 A-44
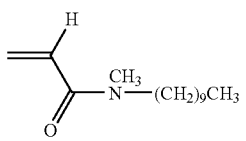 A-45
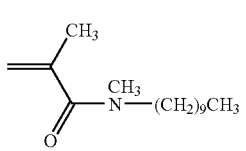 A-46
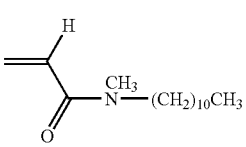 A-47
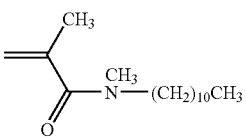 A-48
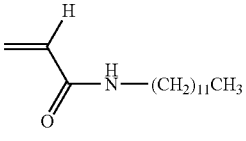 A-49
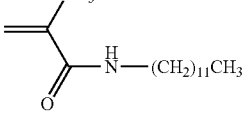 A-50
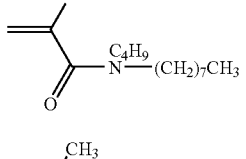 A-51
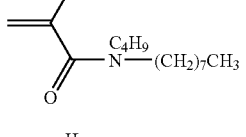 A-52
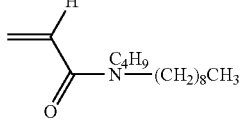 A-53
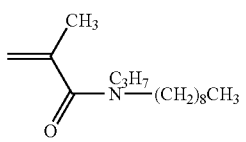 A-54
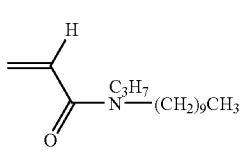 A-55

-continued
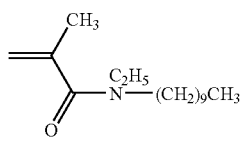 A-56
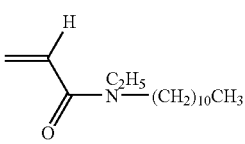 A-57
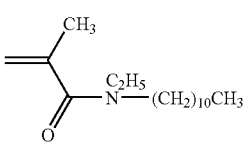 A-58
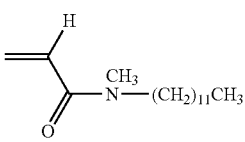 A-59
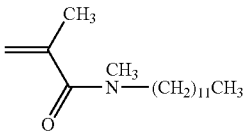 A-60
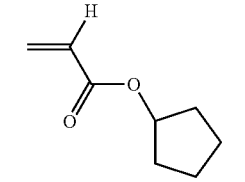 A-61
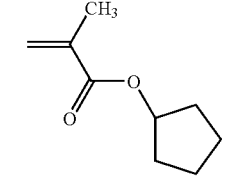 A-62
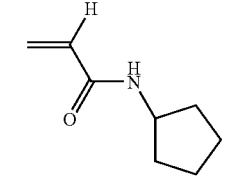 A-63
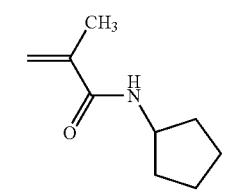 A-64
-continued
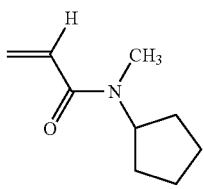 A-65
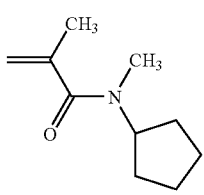 A-66
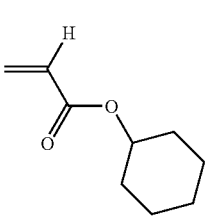 A-67
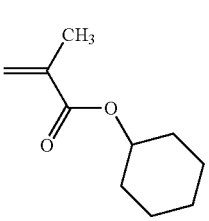 A-68
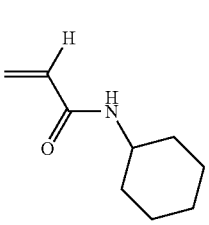 A-69
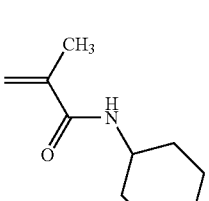 A-70
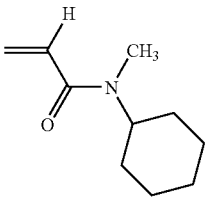 A-71

-continued
A-72
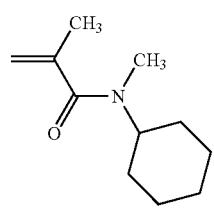
A-73
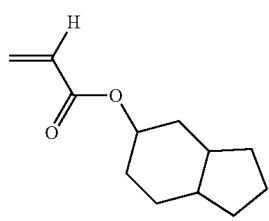
A-74
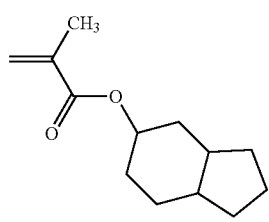
A-75
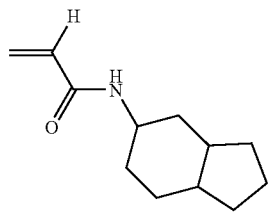
A-76
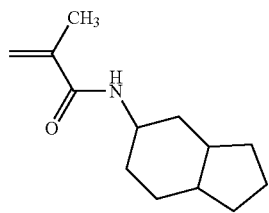
A-77
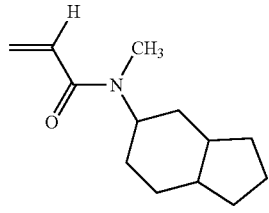
A-78
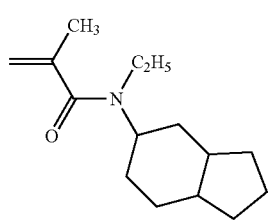
-continued
A-79
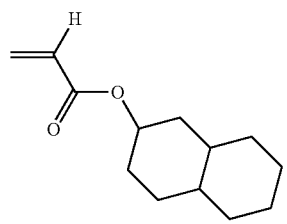
A-80
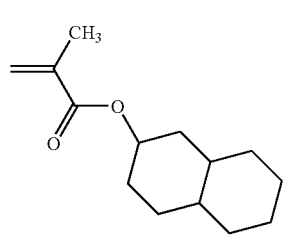
A-81
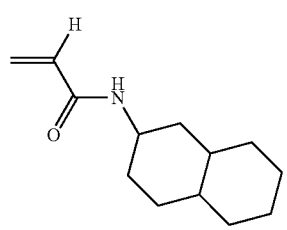
A-82
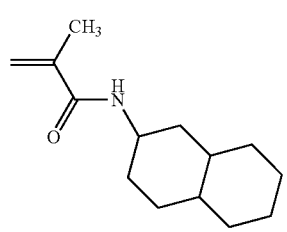
A-83
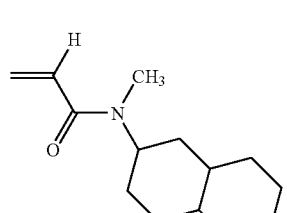
A-84
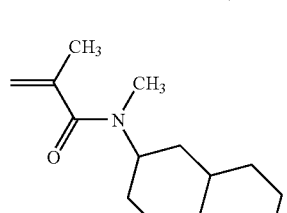
A-85
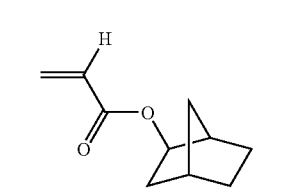

-continued
A-86
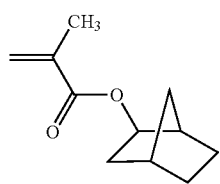
A-87
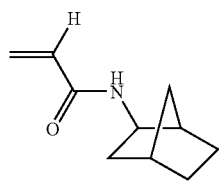
A-88
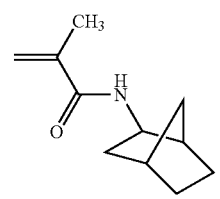
A-89
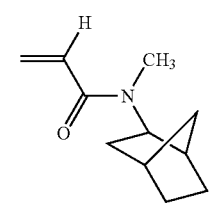
A-90
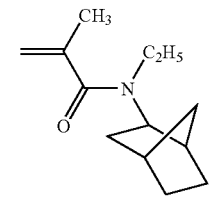
A-91
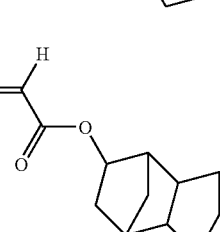
A-92
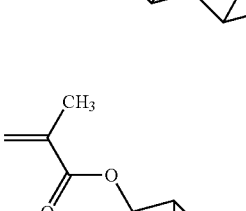
-continued
A-93
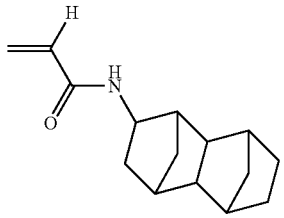
A-94
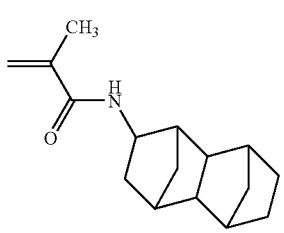
A-95
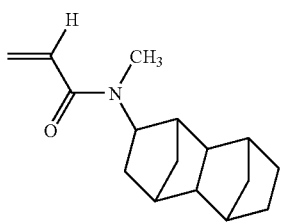
A-96
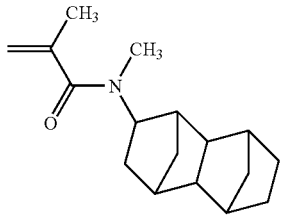
A-97
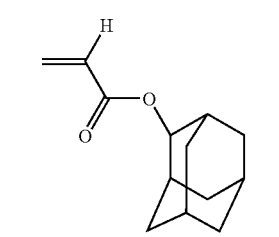
A-98
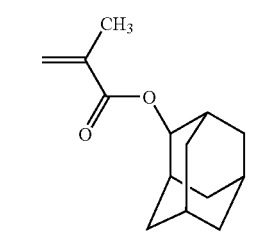
A-99
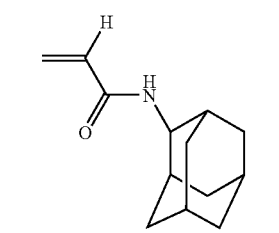

-continued
A-100
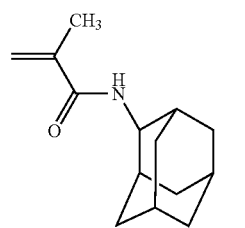
A-101
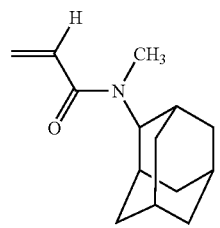
A-102
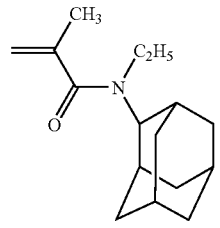
A-103
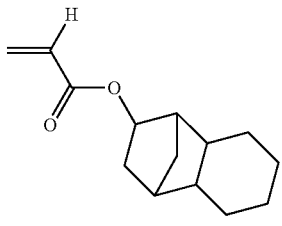
A-104
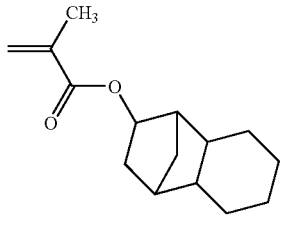
A-105
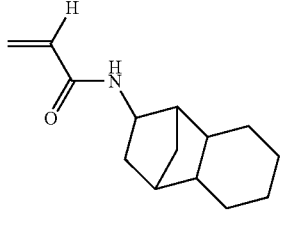
A-106
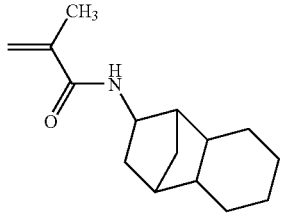
-continued
A-107
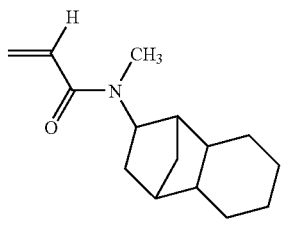
A-108
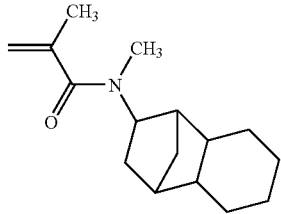
A-109
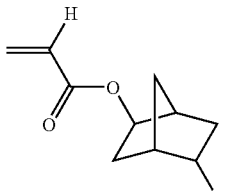
A-110
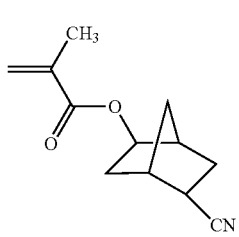
A-111
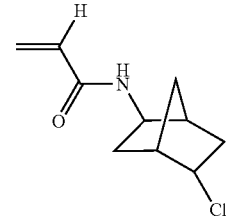
A-112
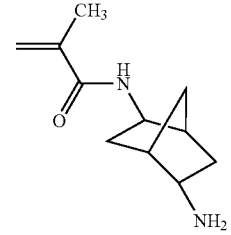
A-113
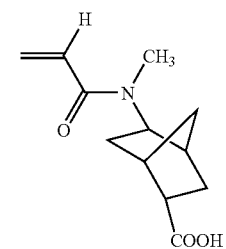

-continued
A-114
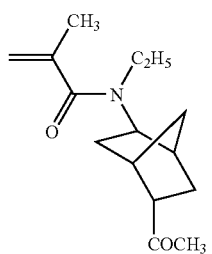
A-115
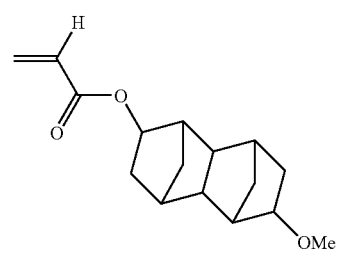
A-116
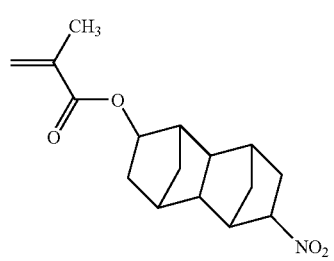
A-117
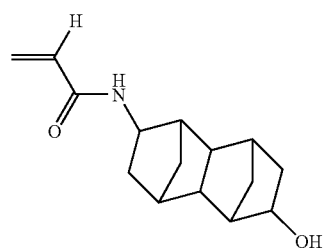
A-118
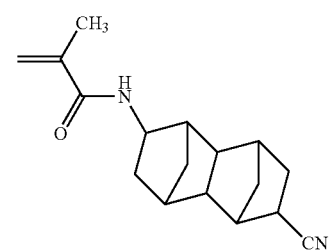
A-119
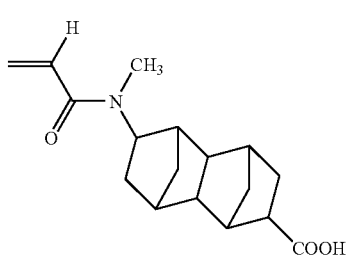
-continued
A-120
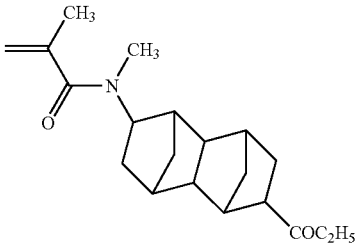
A-121
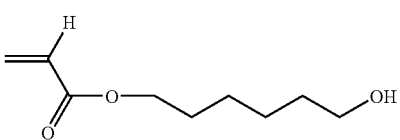
A-122
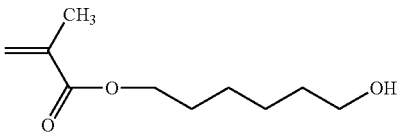
A-123
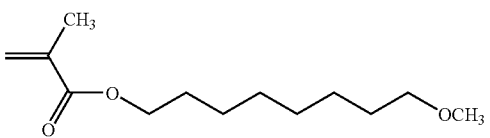
A-124
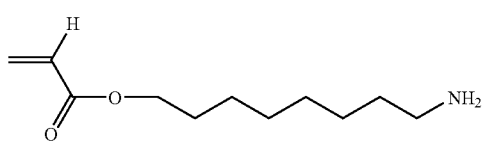
A-125
A-126
A-127
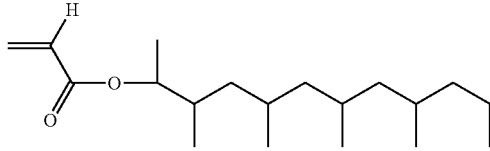
A-128

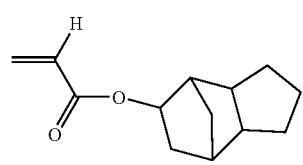
A-129
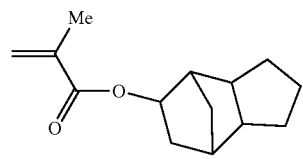
A-130
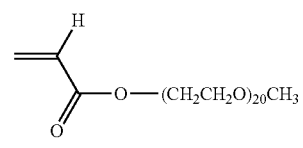
A-131
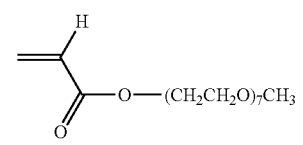
A-132
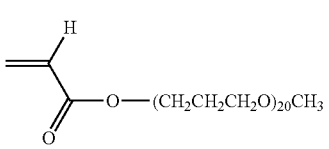
A-133
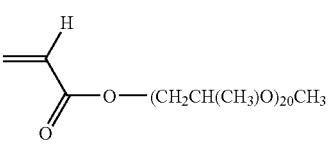
A-134
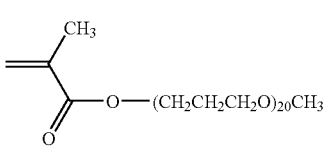
A-135
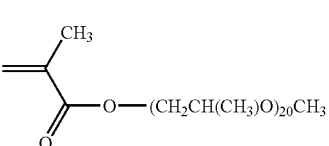
A-136
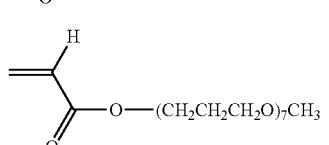
A-137
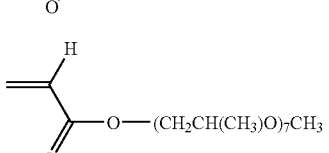
A-138
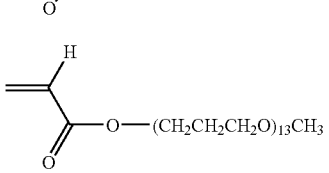
A-139
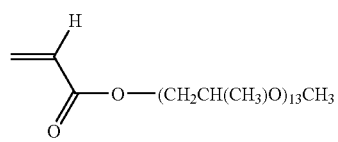
A-140
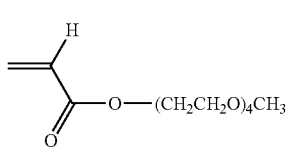
A-141
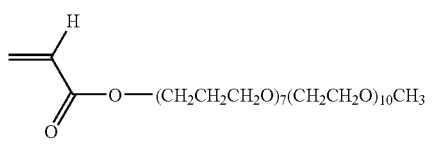
A-142
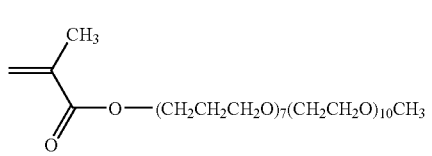
A-143
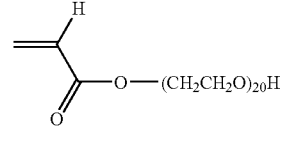
A-144
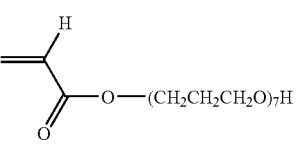
A-145
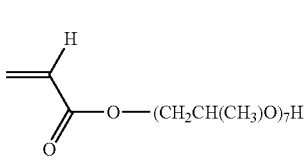
A-146
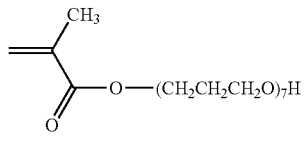
A-147
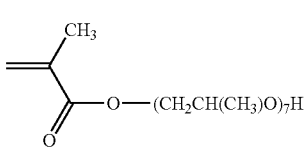
A-148
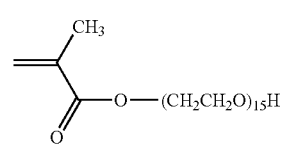
A-149

-continued

A-150

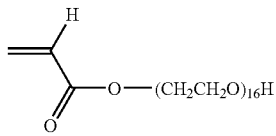

It is noted that poly(alkylenoxy)acrylates or methacrylates may be produced by carrying out a reaction of commercially available hydroxy poly(alkylenoxy) material such as "Pluronic" (manufactured by ASAHI DENKA CO., LTD.), "ADEKA POLYETHER" (manufactured by ASAHI DENKA Co., Ltd.), "Carbowax" (manufactured by Glyco Products (グリコ•プロダクツ) "Toriton" (manufactured by Rohm and Haas) or "P.E.G" (manufactured by DAI-ICHI KOGYO SEIYAKU CO., LTD.) with acrylic acid, methacrylic acid, acryl chloride, methacryl chloride, acrylic acid anhydride or the like according to any know method. Poly (oxyalkylene) diacrylates produced by any known method may be also used.

The amount of the monomer containing a fluoro aliphatic group is desirably not less than 5 wt %, more desirably not less than 10 wt %, and much more desirably not less than 30 wt % with respect to the total amount of all monomers constituting the fluoride-polymer. The amount of the repeating unit represented by the formula (1) is desirably not less than 1 wt %, more desirably from 2 to 20 wt %, much more desirably from 2 to 10 wt % and most desirably from 2 to 5 wt % with respect to the total amount of all monomers constituting the fluoride-polymer.

The weight-average molecular weight (Mw) of the fluoride-polymer to be used in the first embodiment is desirably from 1,000 to 1,000,000, more desirably from 1,000 to 500,000 and much more desirably from 1,000 to 100,000. The Mw can be measured as a polystyrene (PS) equivalent molecular weight with gel permeation chromatography (GPC).

Examples of the method for producing the fluoride-polymer include, however not to be limited to, a radical-polymerization or a cation-polymerization employing a vinyl group and an anion-polymerization, and among them, a radical-polymerization is preferred since it is common. Known radical thermal or radical photo polymerization initiators may be used in the process for producing the fluoride-polymer. Especially, radical thermal polymerization initiators are preferred. It is noted that a radical thermal polymerization is a compound capable of generating radicals when being heated at a decomposition temperature or a higher temperature than it. Examples of the radical thermal polymerization include diacyl peroxides such as acetyl peroxide or benzoyl peroxide; ketone peroxides such as methyl ethyl ketone peroxide or cyclohexanone peroxide; hydro peroxides such as hydrogen peroxide, tert-butylhydro peroxide or cumenehydro peroxide; dialkyl peroxides such as di-tert-butylperoxide, dicumyl peroxide or dilauroyl peroxide; peroxy esters such as tert-butylperoxy acetate or tert-butylperoxy pivalate; azo-based compounds such as azo bis iso-butylonitrile or azo bis iso-valeronitrile and persulfates such as ammonium persulfate, sodium persulfate or potassium persulfate. A single polymerization initiator may be used, or plural types of polymerization initiators may be used in combination.

The radical polymerization may be carried out according to any process such as an emulsion polymerization, dispersion polymerization, a bulk polymerization or a solution polymerization process. One of the typical radical polymerization may be carried out according to a solution polymerization, and is more specifically described below. The details of other polymerization processes are as same as those described below, and for details, it is possible to refer to "Experimental Methods of Polymer Science (Kohbunshi kagaku jikkenn-hoh)" published by TOKYO KAGAKU DOZIN CO., LTD. in 1981 or the like.

For solution polymerization, at least one organic solvent is used. The organic solvent can be selected from any organic solvents which never limit the purpose or the effect of the present invention. Organic solvents are usually understood as an organic compound having a boiling point of 50 to 200° C. at atmosphere pressure, and among them, organic compounds capable of dissolving the components uniformly are preferred. Preferred examples of the organic solvent include alcohols such as isopropanol or butanol; ethers such as dibutyl ether, ethylene glycol dimethyl ether, tetrahydrofuran or dioxane; ketones such as acetone, methyl ethyl ketone, methyl isobutyl ketone or cyclohexanone; esters such as ethyl acetate, butyl acetate, amyl acetate or γ-butyrolactone; aromatic hydrocarbons such as benzene, toluene or xylene. A single organic solvent may be used, or plural types of the organic solvents may be used in combination. Mixed solvents which are prepared by mixing at least one organic solvent and water may also used from the view point of solubility of monomers to be used or polymers to be produced.

The solution polymerization may be carried out, however not to be limited to, at a temperature of 50 to 200° C. for a time of 10 to 30 minutes. Inert gas purge is desirably performed before or while carrying out the solution polymerization to avoid deactivation of the generated radicals. Nitrogen gas is usually used as an inert gas.

Radical polymerization with at least one chain transfer agent is useful for producing fluoride-polymers having a proper molecular weight. Examples of the chain transfer agent include mercaptans such as octyl mercaptan, decyl mercaptan, dodecyl mercaptan, tert-dodecyl meracptan, octadecyl mercaptan, thiophenol or p-nonyl thiophenol; polyhalogenated alkyls such as carbon tetrachloride, chloroform, 1,1,1-trichloroethane or 1,1,1-tribromo octane; and low-activity monomers such as a-methyl styrene or a-methyl styrene dimer. Among these, $C_{4-16}$ mercaptans are preferred. The amount of the chain transfer agent to be used should be precisely controlled depending on an activity thereof, a type of monomer to be used or polymerization conditions, and is usually, however not to be limited to, 0.01 to 50 mole %, desirably from 0.05 to 30 mole % and much more desirably from 0.08 to 25 mole % with respect to total moles of the monomers to be used. The timing or the method of addition of the chain transfer agent is not to be limited subjected to presence of the chain transfer agent in a polymerization system with at least one monomer to be controlled its polymerization degree during polymerization process. The chain transfer agent may be added by dissolving in the monomer, or in other words in the same time as addition of the monomer, or separately from the addition of the monomer.

Examples of the fluoride-polymer which can be used desirably in the first embodiment include, however not to be limited to, those shown below. Numerical values in formulae shown below mean wt % of each monomer, and Mw in formulae shown below mean PS-equivalent weight-average molecular weight measured by GPC. In the formulae, "a", "b", "c", "d" and the like mean weight ratios.

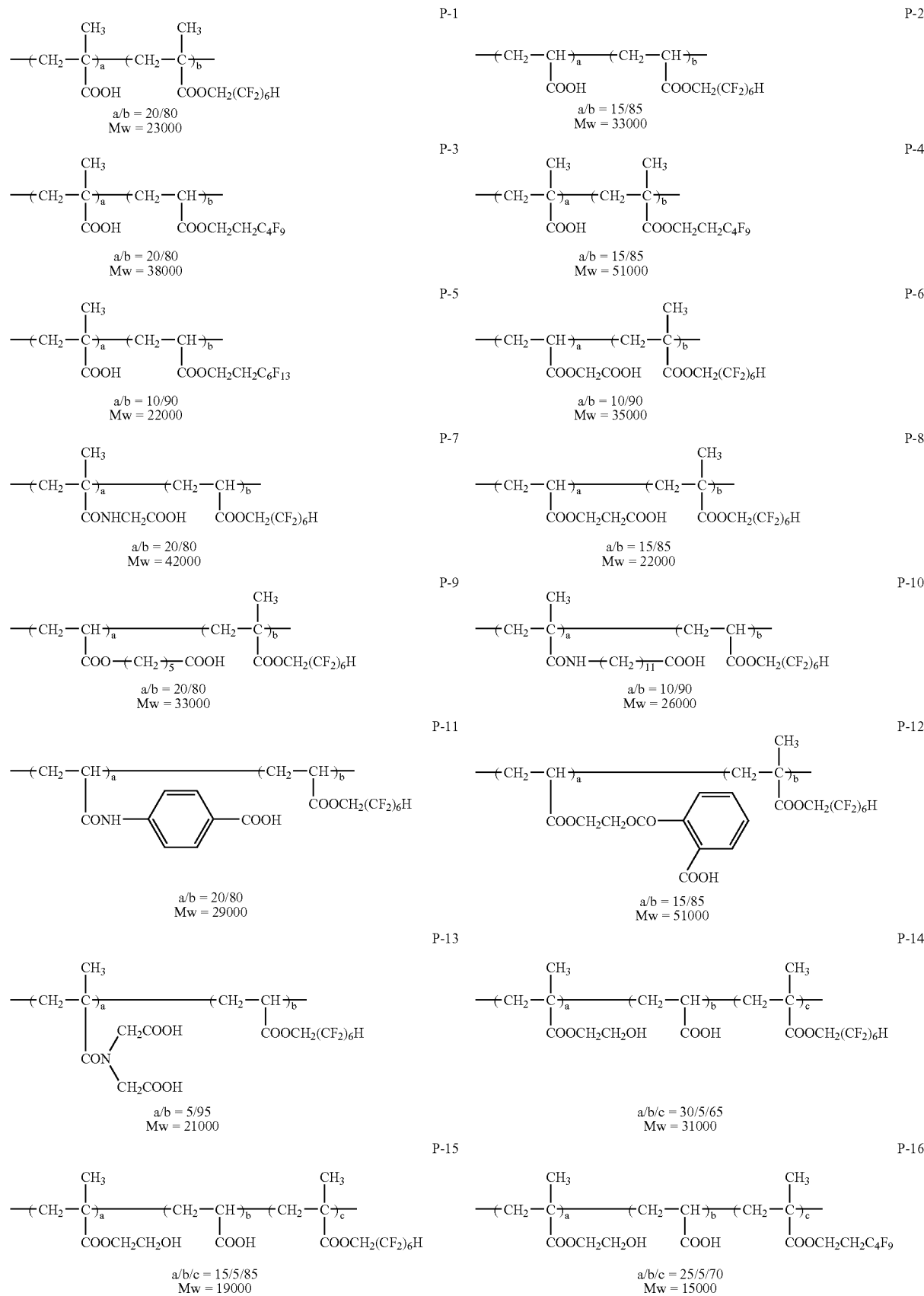

-continued
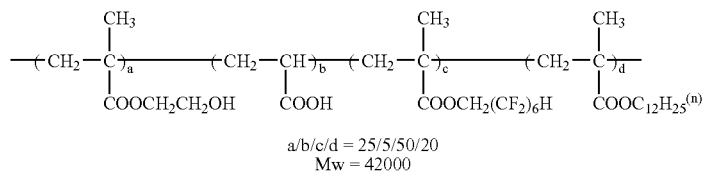
P-17
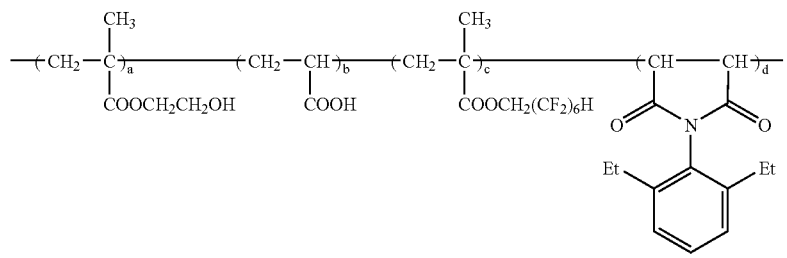
P-18
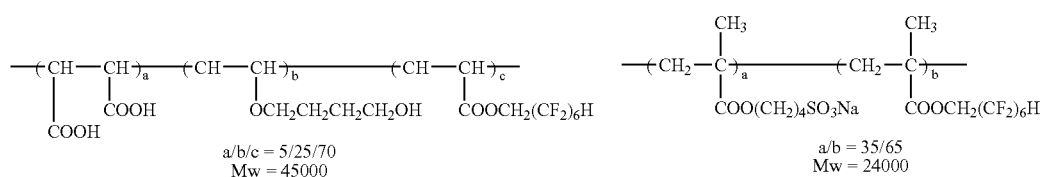
P-19    P-20
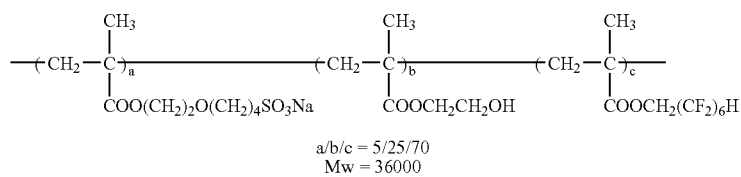
P-21
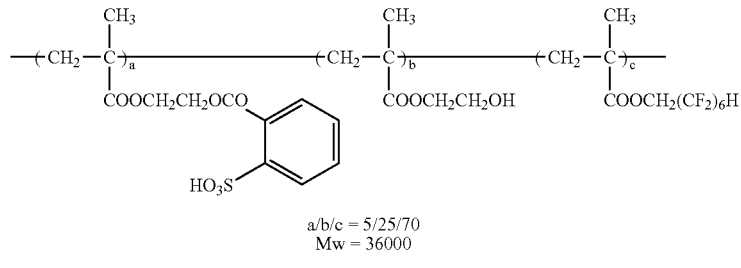
P-22
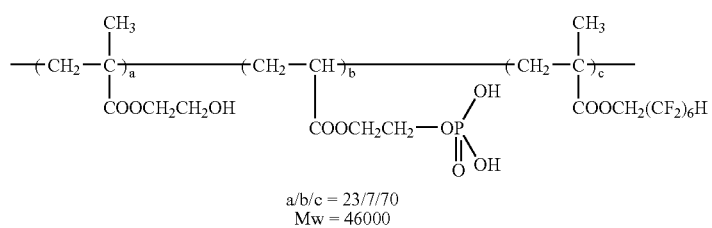
P-23

-continued
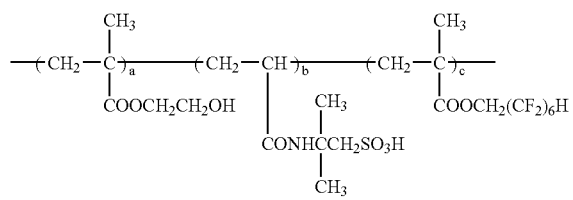
P-24
a/b/c = 29/1/70
Mw = 30000
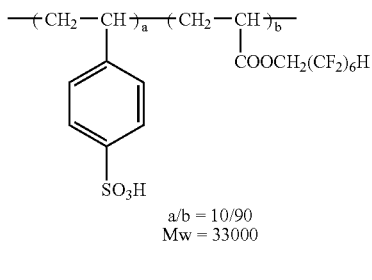
P-25
a/b = 10/90
Mw = 33000
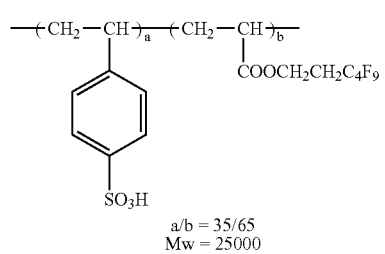
P-26
a/b = 35/65
Mw = 25000
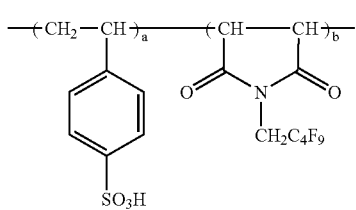
P-27
a/b = 50/50
Mw = 26000
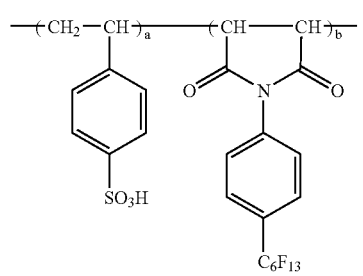
P-28
a/b = 50/50
Mw = 30000
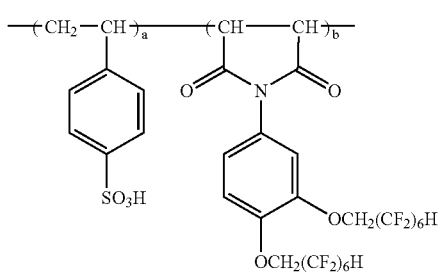
P-29
a/b = 50/50
Mw = 21000
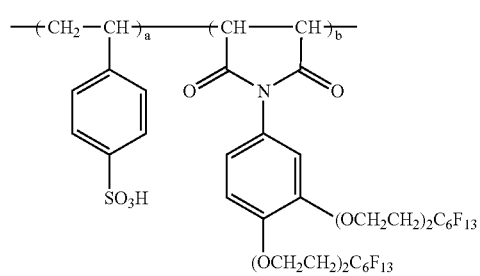
P-30
a/b = 50/50
Mw = 18000
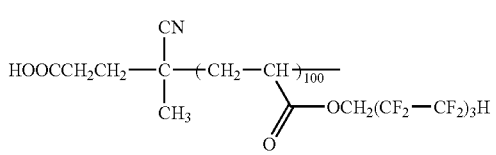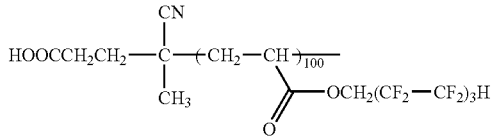
P-31
Mw 15000
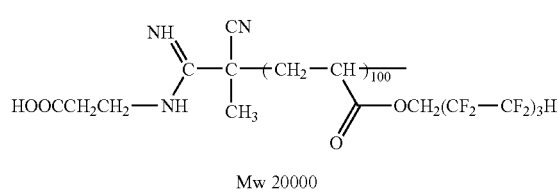
P-32
Mw 20000
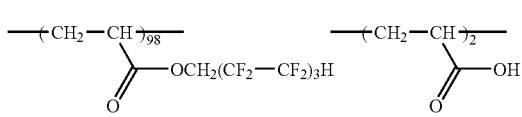
P-33
Mw 25000
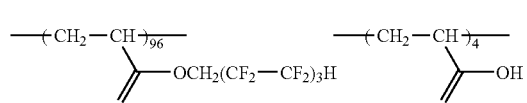
P-34
Mw 20000
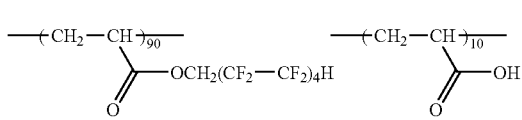
P-35
Mw 13000

-continued
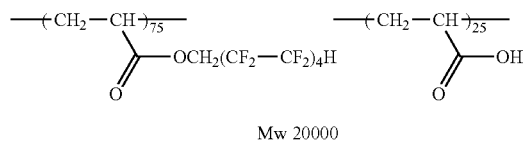 P-36
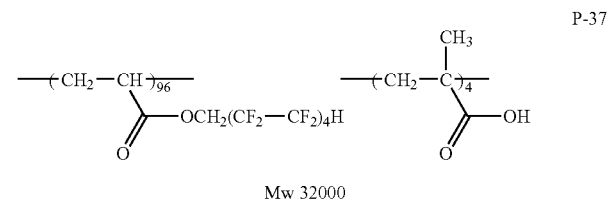 P-37
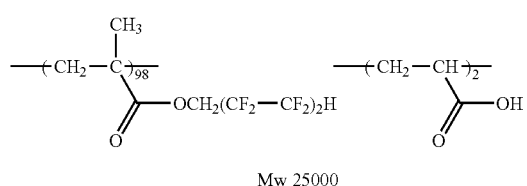 P-38
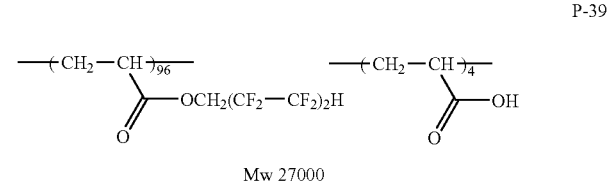 P-39
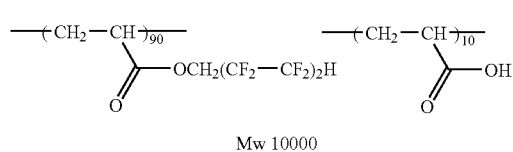 P-40
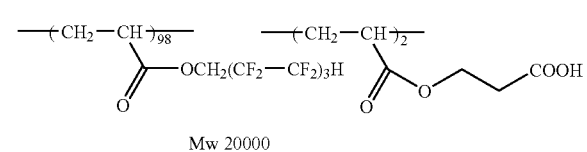 P-41
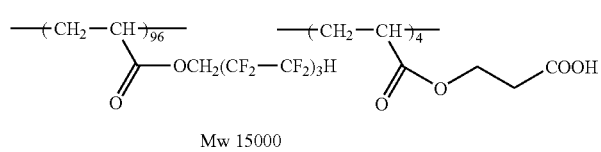 P-42
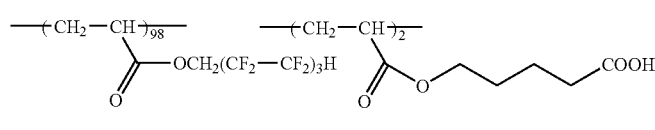 P-43
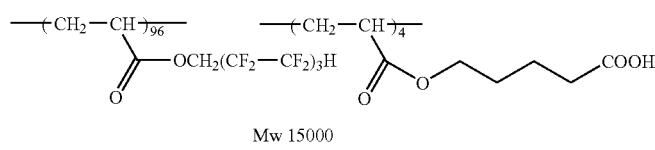 P-44
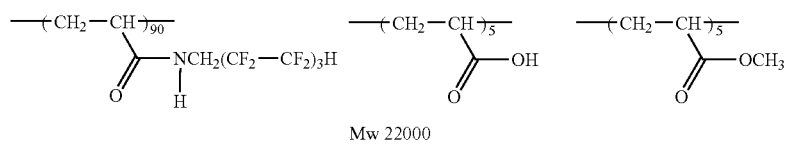 P-45
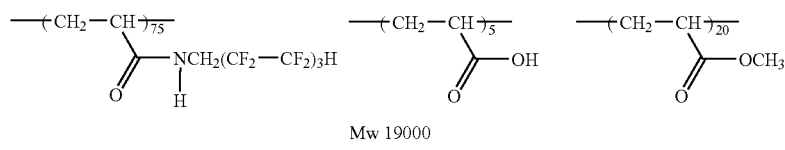 P-46
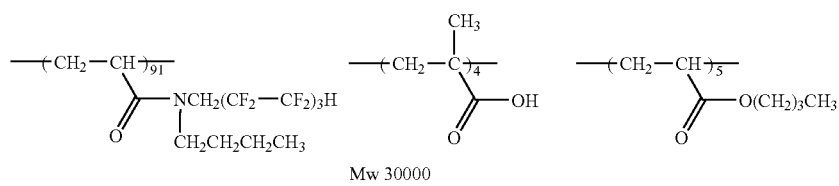 P-47

-continued
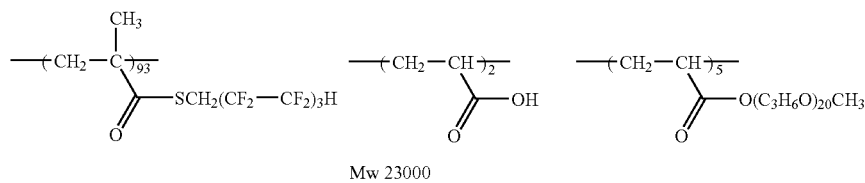
P-48
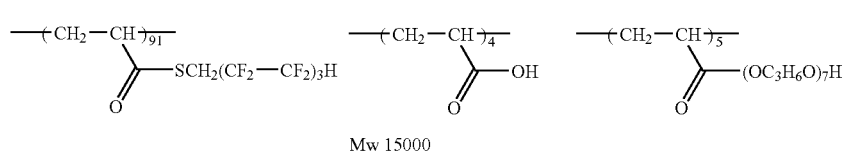
P-49
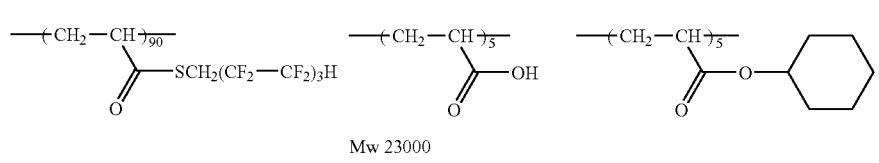
P-50
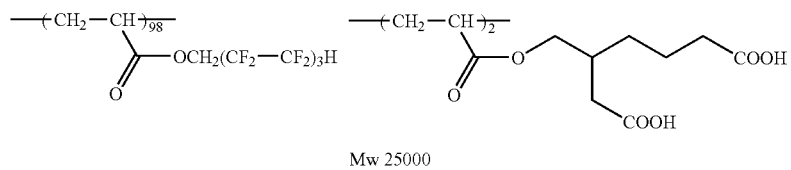
P-51
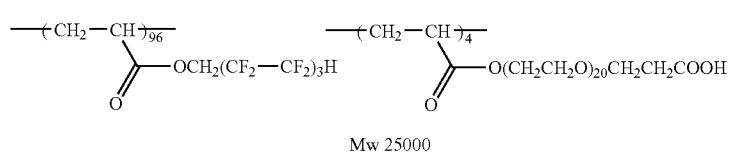
P-52
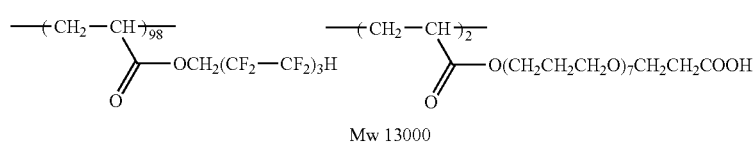
P-53
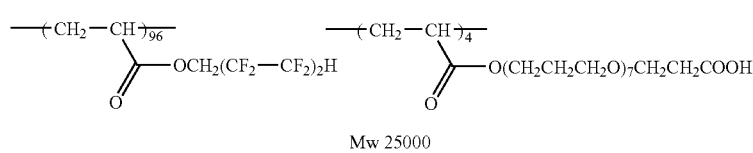
P-54
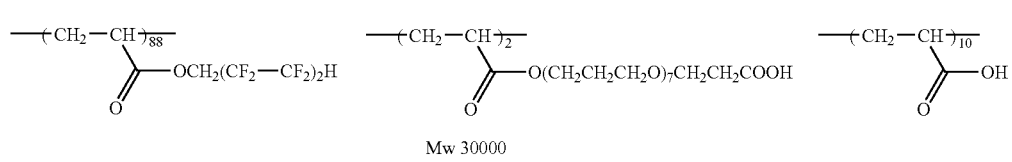
P-55
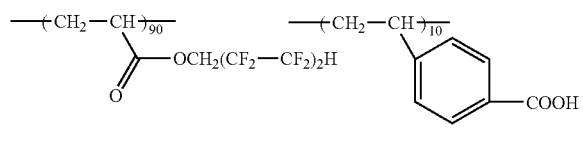
P-56
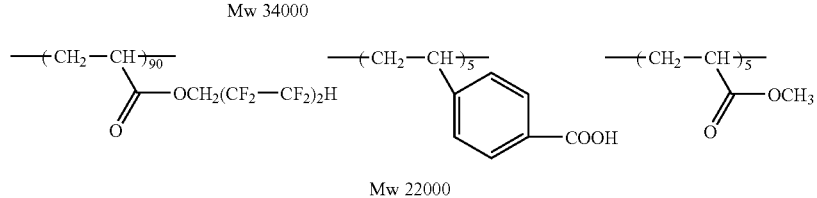
P-57

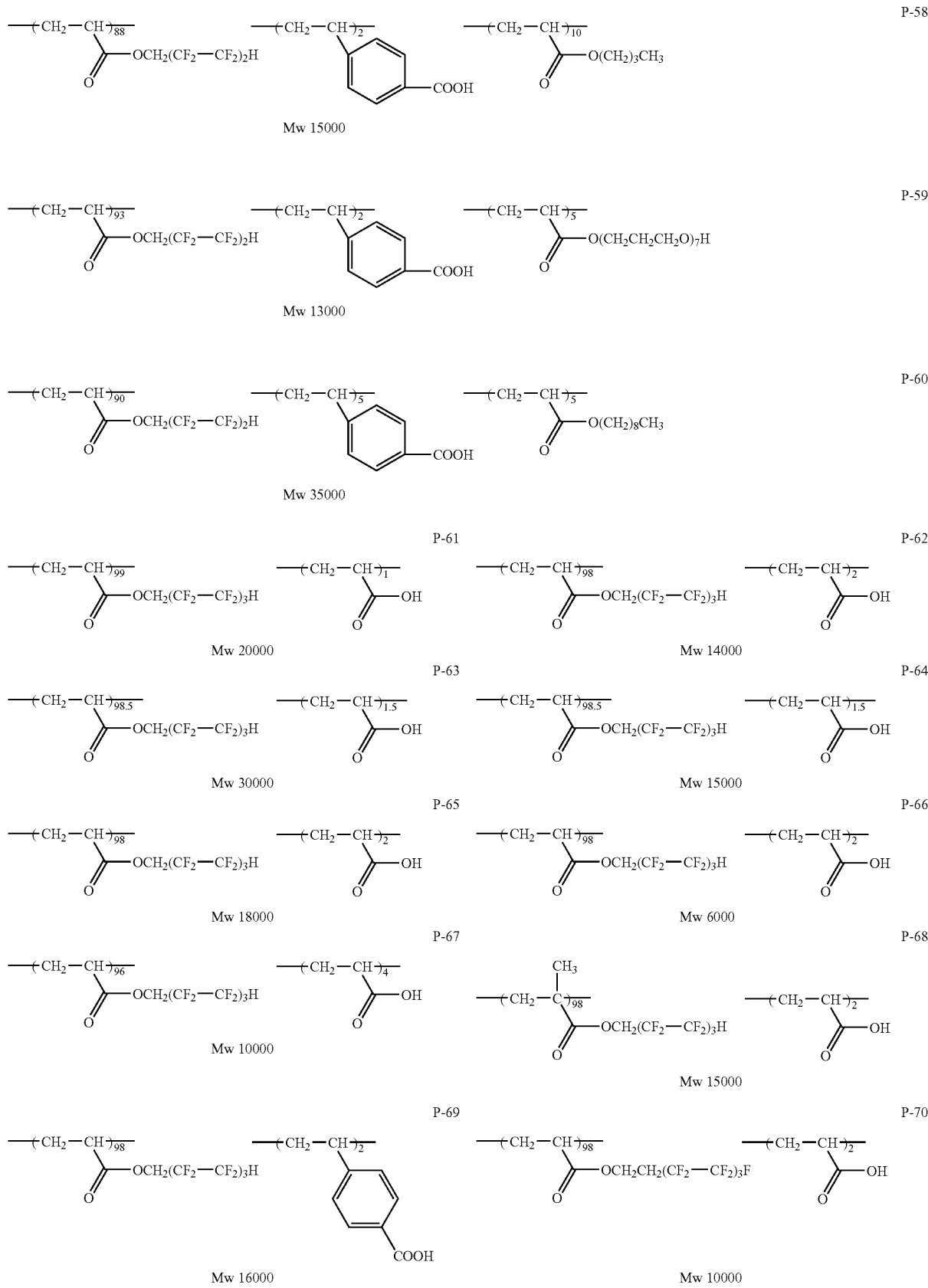

According to the first embodiment, the composition may comprise plural types of the fluoride-polymers. The composition desirably further comprise a polymer having a fluoro-aliphatic group. The polymer having a fluoro-aliphatic group is desirably selected from polymers comprising a repeating unit derived from a monomer represented by a formula (A) shown below.

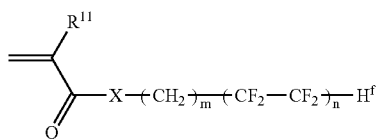

Formula (A)

In the formula (A), $R^{11}$ is hydrogen or methyl, X is an oxygen, a sulfur or —N($R^{12}$)— ($R^{12}$ represents a hydrogen atom or a $C_{1-4}$ alkyl group, and desirably a hydrogen atom or a methyl group), $H^f$ represents a hydrogen atom or a fluorine atom, m is an integer from 1 to 6 and n is an integer from 2 to 4.

The preferred scope of the formula (A) is as same as that of the formula (A1), and examples of the monomer represented by the formula (A) include F1 to F70 exemplified above.

The polymer comprising a repeating unit derived from a monomer, having a fluoro-aliphatic group, represented by the formula (A) further desirably comprises at least one repeating unit derived from a monomer represented by a formula (B) shown below.

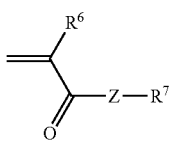

Formula (B)

In the formula (B), $R^6$ is hydrogen or methyl, Z represents a divalent linking group, $R^7$ represents an optionally substituted poly(alkylenoxy) group or an optionally substituted linear, branched or cyclic $C_{1-20}$ alkyl group.

The preferred scope of the formula (B) is as same as that of the formula (B1), and examples of the monomer represented by the formula (B) include A1 to A150 exemplified above.

The polymer having a fluoro-aliphatic group may comprise plural repeating units derived from the monomers represented by the formula (A), plural repeating units derived from the monomers represented by the formula (B) or at least one other repeating unit. Examples of the other repeating unit include repeating units derived from the monomers selected from the Monomer Group (1) to (8) described above.

Examples of the polymer, comprising the repeating unit having a fluoro-aliphatic group derived from the monomer represented by the formula (A), which can be used with the fluoride-polymer in the first embodiment, include, however not to be limited to, those shown below.

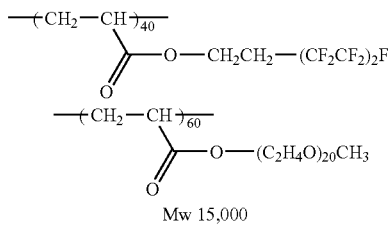
Mw 15,000

X-1

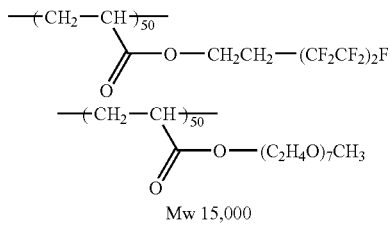
Mw 15,000

X-2

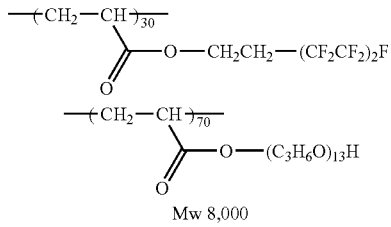
Mw 8,000

X-3

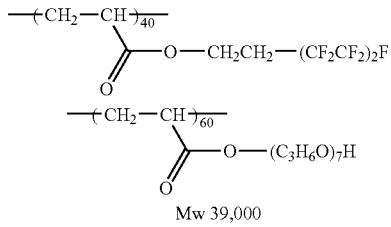
Mw 39,000

X-4

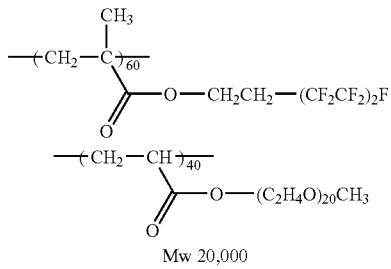
Mw 20,000

X-5

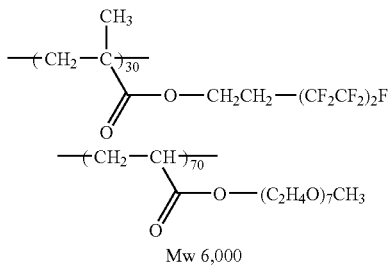
Mw 6,000

X-6

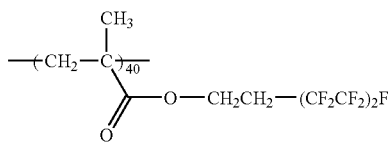

X-7

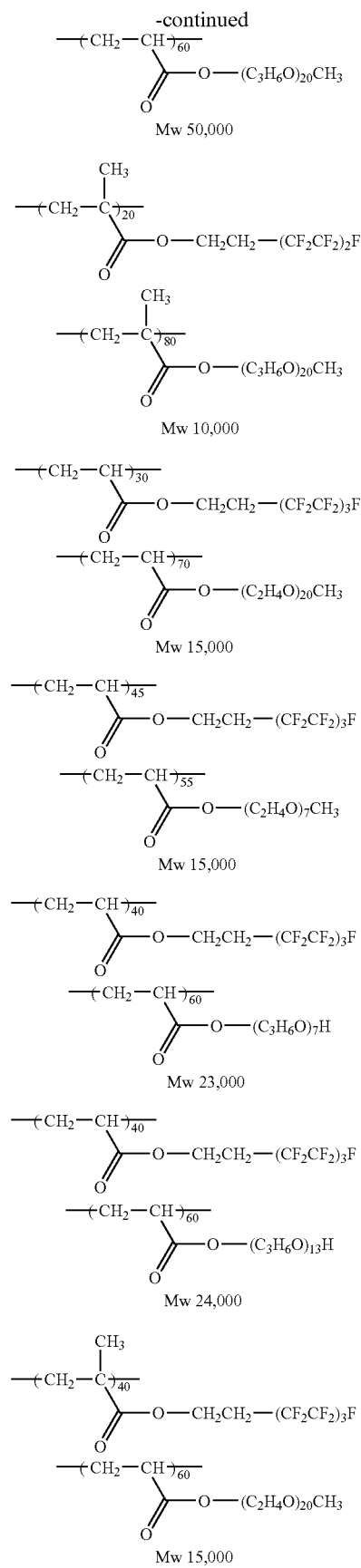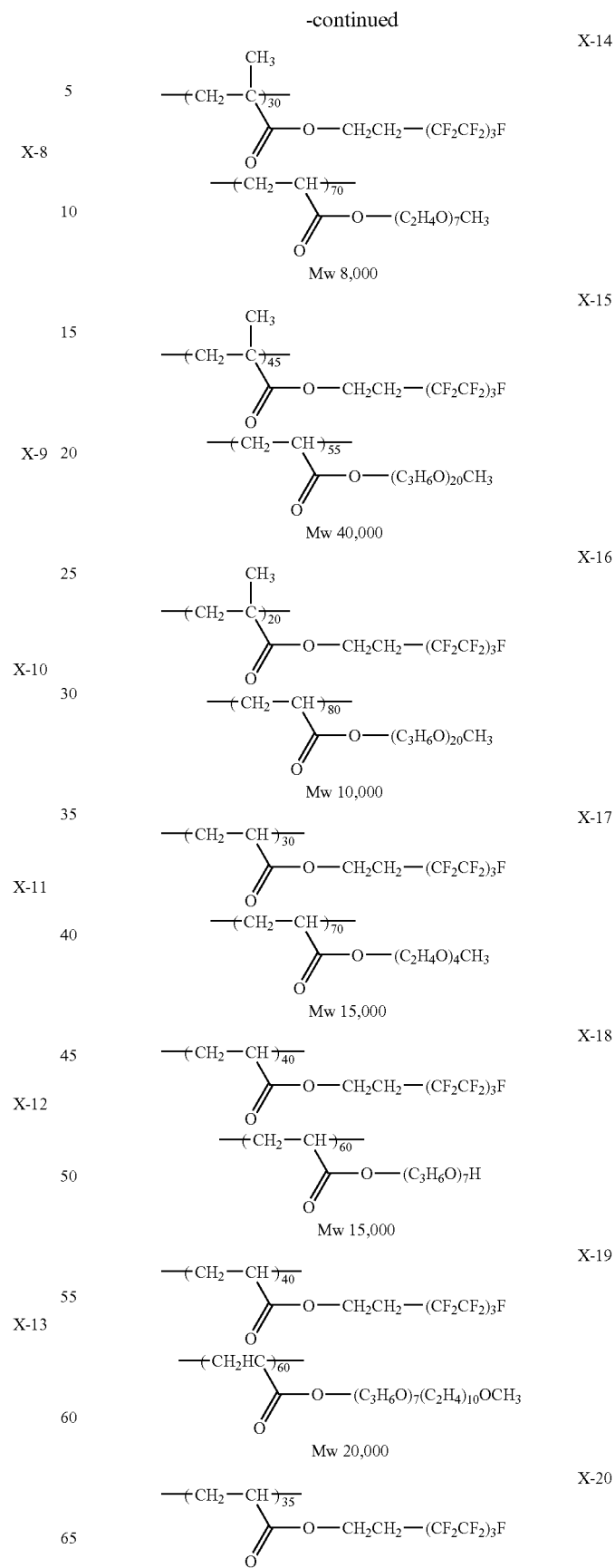

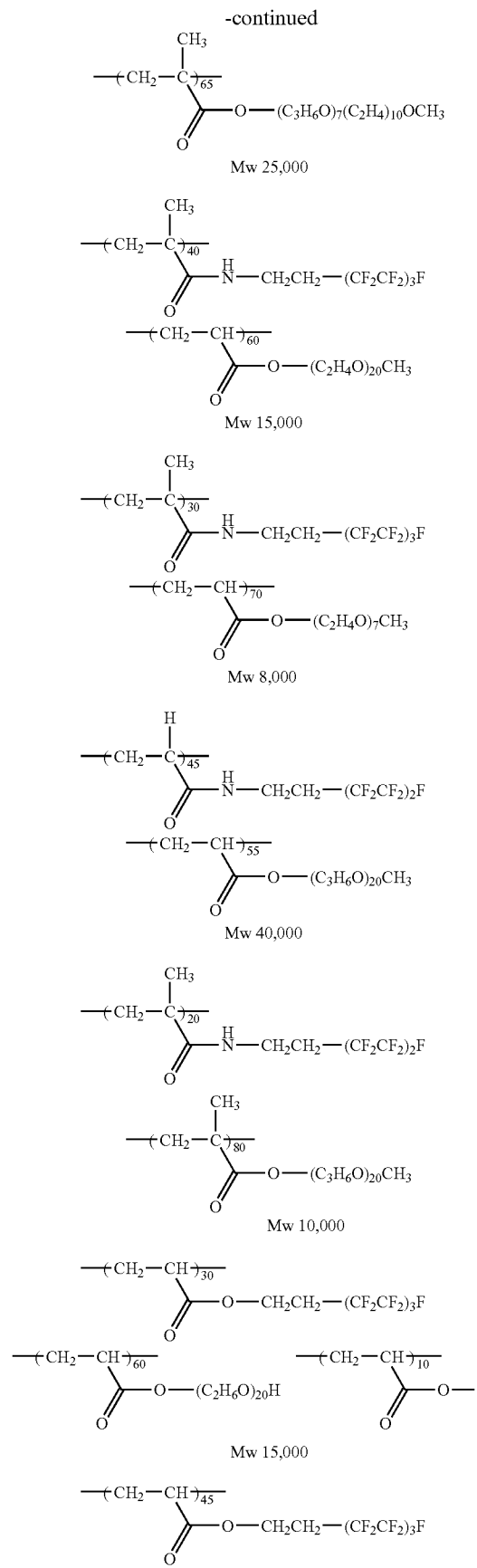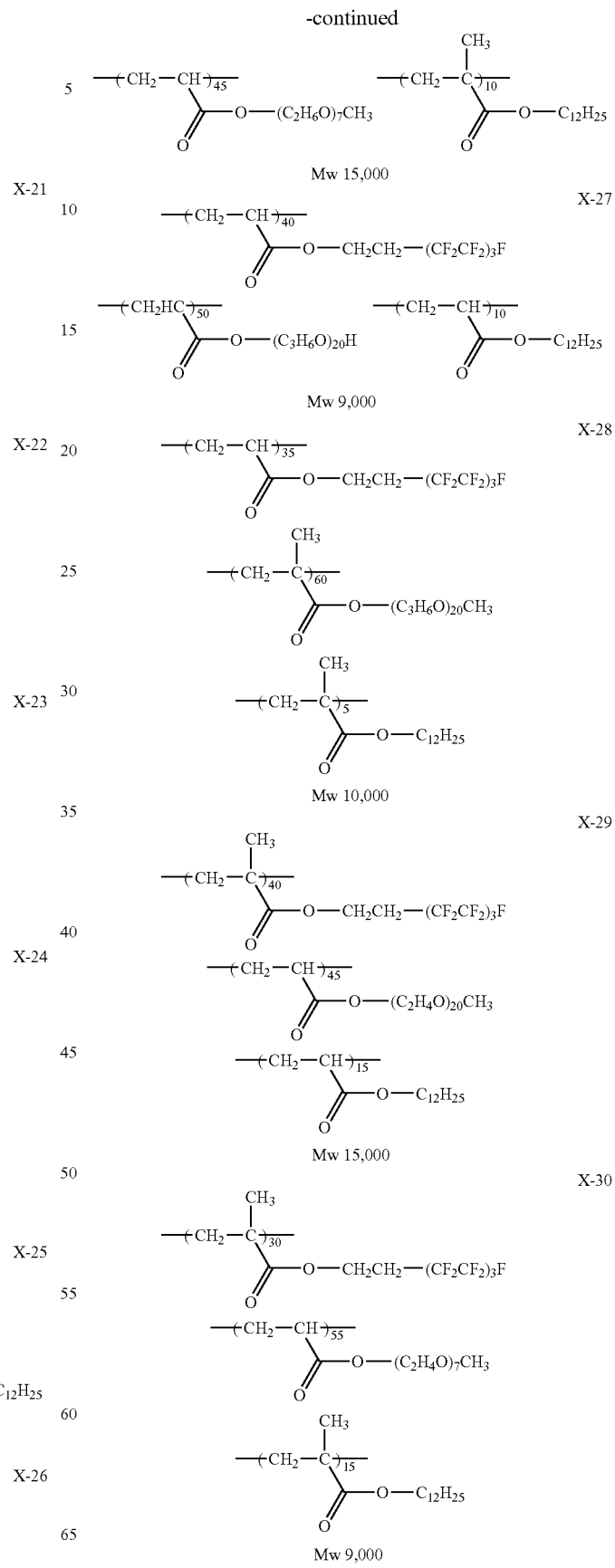

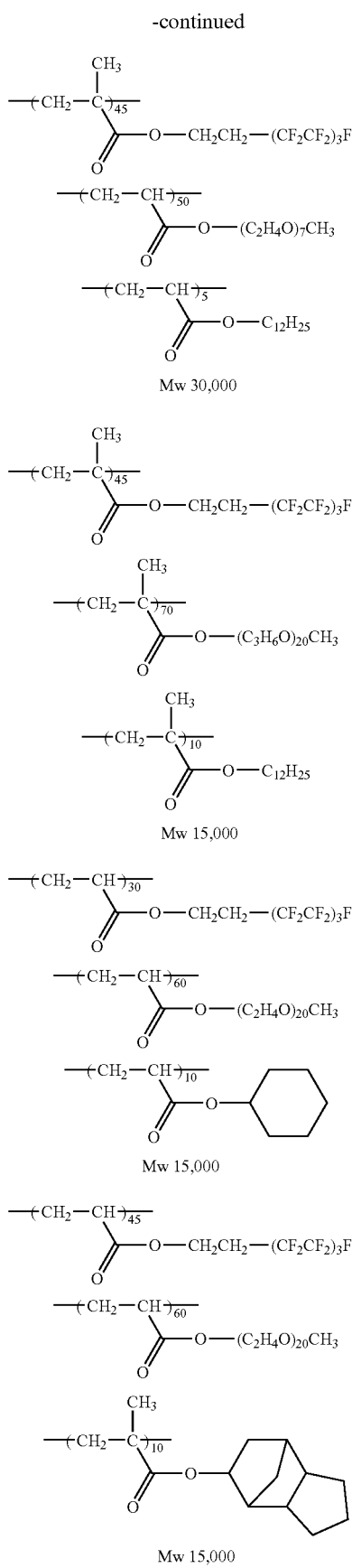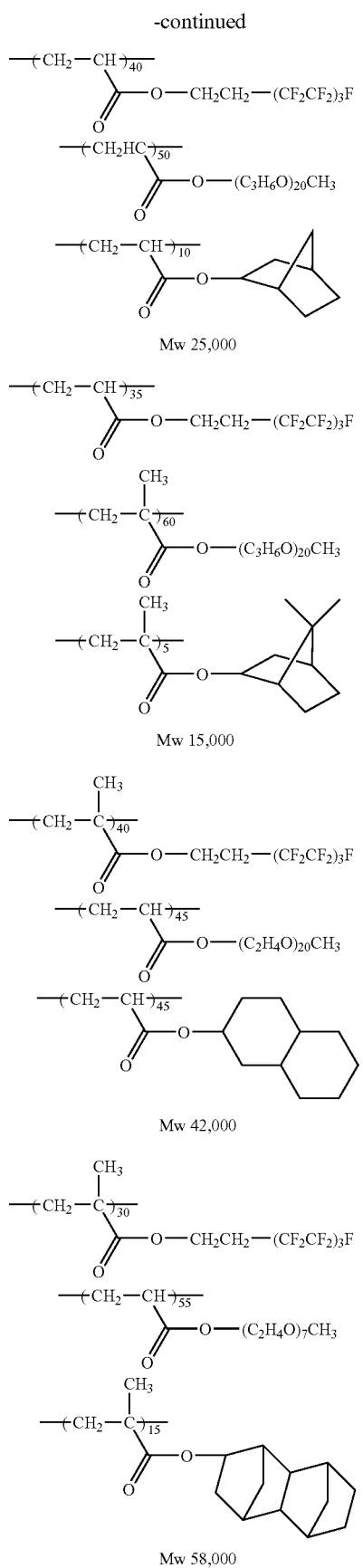

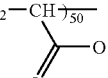

-continued $\mathrm{-(CH_2-C(CH_3))_{20}-C(=O)-O-CH_2CH_2-(CF_2CF_2)_2F}$ $\mathrm{-(CH_2-C(CH_3))_{70}-C(=O)-O-(C_3H_6O)_{20}CH_3}$ $\mathrm{-(CH_2-C(CH_3))_{10}-C(=O)-O-cyclohexyl}$ Mw 7,000

$\mathrm{-(CH_2-CH)_{15}-C(=O)-O-CH_2-(CF_2CF_2)_3F}$ $\mathrm{-(CH_2-CH)_{15}-C(=O)-O-CH_2-(CF_2CF_2)_2F}$ $\mathrm{-(CH_2-CH)_{70}-C(=O)-O-(C_2H_4O)_7H}$ Mw 15,000

$\mathrm{-(CH_2-CH)_{40}-C(=O)-O-(CH_2)_2-(CF_2CF_2)_3F}$ $\mathrm{-(CH_2-CH)_{30}-C(=O)-O-CH_2-(CF_2CF_2)_2F}$ $\mathrm{-(CH_2-CH)_{30}-C(=O)-O-(C_2H_4O)_7CH_3}$ Mw 15,000

$\mathrm{-(CH_2-CH)_{30}-C(=O)-O-(CH_2)_2-(CF_2CF_2)_3F}$ $\mathrm{-(CH_2HC)_{40}-C(=O)-O-(C_3H_6O)_7H}$ $\mathrm{-(CH_2-CH)_{30}-C(=O)-O-(C_2H_4O)_7H}$ Mw 32,000

$\mathrm{-(CH_2-CH)_{20}-C(=O)-O-(CH_2)_2-(CF_2CF_2)_3F}$

X-48

$\mathrm{-(CH_2-C(CH_3))_{75}-C(=O)-O-(C_3H_6O)_{20}CH_3}$   $\mathrm{-(CH_2-C(CH_3))_{5}-C(=O)-O-H}$ Mw 8,000

X-53

$\mathrm{-(CH_2-C(CH_3))_{40}-C(=O)-O-CH_2CH_2-(CF_2CF_2)_3F}$ $\mathrm{-(CH_2-CH)_{60}-C(=O)-O-(C_2H_4O)_{20}H}$ Mw 22,000

X-54

$\mathrm{-(CH_2-C(CH_3))_{30}-C(=O)-N(C_4H_9)-CH_2CH_2-(CF_2CF_2)_3F}$ $\mathrm{-(CH_2-CH)_{55}-C(=O)-O-(C_2H_4O)_7CH_3}$   $\mathrm{-(CH_2-C(CH_3))_{15}-C(=O)-NH_2}$ Mw 42,000

X-55

$\mathrm{-(CH_2-CH)_{35}-C(=O)-O-CH_2CH_2-(CF_2CF_2)_2F}$ $\mathrm{-(CH_2-CH)_{50}-C(=O)-O-(C_3H_6O)_{20}CH_3}$ $\mathrm{-(CH_2-CH)_{15}-C(=O)-O-CH_2CH(C_2H_5)C_4H_9}$ Mw 24,000

X-56

$\mathrm{-(CH_2-C(CH_3))_{20}-C(=O)-O-CH_2CH_2-(CF_2CF_2)_2F}$ $\mathrm{-(CH_2-C(CH_3))_{70}-C(=O)-O-(C_3H_6O)_{20}CH_3}$

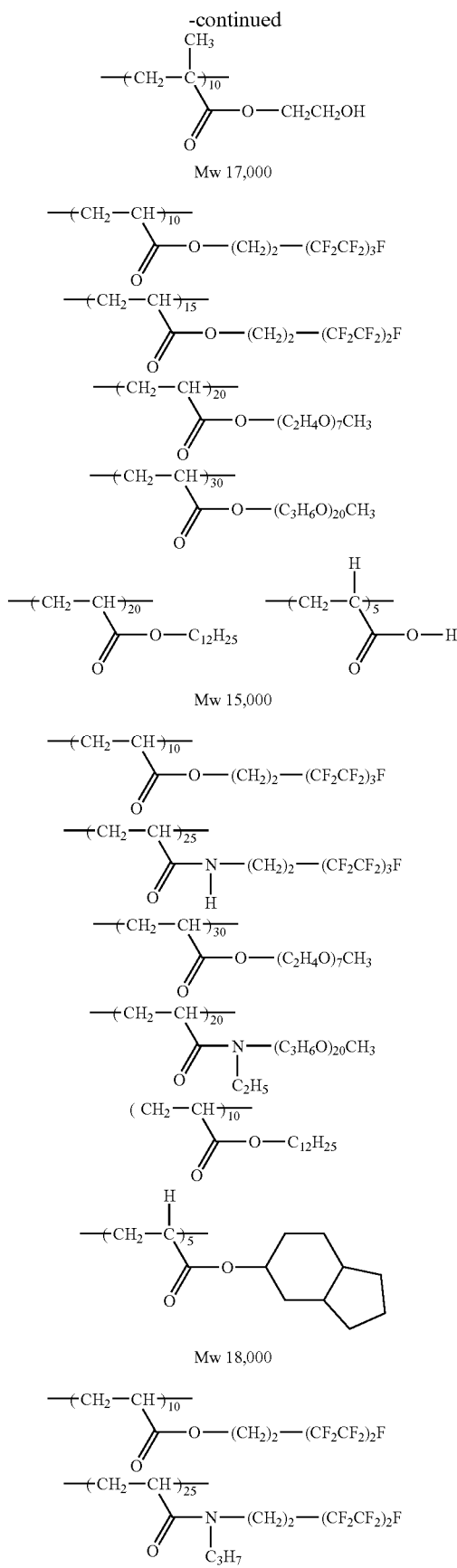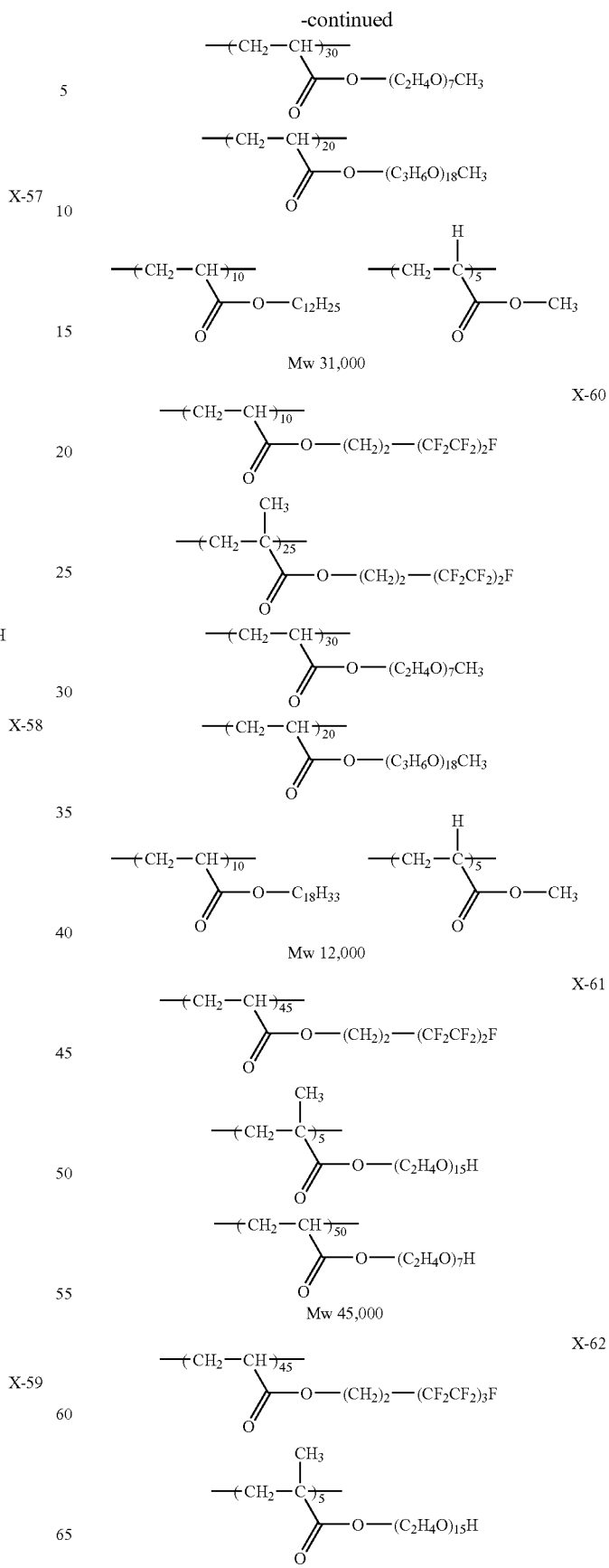

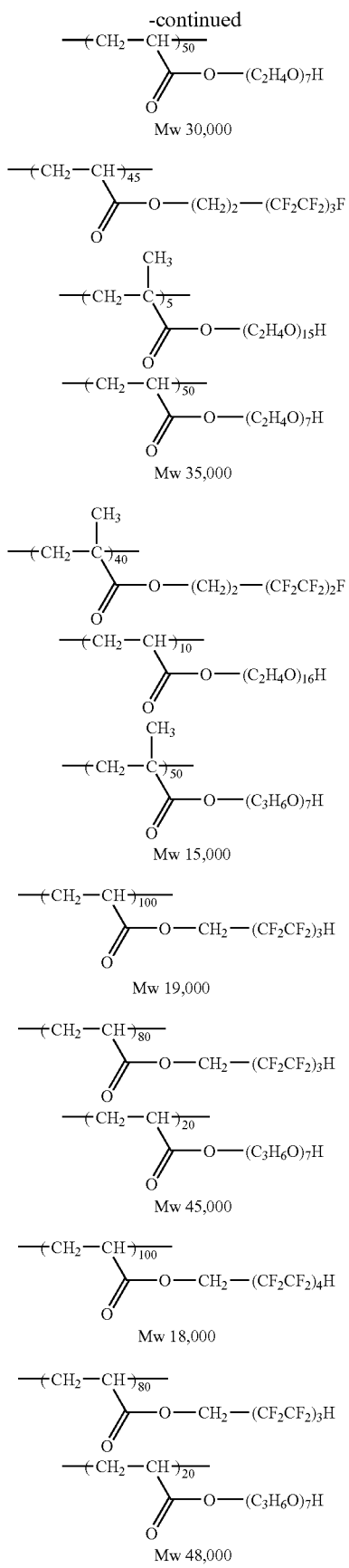

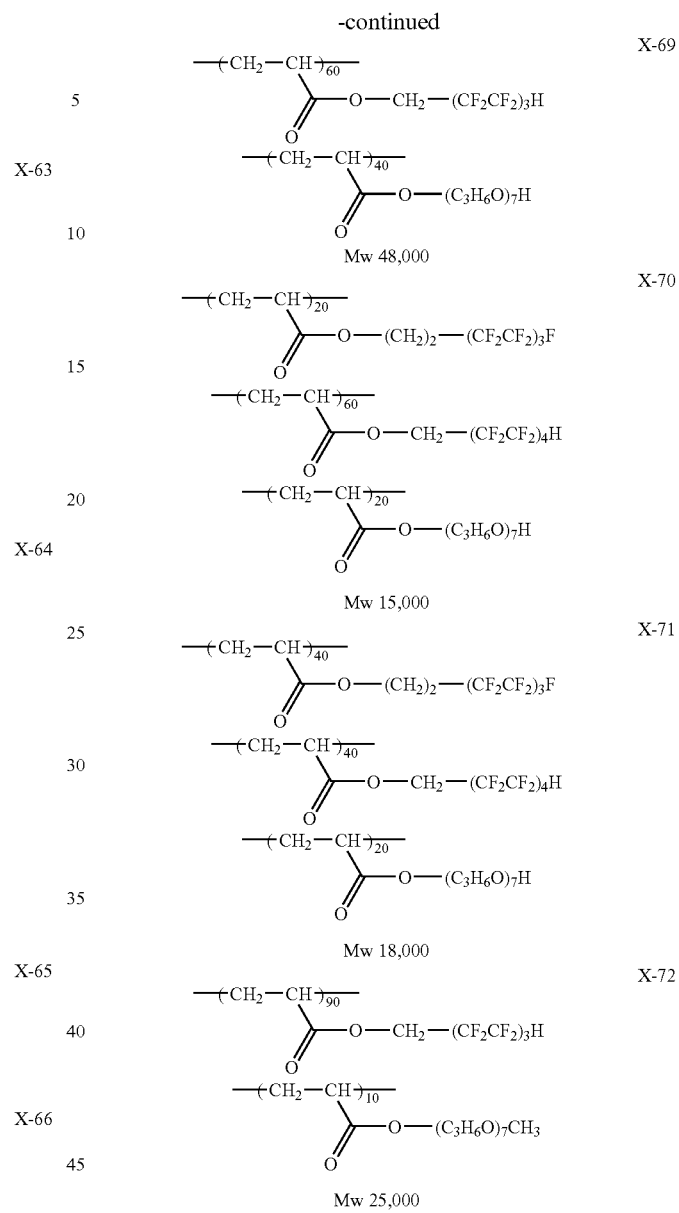

The fluoride-polymer which can be employed in the first embodiment may be produced according to any known process as described above. For example, the fluoride-polymer may be produced by carrying out polymerization of a monomer having a fluoro-aliphatic group and a monomer having a hydrophilic group in an organic solvent in the presence of a common radical polymerization initiator. Other addition-polymerizable compounds, if necessary, may be further added, and then, the polymerization may be carried out in the same manner. It is useful for obtaining a polymer having a uniform constitution to carry out polymerization while adding dropwise at least one monomer and at least one polymerization initiator from the view point of polymerization activity of each monomer.

The polymer, which can be optionally employed in the first embodiment, comprising the repeating unit having a fluoro-aliphatic group derived from the monomer represented by the formula (A) may be produced in the same manner.

Fluoride-Polymer Employed in the Second Embodiment

According to the second embodiment, a composition comprising at least one liquid crystal compound; and a polymer having a hydrophilic group selected from a carboxyl group (—COOH), a sulfo group (—SO₃H), a phosphono group {—PO(OH)₂} and salts thereof, and a fluoro-aliphatic group, wherein the hydrophilic group binds to an end of a main chain of the polymer with a covalent bonding; is used for producing an optically anisotropic layer. The fluoride-polymer used in the second embodiment is selected from polymers having the hydrophilic group interacting with a terminal of a main chain of the polymer.

According to the second embodiment, the fluoride-polymer is added to the optically anisotropic layer to thereby align liquid-crystal molecules stably. Especially, when the molecules are oriented in a hybrid-alignment state, it is possible to increase the tilt angle at an air-interface. Accordingly, optical films, which can optically compensate a liquid-crystal cell effectively, can be produced stably. And when a composition comprising the fluoride-polymer is applied to a surface of a substrate, it is possible to reduce occurrences of unevenness ("mura") or cissing ("hajiki"), and thus it is possible to produce optical films stably even if they have a large area to be used for a large liquid-crystal display. A liquid-crystal display employs the optical film of the second embodiment, even if the display is large, it can display images having a high-quality without lowering the quality due to unevenness ("mura") or cissing ("hajiki") developing in production of the film.

Next, the fluoride-polymer, which can be used in the second embodiment, will be explained in detail.

The fluoride-polymer have at least one hydrophilic group which is selected from the group consisting of a carboxyl group (—COOH), a sulfo group (—SO₃H), a phosphono group {—PO(OH)₂} and salts thereof. According to the second embodiment, the fluoride-polymer is desirably selected from polymers prepared by polymerization using at least one polymerization initiator having the above hydrophilic group, and more desirably selected from polymers prepared by polymerization using at least one polymerization initiator having a carboxylic group.

Examples of the method for producing the fluoride-polymer include, however not to be limited to, a radical-polymerization or a cation-polymerization employing a vinyl group and an anion-polymerization, and among them, a radical-polymerization is preferred since it is common. Known radical thermal or radical photo polymerization initiators may be used in the process for producing the fluoride-polymer. Especially, radical thermal polymerization initiators are preferred. It is noted that a radical thermal polymerization is a compound capable of generating radicals when being heated at a decomposition temperature or a higher temperature than it. Examples of the radical thermal polymerization include diacyl peroxides such as acetyl peroxide or benzoyl peroxide; ketone peroxides such as methyl ethyl ketone peroxide or cyclohexanone peroxide; hydro peroxides such as hydrogen peroxide, tert-butylhydro peroxide or cumenehydro peroxide; dialkyl peroxides such as di-tert-butylperoxide, dicumyl peroxide or dilauroyl peroxide; peroxy esters such as tert-butylperoxy acetate or tert-butylperoxy pivalate; azo-based compounds such as azo bis iso-butylonitrile or azo bis iso-valeronitrile and persulfates such as ammonium persulfate, sodium persulfate or potassium persulfate. Polymerization initiators having at least one hydrophilic group selected from the group consisting of a carboxyl group (—COOH), a sulfo group (—SO₃H), a phosphono group {—PO(OH)₂} and salts thereof, are preferred. When the polymerization initiator having the hydrophilic group is used, it is possible to introduce the hydrophilic group at the main chain-terminal of the polymer. A single polymerization initiator may be used, or plural types of polymerization initiators may be used in combination.

Examples of the polymerization initiator having at least one hydrophilic group selected from the group include, however not to be limited to, compounds shown below.

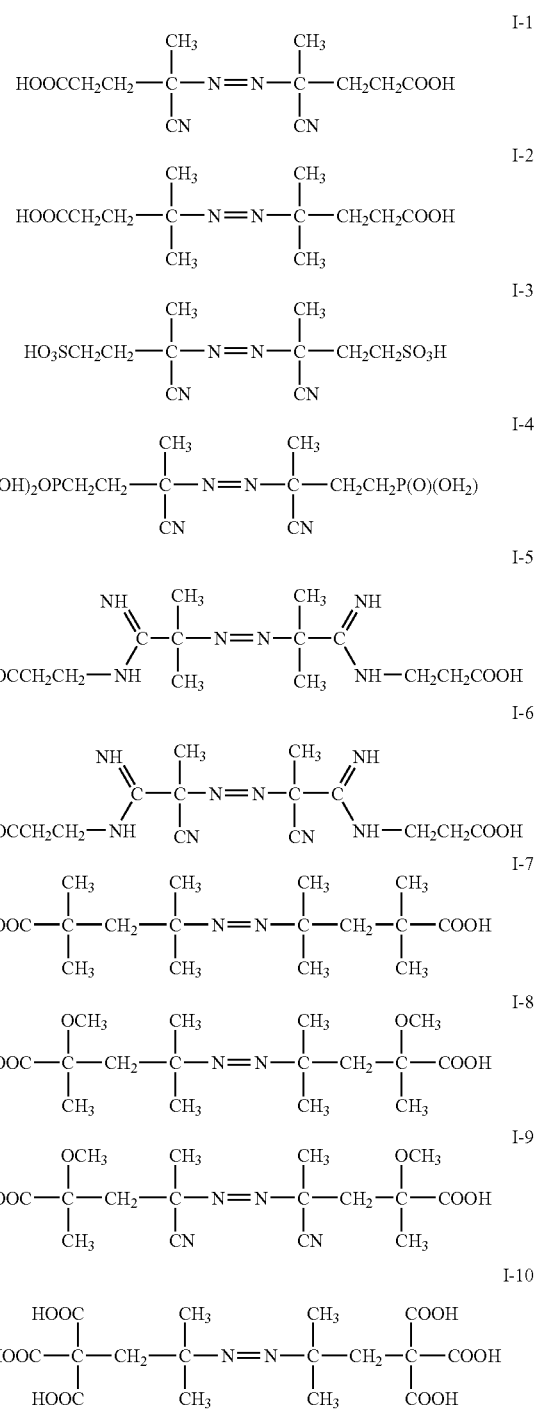

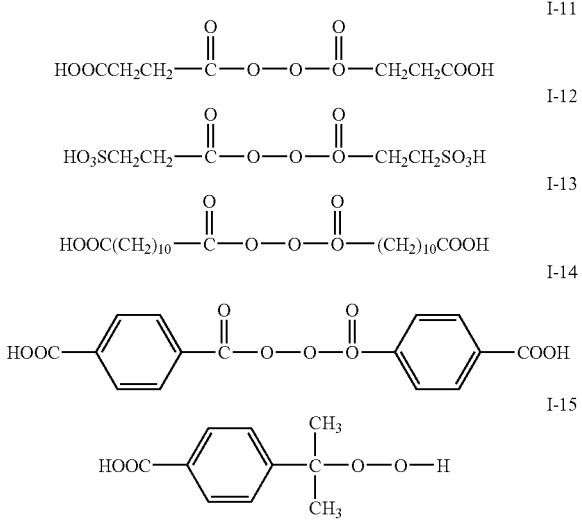

The fluoride-polymer, which can be used in the second embodiment, preferably comprises at least one repeating unit derived from the monomer represented by the formula (A1) exemplified above as a monomer of the fluoride-polymer which can be used in the first embodiment. It is noted that the preferred scope and examples of the formula (A1) are same as those described for the first embodiment.

The fluoride-polymer may further comprise a repeating unit derived from a monomer other than the represented by the formula (A1). The other monomer, which can give the other repeating unit, is desirably selected from the monomers represented by the formula (B1) exemplified above as a monomer of the fluoride-polymer which can be used in the first embodiment. It is noted that the preferred scope and examples of the formula (B1), examples of the process for producing the compound represented by the formula (B1) and examples of commercial items are same as those described for the first embodiment.

According to the second embodiment, the amount of the fluoro-aliphatic monomer is desirably not smaller than 50 wt %, more desirably not smaller than 70 wt % and much more desirably not smaller than 80 wt % with respect to the total weight of the monomers of the fluoride-polymer. And when the monomer represented by the formula (A1) is used, the amount of the monomer represented by the formula (A1) is desirably not smaller than 50 wt %, more desirably not smaller than 70 wt % and much more desirably not smaller than 80 wt % with respect to the total weight of the monomers of the fluoride-polymer.

The weight-average molecular weight (Mw) of the fluoride-polymer to be used in the second embodiment is desirably from 1,000 to 1,000,000, more desirably from 1,000 to 500,000 and much more desirably from 1,000 to 100,000. The Mw can be measured as a polystyrene (PS) equivalent molecular weight with gel permeation chromatography (GPC).

Examples of the method for producing the fluoride-polymer include, however not to be limited to, a radical-polymerization or a cation-polymerization employing a vinyl group and an anion-polymerization, and among them, a radical-polymerization is preferred since it is common. The radical polymerization may be carried out according to any process such as an emulsion polymerization, dispersion polymerization, a bulk polymerization or a solution polymerization process. One of the typical radical polymerization may be carried out according to a solution polymerization, and is more specifically described below. The details of other polymerization processes are as same as ehose described below, and for details, it is possible to refer to "Experimental Methods of Polymer Science (Kohbunshi kagaku jikkenn-hoh)" published by TOKYO KAGAKU DOZIN CO., LTD. in 1981 or the like.

For solution polymerization, at least one organic solvent is used. The organic solvent can be selected from any organic solvents which never limit the purpose or the effect of the present invention. Organic solvents are usually understood as an organic compound having a boiling point of 50 to 200° C. at atmosphere pressure, and among them, organic compounds capable of dissolving the components uniformly are preferred. Preferred examples of the organic solvent include alcohols such as isopropanol or butanol; ethers such as dibutyl ether, ethylene glycol dimethyl ether, tetrahydrofuran or dioxane; ketones such as acetone, methyl ethyl ketone, methyl isobutyl ketone or cyclohexanone; esters such as ethyl acetate, butyl acetate, amyl acetate or γ-butyrolactone; aromatic hydrocarbons such as benzene, toluene or xylene. A single organic solvent may be used, or plural types of the organic solvents may be used in combination. Mixed solvents which are prepared by mixing at least one organic solvent and water may also used from the view point of solubility of monomers to be used or polymers to be produced.

The solution polymerization may be carried out, however not to be limited to, at a temperature of 50 to 200° C. for a time of 10 to 30 minutes. Inert gas purge is desirably performed before or while carrying out the solution polymerization to avoid deactivation of the generated radicals. Nitrogen gas is usually used as an inert gas.

Radical polymerization with at least one chain transfer agent is useful for producing fluoride-polymers having a proper molecular weight. Examples of the chain transfer agent include mercaptans such as octyl mercaptan, decyl mercaptan, dodecyl mercaptan, tert-dodecyl meracptan, octadecyl mercaptan, thiophenol or p-nonyl thiophenol; polyhalogenated alkyls such as carbon tetrachloride, chloroform, 1,1,1-trichloroethane or 1,1,1-tribromo octane; and low-activity monomers such as a-methyl styrene or a-methyl styrene dimer. Among these, $C_{4-16}$ mercaptans are preferred. The amount of the chain transfer agent to be used should be precisely controlled depending on an activity thereof, a type of monomer to be used or polymerization conditions, and is usually, however not to be limited to, 0.01 to 50 mole %, desirably from 0.05 to 30 mole % and much more desirably from 0.08 to 25 mole % with respect to total moles of the monomers to be used. The timing or the method of addition of the chain transfer agent is not to be limited subjected to presence of the chain transfer agent in a polymerization system with at least one monomer to be controlled its polymerization degree during polymerization process. The chain transfer agent may be added by dissolving in the monomer, or in other words in the same time as addition of the monomer, or separately from the addition of the monomer.

Examples of the fluoro-aliphatic copolymer, which is desirably used in the second embodiment, include, however not to be limited to, those described below. Numerical values in formulae shown below mean wt % of each monomer, and Mw in formulae shown below mean PS equivalent weight-average molecular weight measured by GPC.

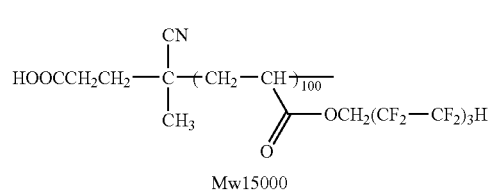 Q-1
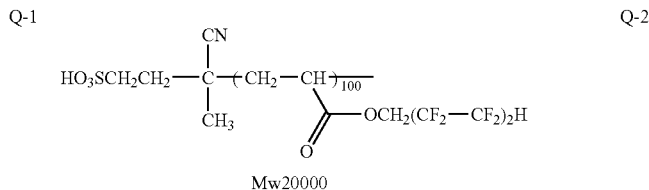 Q-2
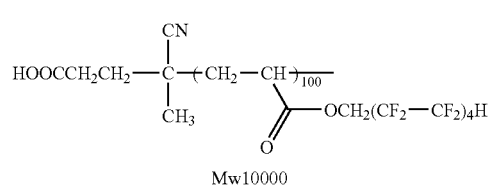 Q-3
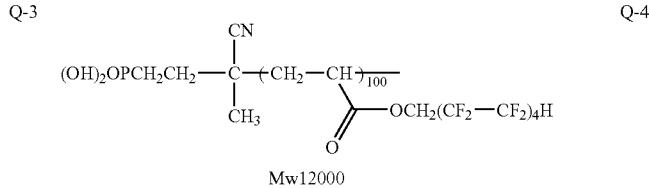 Q-4
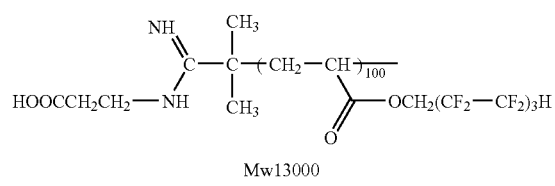 Q-5
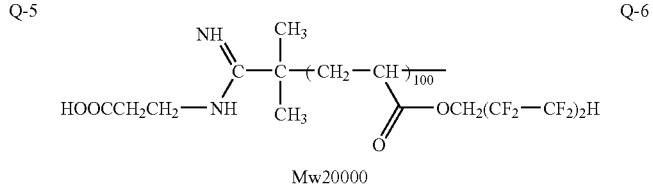 Q-6
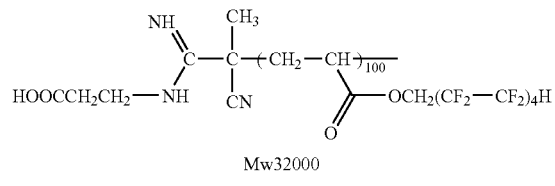 Q-7
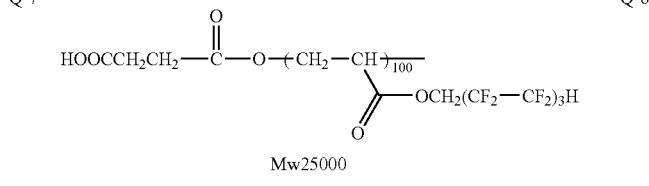 Q-8
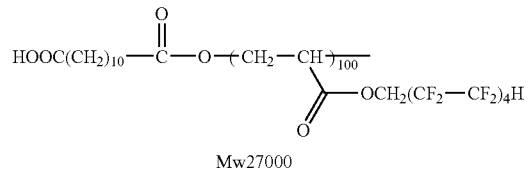 Q-9
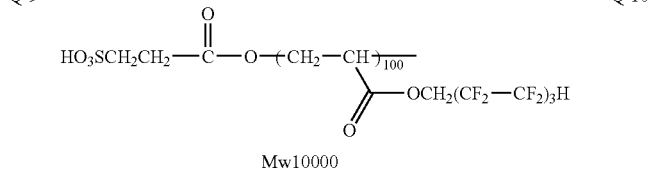 Q-10
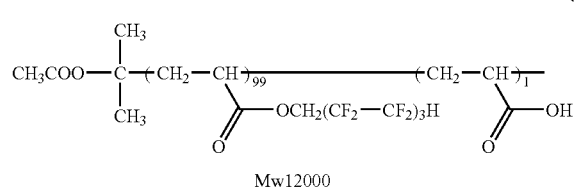 Q-11
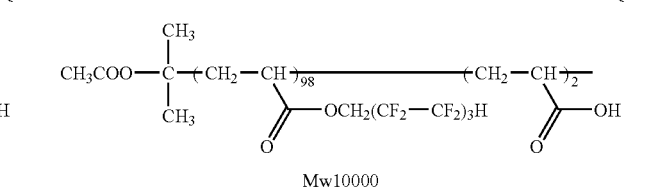 Q-12
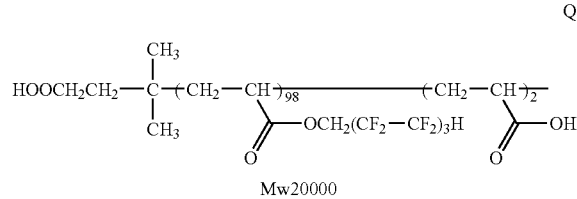 Q-13
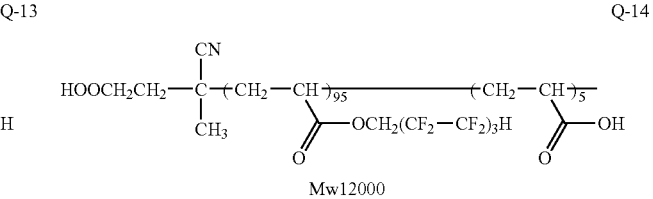 Q-14
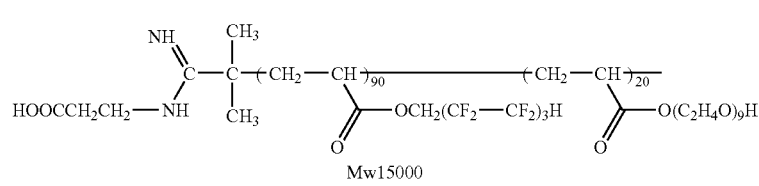 Q-15

-continued
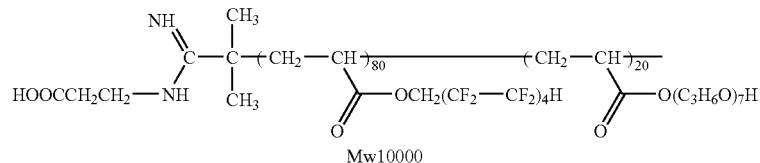
Q-16
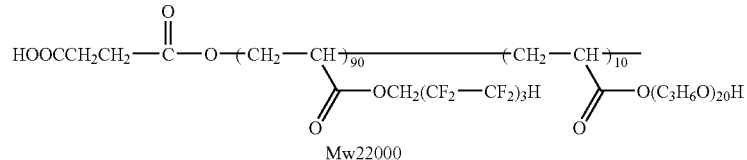
Q-17
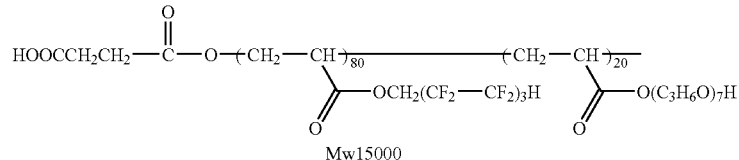
Q-18
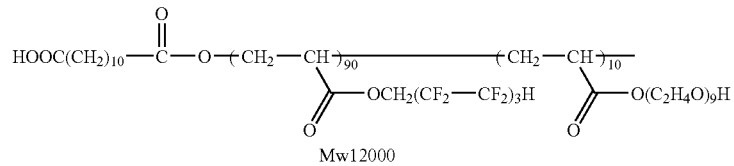
Q-19
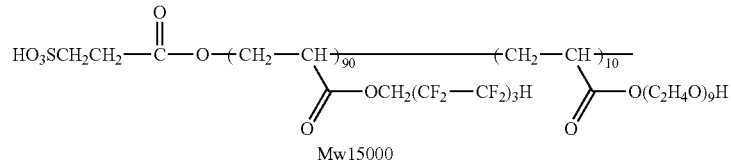
Q-20
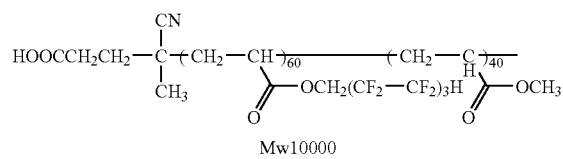
Q-21
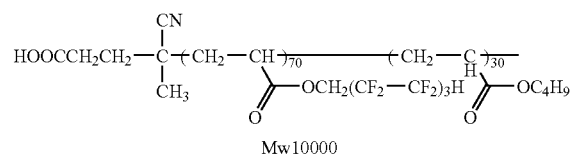
Q-22
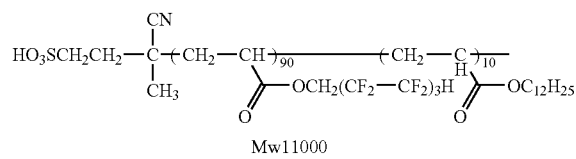
Q-23
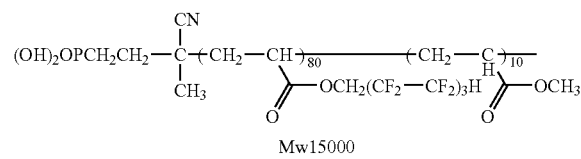
Q-24
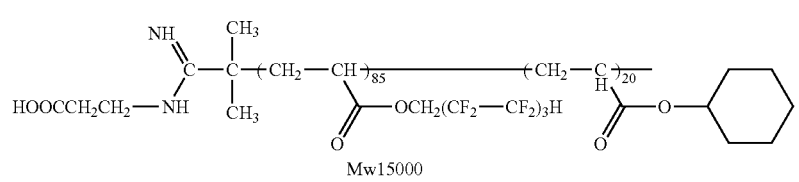
Q-25

-continued

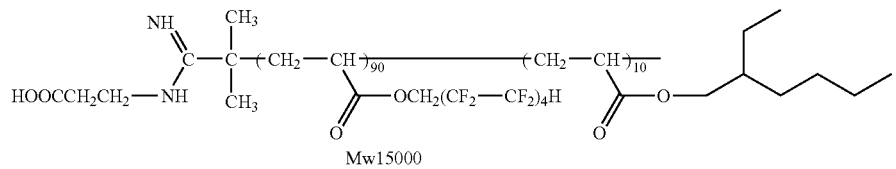
Q-26

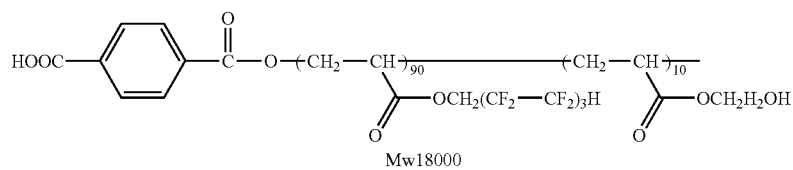
Q-27

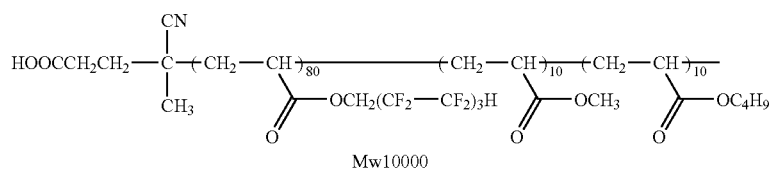
Q-28

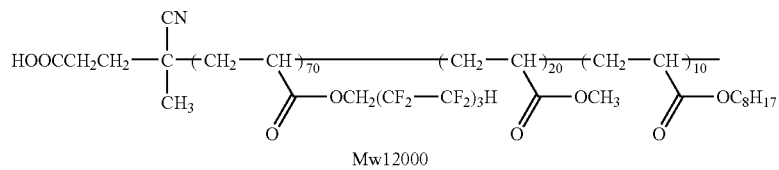
Q-29

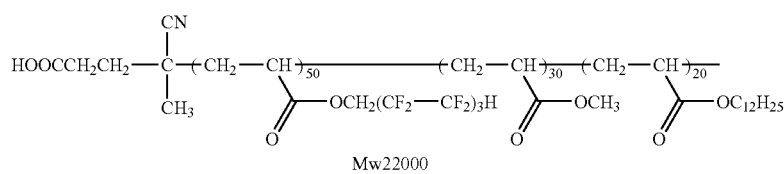
Q-30

The fluoride-polymer, which can be employed in the second embodiment, may be produced according to any known process. For example, the fluoride-polymer may be produced by carrying out polymerization of a monomer having a fluoro-aliphatic group and, if necessary, a monomer such as the monomer represented by the formula (B1) in an organic solvent in the presence of a radical polymerization initiator having at least one hydrophilic group selected form the group. Other addition-polymerizable compounds, if necessary, may be further added, and then, the polymerization may be carried out in the same manner. It is useful for obtaining a polymer having a uniform constitution to carry out polymerization while adding dropwise at least one monomer and at least one polymerization initiator from the view point of polymerization activity of each monomer.

According to the first or second embodiment, the amount of the fluoride-polymer is not limited, and the amount may be decided such that the fluoride-polymer can contribute to aligning liquid-crystal molecules stably or to lowering occurrences of unevenness ("mura") or cissing ("hajiki"). The fluoride-polymer can brig about such effects even if the amount of the fluoride-polymer to be added is small, and, generally, the amount of the fluoride-polymer is desirably from 0.005 to 8 wt %, more desirably from 0.01 to 5 wt % and much more desirably from 0.05 to 2.5 wt % with respect to the total weight of the composition (when the composition is a solution, the solvent is excluded) for producing the optically anisotropic layer. When the amount of the fluoride-polymer falls within the above scope, substantial effects may be obtained without lowering a drying property of the coating layer, and, thus, an optical film having uniform optical properties such as retardation.

The optical film of the present invention can be produced according to a process comprising a step of forming an optically anisotropic layer by applying a composition, comprising a liquid crystal compound, a fluoride-polymer and, if necessary, other additives, to an alignment layer to align molecules of the liquid-crystal compound. The optically anisotropic layer shows an optically anisotropic property brought about by the alignment of the liquid-crystal molecules.

Next, materials, which can be used for producing the optically anisotropic layer of the optical film, other than the fluoride-polymer described above, will be described in detail.

[Liquid Crystal Compound]

According to the present invention, examples of the liquid crystal compound, which can be employed in an optically anisotropic layer, include rod-like liquid crystal compounds and discotic liquid crystal compounds. The liquid crystal compound may be selected from high-molecular weight or low-molecular weight liquid crystals. The liquid crystal compound is not required to have a liquid-crystalinity after forming the optically anisotropic layer, in which the molecules of the low-molecular-weight liquid crystal compound are crosslinked.

The liquid crystal compound is desirably selected from discotic liquid crystal compounds.

Examples of the rod-like liquid crystal compound include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles. Examples of the rod-like liquid crystal compounds further include metal complexes of liquid crystal compounds. Liquid crystal polymers having one or more repeating units including a rod-like liquid crystal structure can also be used in the present invention. Namely, the rod-like crystal compounds bonded to a polymer may be use in the present invention. Rod-like liquid crystal compounds are described in fourth, seventh and eleventh chapters of "Published Quarterly Chemical Review vol. 22 Chemistry of Liquid Crystals (Ekisho no Kagaku)" published in 1994 and edited by Japan Chemical Society; and in third chapter of "Handbook of liquid Crystal Devices (Ekisyo Debaisu Handobukku)" edited by the 142 th committee of Japan Society for the Promotion of Science. The rod-like crystal compounds desirably have a birefringence index of 0.001 to 0.7. The rod-like crystal compounds desirably have one or more polymerizable groups for fixing themselves in an alignment state. Examples of the rod-like crystal compounds are described from on line 7 of p. 50 to on last line of p. 57 in WO01/88574A1.

Examples of discotic liquid-crystal compounds include benzene derivatives described in "Mol. Cryst.", vol. 71, page 111 (1981), C. Destrade et al; truxane derivatives described in "Mol. Cryst.", vol. 122, page 141 (1985), C. Destrade et al. and "Physics lett. A", vol. 78, page 82 (1990); cyclohexane derivatives described in "Angew. Chem.", vol. 96, page 70 (1984), B. Kohne et al.; and macrocycles based aza-crowns or phenyl acetylenes described in "J. Chem. Commun.", page 1794 (1985), M. Lehn et al. and "J. Am. Chem. Soc.", vol. 116, page 2,655 (1994), J. Zhang et al. Examples of the discotic liquid crystal compounds also include compounds having a discotic core and substituents, radiating from the core, such as a linear alkyl or alkoxy group or substituted benzoyloxy groups. Such compounds exhibit liquid crystallinity. Preferred examples of the discotic liquid crystal compound include those described in JPA No. Hei 8-50206 (1996-50206).

According to the present invention, triphenylene liquid-crystal compounds are especially preferred as a liquid crystal compound. Examples of the triphenylene crystal compound include triphenylene derivatives disclosed in "Mol. Cryst." Vol. 71, P. 111(1981), C. Destrade et al.; and "Mol. Cryst." Vol. 84, P. 193(1982), B. Mourey et al. Especially preferred example of the triphenylene crystal compound include triphenylene derivatives represented by any one of the formulas (1) to (3) disclosed in JPA No. Hei 7-306317 (1995-306317) triphenylene derivatives represented by the formula (I) disclosed in JPA No. Hei 7-309813 (1995-309813) and triphenylene derivatives represented by the formula (I) disclosed in JPA No. 2001-100028.

The Liquid crystal compounds employed in preparing optically anisotropic layers are not required to maintain liquid crystallinity after contained in the optically anisotropic layers. For example, when a low-molecular-weight liquid crystal compound, having a reacting group initiated by light and/or heat, is employed in preparation of an optically anisotropic layer, polymerization or cross-linking reaction of the compound is initiated by light and/or heat, and carried out, to thereby form the layer. The polymerized or cross-linked compounds may no longer exhibit liquid crystallinity. The polymerization of discotic liquid-crystal compounds is described in JP-A No. Hei 8-27184 (1996-27284).

One example of the processes for fixing discotic liquid crystal molecules by polymerization is a process comprising carrying out polymerization of discotic liquid crystal molecules, having a discotic core and one or more polymerizable groups as substituents for the core, after aligning the liquid crystal molecules in hybrid alignment. It is necessary to bond a polymerizable group as a substituent to the disk-shaped core of a discotic liquid-crystal molecule to better fix the discotic liquid-crystal molecules by polymerization. However, when a polymerizable group is directly bonded to the disk-shaped core, it tends to be difficult to maintain alignment during polymerization reaction. Accordingly, the discotic liquid-crystal molecules desirably have a linking group between the disk-shaped core and the polymerizable group. That is, the discotic liquid-crystal compound is desirably selected from the group denoted by Formula (2) below.

D(-L-P)$_n$                                                                      Formula (2)

In the formula, D represents a discotic core, L represents a divalent linking group, p represents a polymerizable group and n is an integer from 2 to 12. Examples of the discotic liquid crystal compound include those described from on line 6 of page 58 to on line 8 of page 65 in WO01/88574A1.

Most preferred examples of the liquid crystal compound include compounds having a linking group between a triphenylene-core and a polymerizable group, among triphenylene derivatives represented by any one of the formulas (1) to (3) disclosed in JPA No. Hei 7-306317 (1995-306317), triphenylene derivatives represented by the formula (I) disclosed in JPA No. Hei 7-309813 (1995-309813) and triphenylene derivatives represented by the formula (I) disclosed in JPA No. 2001-100028.

Plural types of liquid crystal compound may be used in the present invention. For example, it is possible to use at least one polymerizable discotic liquid-crystal compound described above and at least one non-polymerizable discotic liquid-crystal compound in combination. Preferred examples of the non-polymerizable liquid-crystal compound include compounds represented by a formula, which is same as the formula (2) except that the polymerizable group, P in the formula (2), is replaces with a hydrogen atom or an alkyl group. Namely, the non-polymerizable discotic liquid-crystal compound is desirably selected from the compounds represented by a formula (3) shown below.

D(-L-R)$_n$                                                                      Formula (3)

In the formula, D represents a discotic-core, L represents a divalent linking group, R represents a hydrogen atom or an alkyl group and n is an integer from 4 to 12.

[Additives for an Optically Anisotropic Layer]

The composition to be used for producing the optically anisotropic layer may further comprise any additive other than the liquid crystal compound or the fluoride-polymer.

Examples of the additive include anti-cissing (anti-"hajiki") agents, additives for controlling a tilt angle at an alignment-layer interface (a tilt angle of liquid-crystalline molecules at an optically-anisotropic-layer/an alignment-layer interface), polymerization initiators, additives for lowering an alignment temperature (plasticizer) and polymerizable monomers. Next additives will be described respectively in detail.

[Anti-Cissing (Anti-"Hajiki") Agent]

Polymers are usually used as a material for preventing cissing ("hajiki") while coating. Any polymers, which can be mixed with the liquid crystal compound compatibly, can be used unless they change the tilt angle of liquid-crystalline molecules or inhibit alignment of liquid-crystalline molecules substantially. Examples of the polymer, which can be used as an anti-cissing agent, include the polymers disclosed in JPA No. Hei 8-95030 (1996-95030), and especially preferred examples of the polymer include cellulose esters. Examples of the cellulose ester include cellulose acetate, cellulose acetate propionate, hydroxypropyl cellulose and cellulose acetate butyrate. Preventing the anti-cissing agent from inhibiting alignment of liquid-crystalline-molecules, in usual, the amount of the anti-cissing agent is desirably from 0.1 to 10 wt %, more desirably from 0.1 to 8 wt % and much more desirably from 0.1 to 5 wt % with respect to the total weight of a single or plural liquid crystal compounds.

[Agent for Controlling a Tilt Angle at an Alignment Layer Interface]

Any compound having both of a polar group and a non-polar group may be added for controlling a tilt angle at an alignment inter face. Examples of the compound having a polar group include R—OH, R—COOH, R—O—R, R—NH$_2$, R—NH—R, R—SH, R—S—R, R—CO—R, R—COO—R, R—CONH—R, R—CONHCO—R, R—SO$_3$H, R—SO$_3$—R, R—SO$_2$NH—R, R—SO$_2$NHSO$_2$—R, R—C=N—R, HO—P(—OR)$_2$, (HO—)$_2$P—OR, P(—OR)$_3$, HO—PO(—OR)$_2$, (HO—)$_2$PO—OR, PO(—OR)$_3$, R—NO$_2$ and R—CN. Organic salts such as ammoniums, pyridinium salts, carboxylates, sulfonates or phosphates may be also used. Among these, R—OH, R—COOH, R—O—R, R—NH$_2$, R—SO$_3$H, HO—PO(—OR)$_2$, (HO—)$_2$PO—OR, PO(—OR)$_3$ and organic salts are preferred. In the formulae, R represents a non-polar group such as an alkyl group (linear, branched or cyclic un-substituted or substituted, desirably $C_{1-30}$, alkyl group), an alkenyl group (linear, branched or cyclic un-substituted or substituted, desirably $C_{1-30}$, alkenyl group), an alkynyl group (linear, branched or cyclic un-substituted or substituted, desirably $C_{1-30}$, alkynyl group), an aryl group (un-substituted or substituted, desirably $C_{6-30}$, aryl group) and a silyl group (un-substituted or substituted, desirably $C_{3-30}$, silyl group). The non-polar group may have a substituent such as a halogen atom, an alkyl group (whose meaning includes a cycloalkyl group such as a monocyclo or bicyclo alkyl group), an alkenyl group (whose meaning include a cycloalkenyl group such as monocyclo or bicyclo alkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, aryloxycarbonyloxy group, an amino group (whose meaning includes an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group and a silyl group.

When the composition comprising the agent described above is applied to a surface of an alignment layer and liquid-crystalline molecules are aligned in the presence of the agent, the molecules may be aligned with a tilt angle depending on the amount of the agent at an alignment layer interface, and, however, the tilt angle may be also related to a rubbing-density. Compared to an alignment layer rubbed with a higher-density, an alignment layer rubbed with a lower-density allows a tilt angle of liquid-crystalline molecules to vary a larger range when the amount of the agent is fixed. Accordingly, the preferred amount of the agent for controlling a tilt angle at an alignment layer interface may vary depending on the rubbing-density of the alignment layer to be used or the desired tilt angle, and, however, in usual, the amount of the agent is desirably from 0.0001 to 30 wt %, more desirably from 0.001 to 20 wt % and much more desirably from 0.005 to 10 wt % with respect to the total weight of a single or plural liquid crystal compounds. Examples of the agent for controlling a tilt angle at an alignment layer interface include, however not to be limited to, those shown below.

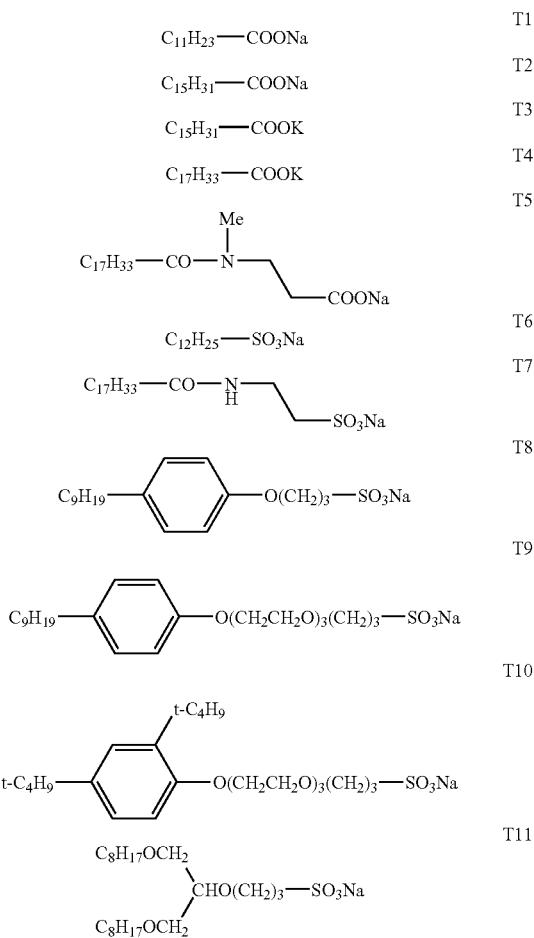

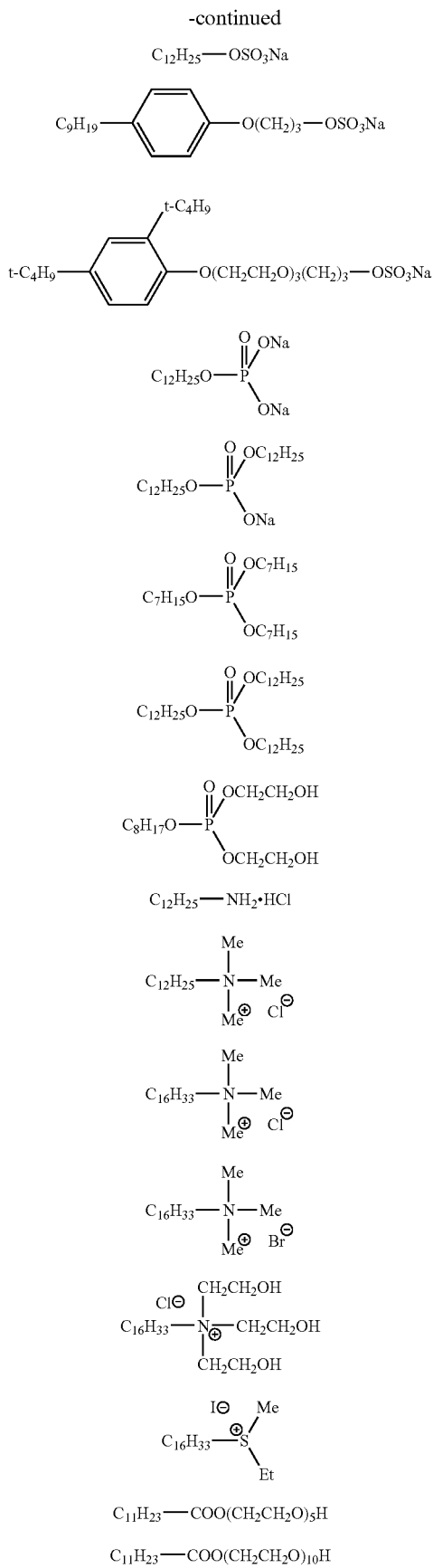
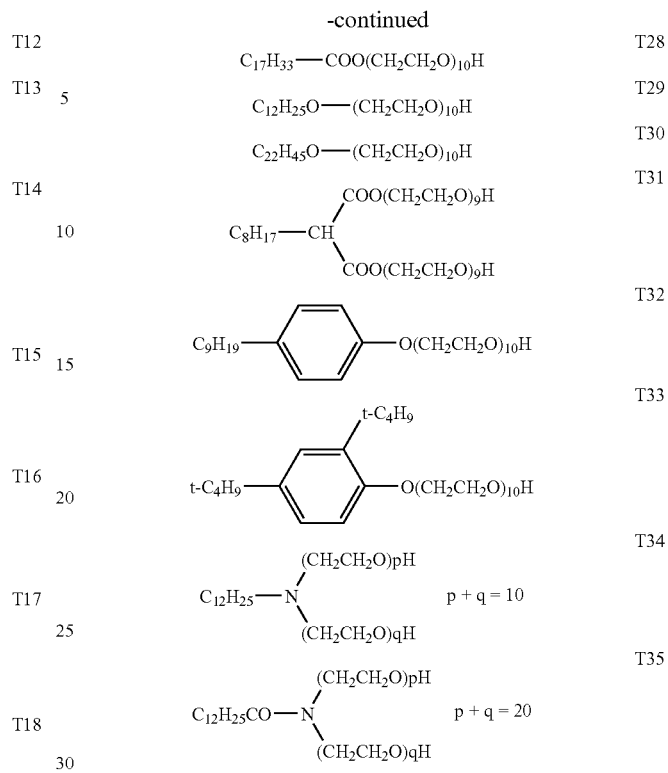

[Polymerization Initiator]

According to the present invention, after being aligned in an alignment state, the liquid crystal molecules are desirably fixed in the state. Fixing is desirably carried out by polymerization. Examples of polymerization reactions which can be used in the present invention include thermal polymerization reactions employing thermal polymerization initiators and photo-polymerization reactions employing photo-polymerization initiators. Photo-polymerization reactions are preferred to avoid a deformation or a degradation of a substrate supporting the optically anisotropic layer. It is possible to refer to descriptions from [0050] to [0051] in JPA No. 2001-91741 with respect to various matters of the polymerization initiator such as examples of the polymerization initiator, a proper amount of the polymerization initiator to be used or proper photo-irradiation energy for polymerization.

[Polymerizable Monomer]

A single or plural types of monomers may be used with the liquid crystal compound. Any polymerizable monomers, which can be mixed with the liquid crystal compound compatibly, can be used unless they contribute to varying a tile angle of liquid-crystalline molecules or inhibiting an alignment of liquid-crystalline molecules substantially. Among them, a compound having a ethylene-base unsaturated group such as a vinyl group, a vinyloxy group, an acryloyl group or a methacryloyl group, may be desirably used. In usual, the amount of the polymerizable monomer is desirably from 1 to 50 wt %, and more desirably from 5 to 30 wt %, with respect to the total weight of a single or plural liquid crystal compounds.

When a polymerizable monomer having not less than two reactive functional groups is used with the liquid crystal compound, the adhesion property of the optically anisotropic layer for a layer, disposed under the optically anisotropic layer, such as an alignment layer, is improved.

[Solvent for Preparing a Coating Liquid]

The composition may be prepared as a coating liquid. The solvent which is used for preparing the coating liquid is desirably selected from organic solvents. Examples of the organic solvent include amides such as N,N-dimethylformamide, sulfoxides such as dimethylsulfoxide, heterocyclic compounds such as pyridine, hydrocarbons such as benzene or hexane, alkyl halides such as chloroform or dichloromethane, esters such as methyl acetate or butyl acetate, ketones such as acetone or methylethyl ketone and ethers such as tetrahydrofuran or 1,2-dimethoxyethane. Among these, alkyl halide or ketones are preferred. plural types of organic solvents may be used in combination.

[Coating Manner]

The coating liquid may be applied by known techniques (e.g., wire bar coating, extrusion coating, direct gravure coating, reverse gravure coating and die coating). The coating liquid desirably contains a liquid crystal compound in an amount from 1 to 50 wt % more desirably from 10 to 50 wt %, and much more desirably from 20 to 40 wt %.

[Properties of the Optically Anisotropic Layer]

According to the present invention, the optically anisotropic layer desirably has a thickness of 0.1 to 20 micrometers, preferably of 0.5 to 15 micrometers, and more preferably of 1 to 10 micrometers.

When the composition for producing the optically anisotropic layer is applied to a surface of the alignment layer, liquid-crystalline molecules may be aligned with a tilt angle at an alignment layer interface and with a tilt angle at an air interface. After being applied to the surface of the alignment layer, liquid-crystalline molecules are aligned uniformly, or in other words in a monodomain alignment state, and thereby they can achieve to a hybrid alignment state, which cannot be described exactly but can be described imaginatively, such that a tilt angle of the molecules (an angle forming between a normal line to a disk surface of the discotic molecule and a normal line to a surface of a substrate having the alignment layer thereon) varies continuously along with a depth of the optically anisotropic layer. The optical film, comprising the optically anisotropic layer produced by aligning the liquid-crystalline molecules in a hybrid alignment state and fixing them in the state, can contribute to improving viewing angles of liquid-crystal displays and to preventing reduction of contrast, tone inversion, black-white inversion or hue alternation occurred depending on variation of a viewing angle.

In the presence of the fluoride-polymer described above, some liquid-crystalline molecules can be aligned with a tilt angle of not less than 50° at an air interface. From the view of achievement of a hybrid alignment capable of giving an optical compensation, it is preferred that the tilt angle of liquid-crystalline molecules at an alignment layer interface is from 3° to 30°. The tilt angle of liquid-crystalline molecules at an alignment layer interface can be controlled by the method described above (the rubbing-density of an alignment layer, the amount of the agent for controlling a tilt angle at an alignment layer or the like). On the other hand, the tilt angle of liquid-crystalline molecules at an air interface can be controlled by the amount of the fluoride-polymer or at least one additive which is optionally added (for example, homogenous-alignment promoter consisting of at least two types of compounds having a group capable of hydrogen bonding respectively). According to the present invention, it is possible to provide an optical film exhibiting an optically anisotropic property, brought about by a hybrid alignment of liquid-crystalline molecules, suitable for a liquid crystal display in which the film is employed.

[Tilt Angle]

The term of "tilt angle" means an angle formed between a long axis of a liquid-crystalline molecule and a normal line of an interface (an alignment layer interface or an air interface) and according to the present invention, the tilt angle at an alignment layer interface is preferably from 3° to 30° and the tilt angle at an air interface is preferably from 40° to 80°. As the tilt angle at an alignment layer interface is smaller, it takes longer time to align liquid-crystalline molecules, especially discotic liquid-crystalline molecules, in a monodomain phase, and, thus, from this point, it is more preferred as the tile angle at an alignment layer interface is lager. On the other hand, when the tilt angle at an alignment layer interface is too large, the optical properties required for an optical compensatory sheet can not be obtained. Accordingly, from the viewpoint of achieving a balance between shortening the time required for forming a monodomain phase and obtaining good optical properties, the tilt angle at an alignment layer interface is desirably from 5° to 50°, more desirably from 10° to 50° and much more desirably from 10° to 30°. And the tilt angle at an air interface is desirably from 40° to 80°, more desirably from 50° to 80° and much more desirably from 50° to 70°. It is possible to set a tilt angle at an alignment layer from a single digit value to a twice digit value by varying a photo-irradiation direction, adding the agent for controlling a tilt angle at an alignment layer interface by an amount or the like. As described above, in all embodiments of the present invention, the optically anisotropic layer doesn't always have an alignment layer interface and an air interface. For example, in an embodiment of the present invention, the optically anisotropic layer may be disposed between the two layers, or in another embodiment, the optically anisotropic layer may be transferred from on a substrate to on another substrate and the tow interfaces may be switched. In such embodiments, it is preferred that the tilt angle at one interface falls within the preferred scope of the tilt angle at an alignment layer interface and the tilt angle at another interface falls within the preferred scope of the tilt angle at an air interface. Especially, in an embodiment comprising the optically anisotropic layer formed of a composition comprising a discotic liquid crystal compound, it is preferred that the tilt angle of the discotic molecules at an alignment layer interface, $\theta 1$, satisfies $10° \leq \theta 1 \leq 30°$.

The tilt angles at the two interfaces of an optically anisotropic layer formed on an alignment layer can be defined respectively as a tilt angle, $\theta 1$, formed between a physical symmetry-axis of a molecule such as a discotic molecule, existing at an interface between the alignment layer and the optically anisotropic layer; and as a tilt angle, $\theta 2$, formed between a physical symmetry-axis of a molecule such as a discotic molecule, existing at an interface between air and the optically anisotropic layer. It is difficult to measure the $\theta 1$ and $\theta 2$ directly and exactly, and, therefore, in the present invention, for ease in working out, the values which are calculated with two assumptions described below are used as the $\theta 1$ and $\theta 2$. Although this method doesn't express an actual alignment state exactly, it is effective as a method which can express relatively some optical properties of the optical film.

Assumption 1:

It is assumed that an optically anisotropic layer is a multilayer structure in which each layer comprises aligned liquid-crystalline molecules such as discotic liquid-crystalline molecules or the like, and that a layer of a minimum unit (it is assumed that the tilt angle of liquid-crystalline molecules in each minimum-unit layer is a uniform value) is optically uniaxial.

Assumption 2:

It is assumed that the tilt angle in each minimum-unit layer varies monotonically as a linear function of a distance in a depth direction.

The practical method is as follows:

(1) Each layer, in which the tilt angle varies monotonically as a linear function of a distance in a depth direction, is irradiated with light entering at various light incident angles to measure retardations at more than three measurement angles. For ease in measurement and calculation, retardations are preferably measured at three measurement angles of −40°, 0° and +40° when the normal line direction of the optically anisotropic layer is set to 0°. Such measurements can be carried out by using KOBRA-21ADH and KOBRA-WR manufactured by Oji Scientific Instruments, Transmissive Elipsometer AEP-100 manufactured by Shimazu Corporation, M150 and M520 measured by JASCO Corporation, ABR10A manufactured by Uniopt Corporation, Ltd., or the like.

(2) In the model described above, a refraction index of the each layer for ordinary light is defined as "$n_o$", a refraction index of the each layer for extraordinary light is defined as "$n_e$", where "$n_e$"s of the minimum unit layers are same each other as well as "$n_o$"s, and a whole thickness of the multilayer structure is defined as "d". And, on the assumption that the tilting direction and an optical axis direction in each layer are identical to each other, fitting is carried out by using a tilt angle at one interface of the optically anisotropic layer, θ1, and a tilt angle at another interface of the optically anisotropic layer, θ2, as a parameter such that the angle-dependence of the calculated retardation values is in reasonable agreement with the measured values, and, as a result, θ1 and θ2 are calculated.

The $n_o$'s and $n_e$'s of various materials are described in published documents and catalogs, and such values can be used in the above method. If the values are unknown, the values may be measured with an abbe refractometer or the like. The thickness of an optically anisotropic layer can be measured with an optical interference film thickness meter, sectional photographs taken by a scanning microscope or the like. It is noted that the measurement wavelength is 632.8 nm.

[Alignment Layer]

For aligning (desirably hybrid-aligning) liquid crystal molecules in the optically anisotropic layer, an alignment layer is desirably used. There have been provided alignment layers formed of various materials by various methods such as subjecting a film made of an organic compound (preferably a polymer) to a rubbing treatment, obliquely depositing an inorganic compound, forming a layer having microgrooves, or accumulating an organic compound (e.g., ω-trichosanic acid, dioctadecylmethylammonium chloride, methyl stearate) by Langmuir-Blodgett method (LB film) Alignment layers having an alignment effect under an electric or magnetic field or irradiation are also known. According to the present invention, any alignment layers, which can contribute aligning liquid-crystalline molecules, may be used, and, however, among them, alignment layers prepared by subjecting a film of a polymer to a rubbing treatment are preferred from the view of controllability of a tilt angle at an alignment layer interface. The rubbing treatment is usually performed by rubbing the surface of the polymer layer in a direction several times with a paper or a cloth. And it is especially preferred that the rubbing treatment is carried out according to the method described in "Handbook of liquid Crystal (Ekisyo Binran)" published by MARUIZEN CO., Ltd.

The thickness of the alignment layer is preferably from 0.01 to 10 micrometers and more preferably from 0.05 to 1 micrometer. Various types of polymers which can be used for producing alignment layers are described in various documents, and various polymers are commercially available. According to the present invention, alignment layers formed of polyvinyl alcohols or derivatives thereof are preferably used. Especially, alignment layers formed of modified polyvinyl alcohols bonding with hydrophobic groups. Regarding various matters of the alignment layer, it is possible to refer to the descriptions from on line 24 of p. 43 to on line 8 of p. 49 in WO01/88574A1.

[Rubbing-Density of an Alignment Layer]

It is possible to vary a rubbing-density of an alignment layer by a method described in "Handbook of liquid Crystal (Ekisyo Binran)" published by MARUIZEN CO., Ltd. A rubbing-density (L) is quantified by a formula (A) below.

$$L = N \cdot 1 \cdot \{1 + (2(pi)rn/60v)\} \qquad \text{Formula (A)}$$

In the formula (A), N is a number of rubbing, l is a contact length of a rubbing-roller, r is a roller-radius, n is revolutions per minute (rpm) and v is moving velocity (per second). The rubbing-density may be increased by increasing the number of rubbing, lengthening the contact length of the rubbing roller, increasing radius of the roller, increasing revolutions per minute of the roller or decreasing moving velocity. On the other hand, the rubbing-density may be decreased by doing the reverse thereof. There is a relationship between a rubbing-density and a tilt angle that the tilt angle is decreased as the rubbing-density is higher, and the tilt angle is increased as the rubbing-density is lower.

It is noted that the alignment state can be kept without the alignment layer after aligning liquid-crystalline molecules in an alignment state and fixing them in the state. Accordingly, the optical film of the present invention can be produced by transferring only the optically anisotropic layer, which is formed on an alignment layer disposed on a temporary substrate, from on the temporary substrate to on a transparent substrate. Namely, the scope of the present invention includes embodiments not comprising an alignment layer.

[Transparent Substrate]

The optical film may comprise a substrate supporting the optically anisotropic layer. The substrate is preferably transparent, and, in particular, preferably has a light transmission of not less than 80%. The substrate is preferably selected from films formed of optically isotropic polymers. Examples of such polymers or preferred embodiments of the substrate are same as those described at [0013] column in JPA No. 2002-22942. The films formed of the polymers, which are commonly known as easy to develop birefringence, such as polycarbonates or polysulfones, may be also used after being modified by the process described in WO00/26705 thereby to reduce the development of birefringence.

Polymer films of cellulose acetates having an acetylation rate from 55.0 to 62.5%, preferably from 57.0 to 62.0%, are desirably employed in the present invention as a transparent substrate. The preferred scope of acetylation rates and the preferred chemical structures of cellulose acetates are same as those described at [0021] column in JPA No. 2002-196146. It is disclosed in Journal of Technical Disclosure (Hatsumei Kyoukai Koukai Gihou) No. 2001-1745, published by Japan Institute of Invention and Innovation, cellulose acylate films produced by using chlorine-free solvents, and the cellulose acetate films can be employed in the present invention.

The preferred scopes of the depth-retardation value and the birefringence value of the cellulose acetate film to be used as a transparent substrate are described at columns from [0018] to [0019] in JPA No. 2002-139621.

In order to control the retardation of a polymer film, especially a cellulose acetate film, aromatic compounds having at least two aromatic rings may be used as an agent for increasing retardation. The preferred scope and the preferred amount of the aromatic compound are same as those describe at columns from [0021] to [0023] in JPA No. 2002-139621. Examples of such an agent for increasing retardation are described in WO01/88574, WO00/2619, JPA No. 2000-111914, JPA No. 2000-275434, JPA No. 2002-363343 or the like.

The cellulose acylate film, produced by a solvent-casting method using a cellulose acylate solution (dope), is preferably used. The dope may further comprise the agent for increasing retardation, and such a dope is preferred. Multi-layered films can be produced by using the cellulose acylate solution (dope). The production of the films can be carried out according to the descriptions at columns from [0038] to [0040] in JPA No. 2002-139621.

Stretching treatment of the cellulose acetate film may be carried out in order to control its retardations. The stretch ratio is desirably from 3 to 100%. The cellulose acetate film is desirably stretched by tenders. For controlling the slow axis of the film to high accuracy, the deference in velocities, departure times and the like between of the left and right tenter clips are desirably as small as possible.

Plasticizes may be added to the cellulose acetate films in order to improve the mechanical properties of the films and the drying speed. Examples of the plasticizer and the preferred scope of the plasticizers are same as those described at [0043] column in JPA No. 2002-139621.

Anti-degradation agents such as antioxidants, decomposers of peroxides, inhibitors of radicals, in-activators of metals, trapping agents of acids or amines, and UV ray protective agents, may be added to the cellulose acetate film. the anti-degradation agents are described at [0044] column in JPA No. 2002-139621. The preferred example of the anti-degradation agent is butylated hydroxy toluene. UV ray protective agents are described in JPA No. Hei 7-11056 (1995-11056).

Surface treatment or measurement of solid-surface energy for the cellulose acylate film can be carried out according to the descriptions at columns from [0051] to [0052] in JPA No. 2002-196146.

The preferred thickness of the cellulose acylate film may vary depending on the application of the film, and, in usually, the thickness of the film is from 5 to 500 micrometers, desirably from 20 to 250 micrometers and more desirably from 30 to 180 micrometers. Especially, for being used in optical applications, the thickness of the cellulose acylate film is preferably from 30 to 110 micrometers.

[Applications of the Optical Film]

The optical film of the present invention may be combined with a polarizing element (a polarizing film) to be used as an elliptical polarizing plate. The elliptical polarizing plate can contribute to improving the viewing angle of a transmissive liquid crystal display. The elliptical polarizing plate and the liquid crystal display comprising the optical film of the present invention will be described in detail.

[Elliptical Polarizing Plate]

The optical film of the present invention is combined with a polarizing film to give an elliptical polarizing plate. It is possible to provide an elliptical polarizing plate, comprising the optical film of the present invention, capable of improving the viewing angle of a liquid crystal display. Iodine-based polarizing films, dye-based polarizing films employing a dichroic dye, or polyene-based polarizing films may be used as a polarizing film. Iodine-based polarizing films and dye-based polarizing films can generally be formed of polyvinyl alcohol-based films. The polarizing axis of the polarizing film corresponds to a direction normal to the stretching direction of the film.

The polarizing film is disposed on the optically anisotropic layer side of the above-described optical compensatory sheet. A transparent protective film is desirably formed on the side opposite to the side of the optical compensatory sheet on which the polarizing film has been disposed. The transparent protective film desirably has optical transmittance of greater than or equal to 80 percent. Generally, a cellulose ester film, preferably a triacetyl cellulose film, is employed as the transparent protective film. The cellulose ester film is desirably formed by the solvent casting method. The transparent protective film is desirably 20 to 500 micrometers, preferably 50 to 200 micrometers, in thickness.

[Liquid-Crystal Display]

The use of an optical film of the present invention makes it possible to provide a liquid-crystal display with a broadened viewing angle. The use of an optical film of the present invention also makes it possible to provide a liquid-crystal display capable of displaying high-quality images without uneven display images. The optical film that can be employed in a TN-mode LCD are described in JPA No. Hei 6-214116 (1994-214116) U.S. Pat. No. 5,583,679 and U.S. Pat. No. 5646703, and German Patent No. 3911620A1. The optical films that can be employed in IPS and FLC-mode LCDs are described in JPA No. Hei 10-54982 (1998-54982). The optical films that can be employed in OCB- and HAN-mode LCDs are described in U.S. Pat. No. 5,805,253 and WO96/37804. The optical films of the present invention that can be employed in a STN-mode LCD are described in JPA No. Hei 9-26572 (1997-26572). The optical compensatory sheets that can be employed in a VA-mode LCD are described in JP Patent No. 2866372.

The optical compensatory sheets for LCDs of various modes may be prepared based on descriptions above. The optical films of the present invention may be combined with liquid-crystal cells driven by various modes such as TN (Twisted Nematic), IPS (In-Plane Switching), FLC (Ferroelectric Liquid Crystal), OCB (Optical compensatory Bend), STN (Supper Twisted Nematic), VA (Vertically Aligned), and HAN (Hybrid Aligned Nematic) modes; and employed in various liquid-crystal displays. The optical film of the present invention is especially effective in TN (Twisted Nematic) mode or in OCB (Optically Compensatory Bend) mode.

EXAMPLES

The present invention will further be detailed referring to specific Examples. It is to be noted that any materials, reagents, ratios of use thereof and operations shown in the Examples below can properly be modified without departing from the spirit of the present invention. Thus the present invention is by no means limited to the Examples described below.

Example No. 1-1

(Production of an Optical Compensatory Film)

A triacetyl cellulose film having a thickness of 100 micrometers and a size of 270 mm×100 mm, "FUJI TAC" manufactured by FUJI FILM, was used as a transparent substrate. A solution of alkyl-modified polyvinylalcohol, "MP-203" manufactured by KURARAY CO., LTD, was applied to the film in 0.5 micrometers, dried and its surface was subjected to rubbing treatment, to form an alignment layer. The coating liquid containing following ingredients was applied to the alignment layer with a bar-coater. A Coating liquid for an optically anisotropic layer

| | |
|---|---|
| Fluoride-polymer (P-1) | 0.2 wt parts |
| Discotic liquid crystal compound (1) | 100 wt parts |

[Chemical structure: triphenylene core with six R substituents, where R = —O—CO—C₆H₄—O—(CH₂)₄—O—CO—CH=CH₂]

R; —O—CO—⌬—O—(CH$_2$)$_4$—O—CO—CH=CH$_2$

| | |
|---|---|
| Ethylene oxide-modified trimethylol propane triacrylate (V#360 made by Osaka Organic Chemicals (Ltd.)) | 9.90 wt parts |
| Polymerization initiator (IRGACURE 907 manufactured by Ciba-Geigy) | 3.30 wt parts |
| Sensitizer (KAYACURE-DETX manufactured by NIPPON KAYAKU CO. ,LTD.) | 1.1 wt parts |
| Methylethyl ketone | 300 wt parts |

The coated layer was heated up to 120 degrees Celsius for 120 seconds, and subsequently cooled down to 80 degrees Celsius for 20 seconds. Subsequently, being irradiated with UV light of 0.4 J/m$^2$ at the same temperature, the alignment was fixed. Thus the optically anisotropic layer, having a thickness of 1.8 micrometers, was produced, and the optical compensatory sheet was obtained.

(Evaluation of Optical Compensatory Sheet)

The unevenness of the obtained optical compensatory sheet was checked with eyes. The tilt angles of liquid-crystalline molecules in the optically anisotropic layer at an alignment layer interface and at an air interface were calculated using an ellipsometer (APE-100 manufactured by SHIMADZU CORPORATION), according to the above described method. The results are shown in Table 1-1. It is noted that the term of "alignment time" in the table means time taken to align discotic liquid-crystalline molecules in a monodomain phase from a start of heating-maturation.

Example Nos. 1-2 to 1-10 and Comparative Example Nos. 1-1 to 1-4

Optical compensatory sheets were produced in the same manner of Example No. 1-1 except that the types and/or the amounts of fluoride-polymers were replaced as shown in Table 1-1. And the unevenness degrees of the obtained sheets were evaluated in the same manner of Example No. 1-1 and the tilt angles thereof were calculated in the same manner of Example No. 1-1. The results were shown in Table 1-1.

TABLE 1-1

| Optical compensatory sheet | Polymer (Amount Wt parts) | Tilt angle A.l.*1 | Tilt angle Air*2 | Alignment Time | Unevenness*3 |
|---|---|---|---|---|---|
| Example No. 1-1 | P-1 (0.2) | 7° | 70° | 60 sec | No |
| Example No. 1-2 | P-11 (0.4) | 12° | 70° | 55 sec | No |
| Example No. 1-3 | P-15 (0.4) | 7° | 77° | 65 sec | No |

TABLE 1-1-continued

| Optical compensatory sheet | Polymer (Amount Wt parts) | Tilt angle A.l.*1 | Tilt angle Air*2 | Alignment Time | Unevenness*3 |
|---|---|---|---|---|---|
| Example No. 1-4 | P-17 (0.4) | 7° | 71° | 60 sec | No |
| Example No. 1-5 | P-22 (0.4) | 3° | 66° | 60 sec | No |
| Example No. 1-6 | P-25 (0.2) | 5° | 69° | 65 sec | No |
| Example No. 1-7 | P-29 (0.2) | 7° | 70° | 65 sec | No |
| Example No. 1-8 | P-35 (0.4) X-68 (0.4) | 8° | 70° | 60 sec | No |
| Example No. 1-9 | P-67 (0.4) X-68 (0.4) | 8° | 58° | 60 sec | No |
| Example No. 1-10 | P-70 (0.2) X-68 (0.4) | 8° | 82° | 60 sec | No |
| Comparative Example No. 1-1 | — | 3° | 48° | 50 sec | Yes |
| Comparative Example No. 1-2 | K-1 (2.75) | 9° | 66° | 180 sec | Yes |
| Comparative Example No. 1-3 | K-2 (2.75) | 3° | 48° | 150 sec | Yes |
| Comparative Example No. 1-4 | K-3 (2.75) | incapable of measurement because of the bad surface state of the layer | | | |

*1 at an alignment layer interface
*2 at an air interface
*3 "No" means that unevenness was not found and "Yes" means that unevenness was found.
The polymer which was employed in the comparative examples are
K-1: cellulose butyrate acetylate
K-2: poly butylmethacrylate (weight-average molecular weight Mw = 31000)
K-3: poly hydroxyethyl methacrylate (weight-average molecular weight Mw = 22000)

The results shown in Table 1-1 reveal that all of the optically anisotropic layers, comprising at least one fluoride-polymer, obtained in Example Nos. 1-1 to 1-10, achieved the hybrid alignments, in which liquid-crystalline molecules were aligned with high tilt angles at the interfaces, without lag in alignment achievement. On the other hand, although the optically anisotropic layer, not comprising a fluoride-polymer, of Comparative Example No. 1-1 could achieve an alignment with a high alignment speed, the tilt angle found at the air interface was too low to achieve a hybrid alignment. The optically anisotropic layers of Comparative Examples Nos. 1-2 to 1-4 were produced using a polymer (K-1, K-1 or K-3) other than fluoride-polymers, and one of them, Comparative Example No. 1-4, couldn't achieve a uniform surface state. And although two of them, Comparative Example Nos. 1-2 and 1-3, could achieve an alignment, the alignment speeds were extremely low. These results suggests that an optically anisotropic layer formed of a composition comprising a liquid crystal compound and a fluoride-polymer, having a fluoro-aliphatic group and a hydrophilic group, can achieve a hybrid alignment in which liquid-crystalline molecules are aligned with a high interface tilt angle, which is sufficient for exhibiting a property as an optical compensatory sheet, without lag in alignment speed. And lattice-like unevenness was found in the optically anisotropic layers, formed of a composition not comprising a fluoride-polymer, of Comparative Example Nos. 1-1 to 1-3.

Next, examples of the liquid crystal display of the present invention will be demonstrated below.

Example No. 1-11

(Production of a Transparent Substrate)

The following ingredients were poured in a mixing tank and stirred under heating to prepare a cellulose acetate solution (dope).

Formulation of Cellulose Acetate Solution

| | |
|---|---|
| Cellulose acetate With a 60.9 percent degree of acetation | 100 wt parts |
| Triphenyl phosphate | 6.5 wt parts |
| Biphenyldiphenyl phosphate | 5.2 wt parts |
| Retardation enhancer (1) described below | 0.1 wt parts |
| Retardation enhancer (2) described below | 0.2 wt parts |
| Methylene chloride | 310.25 wt parts |
| Methanol | 54.75 wt parts |
| 1-Butanol | 10.95 wt parts |

Radiation enhancer (1)

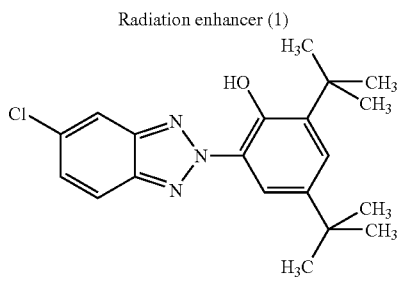

-continued

Radiation enhancer (2)

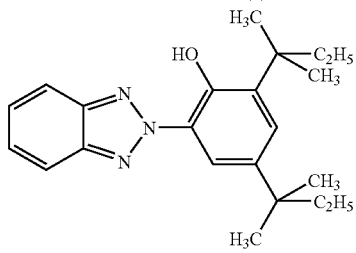

The obtained dope was made to flow out of a nozzle onto a drum cooled to 0 degrees Celsius. It was peeled off while having a solvent content of 70 weight percent, the two edges of the film in the transverse direction were fixed with a pin tenter, and in the area where the solvent content was from 3 to 5 weight percent, the film was dried while maintaining a spacing yielding a stretching rate of 3 percent in the traverse direction (direction perpendicular to the machine direction). Subsequently, the film was further dried by passing it between the rolls of a heat treatment device and adjusted to achieve a ratio between the stretching rate in the transverse direction and the stretching rate in the machine direction of 0.75 with an essentially 0 percent stretching rate in the machine direction in the area in which the glass transition temperature exceeded 120 degrees Celsius (taking into account 4 percent stretching in the machine direction during separation). This yielded a cellulose acetate film 100 micrometers thick. Measurement of the retardation of the film thus prepared at a wavelength of 632.8 nm revealed a thickness retardation of 40 nm and an in-plane retardation of 4 nm. The cellulose acetate film thus prepared was employed as transparent substrate.

(Preparation of a First Undercoating Layer)

A coating liquid of the composition indicated below was applied in 28 ml/m² to the transparent substrate and dried to form a first undercoating layer.

Formulation of First Undercoating Layer Coating Liquid

| | |
|---|---|
| Gelatin | 5.42 wt parts |
| Formaldehyde | 1.36 wt parts |
| Salicylic acid | 1.60 wt parts |
| Acetone | 391 wt parts |
| Methanol | 158 wt parts |
| Methylene chloride | 406 wt parts |
| Water | 12 wt parts |

(Preparation of a Second Undercoating Layer)

A coating liquid of the composition indicated below was applied in 7 ml/m² to the first undercoating layer and dried to form a second undercoating layer.

Formulation of Second Undercoating Layer Coating Liquid

| | |
|---|---|
| Anionic polymer described below | 0.79 wt part |
| Citric acid monoethyl ester | 10.1 wt parts |
| Acetone | 200 wt parts |
| Methanol | 877 wt parts |
| Water | 40.5 wt parts |

-continued

Anionic polymer

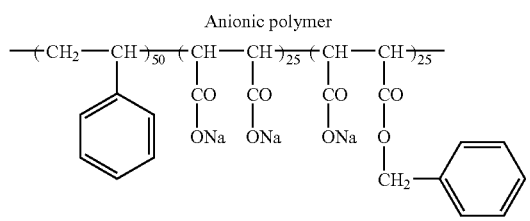

(Preparation of a Back Layer)

A coating liquid of the composition indicated below was applied in 25 ml/m² to the opposite surface of the transparent substrate and dried to form a back layer.

Formulation of back layer coating liquid

| Cellulose diacetate with 55 percent degree of acetation | 6.56 wt parts |
| Silica-based matting agent (average particle size: 1 micrometer) | 0.65 wt parts |
| Acetone | 679 wt parts |
| Methanol | 104 wt parts |
| Methanol | 104 wt parts |

(Preparation of an Alignment Layer)

An aqueous solution of alkyl-modified polyvinyl alcohol "MP-203" manufactured by KURARAY CO., LTD., which was as same as that used in Example No. 1-1, was applied to the second undercoating layer and dried for 90 sec with 60 degrees Celsius hot air, and then a rubbing treatment was applied to form an alignment layer. The thickness of the alignment layer was 0.5 micrometers. The rubbing direction of the alignment layer was parallel to the flow direction of the transparent substrate.

(Preparation of an Optically Anisotropic Layer)

The coating liquid used for preparation of the optically anisotropic layer of Example No. 1-1 was applied with a #4 wire bar to the alignment layer to form a layer having a thickness of 1.74 micrometers. The layer was heated up to 120 degrees Celsius for about 20 sec in a thermostatic chamber of 130 degrees Celsius, and, after the temperature being kept for 120 sec, cooled down to 80 degrees Celsius for 20 sec. After that, the layer was irradiated with UV light of 0.4 J/cm² while the temperature being kept, to fix the alignment of liquid crystal molecules, and, thus, an optically anisotropic layer was obtained. Being cooled to room temperature, an optical compensatory sheet comprising the optically anisotropic layer was obtained.

(Production of Liquid-Crystal Display)

A polyimide alignment layer was provided on a glass substrate equipped with transparent ITO electrodes and treated by rubbing. Five micrometer spacers were positioned and two such sheets of substrate were positioned with their alignment layers facing. The two substrates were positioned so that the rubbing directions of their alignment layers were perpendicular. Rod-shaped liquid-crystal molecules (ZL4792 made by Merck Co.) were poured into the gap between the substrates to form a rod-shaped liquid-crystal layer. The Δn of the rod-shaped liquid-crystal molecules was 0.0969. Two optical compensatory sheets prepared as set forth above were bonded to either side of the TN liquid-crystal cell prepared as set forth above so that the optically anisotropic surfaces faced the substrates of the liquid-crystal cell. Two polarizing plates were then bonded to the outside thereof to prepare a liquid crystal display. The arrangement was such that the rubbing direction of the alignment layer of the optical compensatory sheet was anti-parallel to the rubbing direction of the alignment layer of the liquid-crystal cell adjacent thereto. Further, the arrangement was such that the absorption axis of the polarizing plate was parallel to the rubbing direction of the liquid-crystal cell. A voltage was applied to the liquid-crystal cell of the liquid-crystal display, the transmittance of a 2 V white display and a 5 V black display was adopted as the contrast ratio, a contrast ratio of 10 was measured vertically and horizontally, and the area without gradation reversal was measured as a viewing angle. The results are given in Table 1-2.

(Evaluation of Unevenness on a Panel of Liquid Crystal Display)

All area of the displaying panel of LCD, Example No. 1-11, was set to a gray-level, and unevenness on the panel was checked.

Example Nos. 1-12 to 1-18 and Comparative Example No. 1-5

Some liquid crystal displays were produced in the same manner as the Example No. 1-11, except that the types and/or the amount of fluoride-polymer were replaced with those shown in Table 1-2. And the obtained liquid crystal displays were evaluated in the same manner as Example No. 1-11. The results were shown in Table 1-12.

TABLE 1-2

| Liquid crystal display | Polymer (wt parts) | Viewing angle | | Unevenness*1 |
| --- | --- | --- | --- | --- |
| | | vertically | Horizontally | |
| Example 1-11 | P-1 (0.2) | 110° | 160° | No |
| Example 1-12 | P-11 (0.4) | 110° | 158° | No |
| Example 1-13 | P-15 (0.4) | 110° | 160° | No |
| Example 1-14 | P-17 (0.4) | 110° | 160° | No |
| Example 1-15 | P-22 (0.4) | 110° | 155° | No |
| Example 1-16 | P-25 (0.2) | 110° | 160° | No |
| Example 1-17 | P-29 (0.2) | 110° | 160° | No |
| Example 1-18 | P-70 (0.4) X-68 (0.4) | 110° | 168° | No |
| Comparative Example 1-5 | — | 91° | 148° | Yes |

*1 "No" means that unevenness was not found and "Yes" means that unevenness was found.

The result, shown in Table 1-2, of Example Nos. 1-11 to 1-18 and Comparative Example No. 1-5 suggests that an optical compensatory sheet comprising an optically anisotropic layer formed of a composition comprising a liquid crystal compound and a fluoride-polymer, having a fluoro-aliphatic group and a hydrophilic group, can contribute to improving viewing angle of a liquid crystal display remarkably. It is suggested that the tilt angles of liquid-crystalline molecules were increased in the optically anisotropic layers employed in the optical compensatory sheets of Example Nos. 1-11 to 1-18. And lattice-like unevenness was found in the optically anisotropic layers, formed of a composition not comprising a fluoride-polymer, of Comparative Example No. 1-5.

(Synthesis of Fluoride-polymer Q-1)

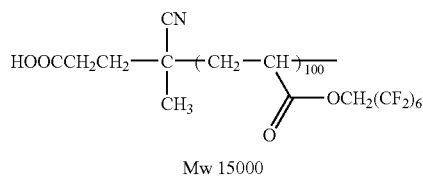

Mw 15000

1H,1H,7H-dodecafluoroheptyl acrylate (39.93 g), 4,4'-azobis(4-cyano veleric acid) "V-501" manufactured by Wako Pure Chemical Industries, Ltd. (1.1 g) and methanol (30 g) were put in a reactor equipped with a stirrer and a reflux condenser, heated up to 78° C. under a nitrogen gas atmosphere for six hours, and, then, the reaction was terminated. The obtained polymer had a weight-average molecular weight of $1.5 \times 10^4$.

Fluoride-polymers Q-11 and Q-13 were synthesized in the similar manner to Polymer Q-1. And Polymer R-1 shown below was used for a comparative example.

Polymer R-1

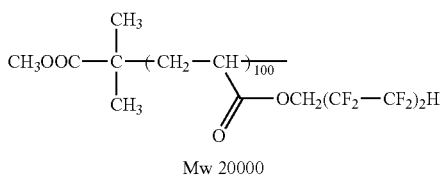

Mw 20000

Example 2-1

(Production of Polymer Substrate)

The following ingredients were poured in a mixing tank and stirred under heating up to 30° C. to prepare a cellulose acetate solution.

| Formulation of cellulose acetate solution | Inner layer wt parts | Outer layer Wt parts |
| --- | --- | --- |
| Cellulose acetate With a 60.9 percent degree of acetation | 100 | 100 |
| Triphenyl phosphate (plasticizer) | 7.8 | 7.8 |
| Biphenyldiphenyl phosphate | 3.9 | 3.9 |

-continued

| Formulation of cellulose acetate solution | Inner layer wt parts | Outer layer Wt parts |
| --- | --- | --- |
| (plasticizer) | | |
| Methylene chloride (first solvent) | 293 | 314 |
| Methanol (second solvent) | 71 | 76 |
| 1-butanol (third solvent) | 1.5 | 1.6 |
| Silica fine particles ("AEROSIL R972" manufactured by JAPAN AEROSIL CO. LTD.) | 0 | 0.8 |

Retardation enhancer

The obtained dope for an inner layer and the dope for an outer layer were was made to flow out of a nozzle onto a drum, cooled to 0 degrees Celsius, by using a co-casting die for three layers. It was peeled off while having a residual solvent content of 70 wt %, was conveyed at a draw ration of 110% in the conveying direction with being fixed the two edges of the film with a pin tenter while being dried at 80° C. until the residual solvent content was reduced by 10%, and, then, was dried at 110° C. After being dried at 140° C. fro 30 min., a cellulose acetate film having a residual solvent content of 0.3 wt %, consisting of an outer layer of 3 micrometers, an inner layer of 74 micrometers and an outer layer of 3 micrometers, was obtained. The film is referred to as "PK-1" herein after. Optical properties of PK-1 were measured.

The width of PK-1 was 1340 mm and the thickness of the polymer substrate PK-1 was 80 micrometers. Measured by using an elipsometer "M-150" manufactured by JASCO Corporation), retardation (Re value) of PK-1 was 6 nm at a wavelength of 500 nm and retardation (Rth value) of PK-1 was 90 nm at a wavelength of 500 nm.

The obtained polymer substrate PK-1 was soaked in 2.0 N solution of potassium hydroxide at 25° C. for 2 min., neutralized with sulfuric acid, washed with pure water and then dried. Surface energy of PK-1 was determined according to a contact angle method to be 63 mN/m.

A coating liquid for an alignment layer, having a formulation shown below, was applied to PK-1 with a #16 wire-bar coater at a coating amount of 28 ml/m², and dried at 60° C. for 60 sec. and subsequently at 90° C. for 150 sec. to form a polyvinyl alcohol layer.

(Formulation of a Coating Liquid for an Alignment Layer)

| | |
|---|---|
| Modified polyvinyl alcohol shown below | 10 wt parts |
| Water | 371 wt parts |
| Methanol | 119 wt parts |
| Glutaraldehyde (crosslinking agent) | 0.5 wt parts |

Modified polyvinyl alcohol

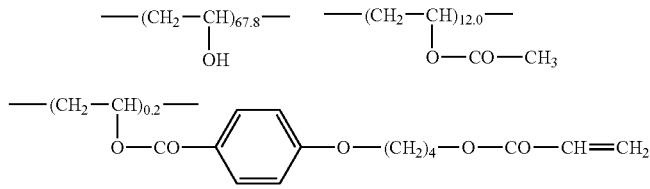

The surface of the polyvinyl alcohol layer was subjected to a rubbing treatment to form an alignment layer. The rubbing-treatment was carried out a direction parallel to the late axis (measured at a wavelength of 632.8 nm) of the polymer substrate PK-1.

(Preparation of an Optically Anisotropic Layer)

Ingredients shown below were dissolved in 102 Kg of methylethyl ketone to give a coating liquid.

| | |
|---|---|
| Discotic liquid crystal compound (1): | 41.01 wt parts |

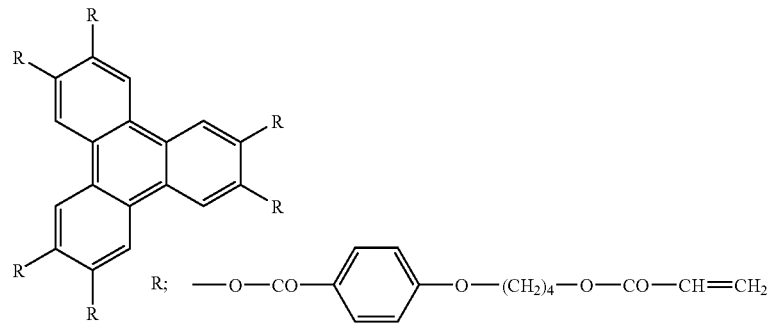

| | |
|---|---|
| Ethylene oxide-modified trimethyloipropane triacrylate (V#360 manufactured by OSAKA ORGANIC CHEMICAL INDUSTRY LTD.) | 4.06 wt parts |
| Fluoride-polymer Q-1 | 0.02 wt parts |
| Photo-polymerization initiator ("IRGACURE 907" manufactured by Chiba-Geigy) | 1.35 wt parts |
| Sensitizer (KAYACURE-DETX manufactured by NIPPON KAYAKU CO., LTD.) | 0.45 wt parts |

The prepared coating liquid was applied with a #3.4 wire bar to the alignment layer. The coated layer was heated in a thermostatic chamber of 120 degrees Celsius for 2 min. to align discotic molecules in a hybrid-alignment. After that, being irradiated with UV light of 120 w/cm high-pressure mercury lamp for 1 minute thereby to polymerize discotic molecules and fix the alignment. Being cooled to room temperature, an optically anisotropic layer was produced and then an optical film, KH-1, comprising the optically anisotropic layer was obtained. Retardation, Re value, of the optically anisotropic layer was 50 nm at a wavelength of 546 nm.

(Surface State Evaluation of the Optical Film)

The optical film was disposed between two polarizing plates disposed in Cross Nicol arrangement, and unevenness ("mura") and cissing ("hajiki") of the film were observed in a direction parallel to a normal line or declining by 60° regarding a normal line. The results were shown in Table 2-1.

It is noted that with respect to optical films of Example Nos. 2-2 and 2-3 and Comparative Example Nos. 2-1 and 2-2, described later, nevenness ("mura") and cissing ("hajiki") were evaluated in the same manner.

(Tilt-Angle Evaluation of Liquid-Crystalline Molecules)

The tilt angles of liquid-crystalline molecules located adjacent to an alignment layer interface and to an air interface in the optically anisotropic layer were calculated using an ellipsometer (APE-100 manufactured by SHIMADZU CORPORATION), according to the above described method. The results are shown in Table 2-1.

It is noted that with respect to optical films of Example Nos. 2-2 and 2-3 and Comparative Example Nos. 2-1 and 2-2, described later, tilt angles were calculated in the same manner.

(Production of a Polarizing Plate)

The optical film "KH-1" was attached to a surface of a polarizing film "HF-1" with a polyvinyl-alcohol base adhesive. And a cellulose triacetylate film, "TD-80U" manufactured by Fuji Photo Film Co. Ltd., was subjected to a saponification treatment, and the film was attached to an opposite surface of the polarizing film HF-1 with a polyvinyl-alcohol base adhesive. The optical film KH-1 was disposed such that the late axis of the polymer substrate PK-1, supporting the optically anisotropic layer, was parallel to the transmission axis of the polarizing film HF-1. The cellulose triacethylate film was disposed such that the late axis thereof was perpendicular to the transmission axis of the polarizing film. Thus, a polarizing plate, "HB-1", was obtained.

(Evaluation when being Used in a TN-Mode Liquid Crystal Cell)

The pair of polarizing plates were removed from a liquid crystal display employing a TN-mode liquid crystal cell, "AQUOS LC20C1S" manufacture by SHARP CORPORATION, and the obtained two polarizing plates, HB-1, were attached with a polyvinyl alcohol adhesive at observer side and backlight side respectively such that the optical film KH-1 was disposed at the liquid crystal cell side. The transmission axis of the polarizing plate disposed at observer side and the transmission axis of the polarizing plate disposed at backlight side were arranged in an O-mode.

Displaying various contrast images from black (L1) to white (L8) on the obtained liquid crystal display, viewing angles were measured by using "EZ-Contrast160D" manufactured by ELDIM. The vertical and horizontal areas giving a contrast ratio of a white-transmission to a black-transmission of more than 10 without any gradation reversal at a black side, or in other words L1-L2 reversal, were measured respectively as a viewing angle. The results were shown in Table 2-1.

It is noted that with respect to optical films of Example Nos. 2-2 and 2-3 and Comparative Example Nos. 2-1 and 2-2, described later, viewing angles were evaluated in the same manner.

Example Nos. 2-2 and 2-3 and Comparative Example Nos. 2-1 and 2-2

Some optical films were produced in the same manner as Example No. 2-1 except that the types of fluoride-polymer were replaced with those shown in Table 2-1. And the obtained optical films were evaluated on surface conditions, tilt angles and viewing angles in the same manner as Example No. 2-1. The results were shown in Table 2-1.

TABLE 2-1

| Optical compensatory sheet | Fluoride-polymer Type | wt. parts | Surface condition Unevenness ("mura") | Cissing ("hajiki") | Tilt angle[°] Al*1 | Air*2 | Viewing angle[°] V*3 | H*4 |
|---|---|---|---|---|---|---|---|---|
| Example 2-1 | Q-1 | 0.08 | ○ | ○ | 12 | 77 | 160 | 160 |
| Example 2-2 | Q-11 | 0.08 | ○ | ○ | 12 | 78 | 160 | 160 |
| Example 2-3 | Q-13 | 0.08 | ○ | ○ | 12 | 77 | 160 | 160 |
| Comparative Example 2-1 | — | — | x | ○ | 12 | 58 | 120 | 150 |
| Comparative Example 2-2 | R-1 | 0.08 | ○ | ○ | 12 | 58 | 120 | 150 |

*1at an alignment layer interface
*2at an air interface
*3vertical
*4horizontal

The results shown in Table 2-1 suggest that the fluoride-polymer can contribute to improving a surface condition and a tilt angle of an optically anisotropic layer even if the fluoride-polymer is added in a small amount, and a liquid crystal display comprising the optically anisotropic layer gives a wider viewing angle.

Example No. 2-3

Some polymer substrates were produced in the same manner as Example No. 2-1 except that the amounts of the retardation enhancer were changed to set the Rth values of the polymer substrates to 80, 85, 100, 110 and 120 nm respectively. And some optical films comprising the polymer substrates respectively were produced in the same manner as Example No. 2-1, and, then, some polarizing plates comprising the optical films respectively were also produced in the same manner as Example No. 2-1. It was confirmed that the vertical viewing angle and the horizontal viewing angle, given by the liquid crystal display employing the polarizing plate comprising the polymer substrate exhibiting a Rth of 80, 85, 100, 110 or 120 nm were nearly equal to those given by Example 2-1.

Example No. 2-4

An optical film, a polarizing plate comprising the film were produced in the same manner as Example No. 2-1, except that a polymer substrate having a Rth of 90 nm was produced by using a retardation enhancer shown below in the place of the retardation enhancer used in Example No.

2-1 and by setting the amount of the retardation enhancer added to the inner layer to 1.2 wt parts. It was confirmed that the vertical viewing angle and the horizontal viewing angle, given by the liquid crystal display employing the polarizing plate were nearly equal to those given by Example 2-1.

Retardation enhancer

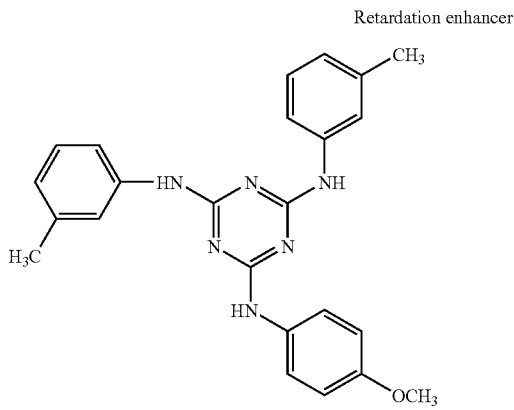

Example No. 2-5

Some polymer substrates were produced in the same manner as Example No. 2-4 except that the amounts of the retardation enhancer were changed to set the Rth values of the polymer substrates to 80, 85, 100, 110 and 120 nm respectively. And some optical films comprising the polymer substrates respectively were produced in the same manner as Example No. 2-4, and, then, some polarizing plates comprising the optical films respectively were also produced in the same manner as Example No. 2-4. It was confirmed that the vertical viewing angle and the horizontal viewing angle, given by the liquid crystal display employing the polarizing plate comprising the polymer substrate exhibiting a Rth of 80, 85, 100, 110 or 120 nm were nearly equal to those given by Example 2-1.

INDUSTRIAL APPLICABILITY

According to the present invention, an optically anisotropic layer is produced using a liquid-crystal composition comprising a fluoride-polymer. Using the composition, the time required for liquid-crystalline molecules to be aligned in a monodomain phase can be shortened, and, thus, an optically anisotropic layer and also an optical film can be produced with a high efficiency. The optical film of the present invention can contribute to improving a viewing angle of a liquid crystal display employing thereof. According to the present invention, it is also possible to display high-quality images without unevenness ("mura") in display by using a liquid crystal compound and a fluoride-polymer in combination.

Furthermore, the fluoride-polymer can contribute to lowering cissing ("hajiki") or unevenness ("mura") when the polymer is added to a composition and the composition is applied to a surface of a substrate or the like. Therefore, the optical film or the polarizing plate of the present invention, comprising the optically anisotropic layer formed of the composition, is capable of compensating a liquid-crystal cell optically without contributing to lowering the image-quality even if they are employed in a large-scale liquid-crystal display. Therefore, a liquid crystal display employing the optical film or the polarizing plate of the present invention can display good-quality images.

Japanese Patent Application Nos. 2004-188333 and 2004-270127 are incorporated herein by reference.

What is claimed is:
1. A composition comprising
at least one polymer having at least one fluoro-aliphatic group and at least one hydrophilic group selected from the group consisting of a carboxyl group (—COOH), a sulfo group (—SO$_3$H), a phosphonoxy group {—OP(=O)(OH)$_2$} and salts thereof in side chain and
at least one liquid crystal compound,
wherein the polymer comprises at least one repeating unit derived from a monomer having at least one fluoro-aliphatic group, represented by a formula (A1):

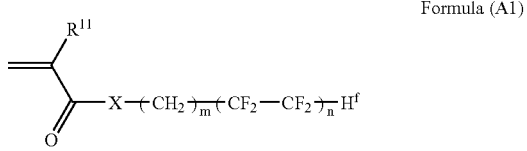

Formula (A1)

wherein R$^{11}$ represents a hydrogen atom or a methyl group; X represents an oxygen atom, a sulfur atom or —N(R$^{12}$)— where R$^{12}$ represents a hydrogen atom or a C$_{1-4}$ alkyl group; H$^f$ represents a hydrogen atom or a fluorine atom; m is an integer from 1 to 6 and n is an integer from 2 to 4.

2. The composition of claim 1, wherein the polymer is a copolymer comprising a repeating unit derived from a monomer having at least one fluoro-aliphatic group and a repeating unit represented by a formula (1):

Formula (1)

wherein R$^1$, R$^2$ and R$^3$ respectively represent a hydrogen atom or a substituent; L represents a divalent linking group selected from the Linking Group shown below or a divalent linking group consisting of two or more groups selected from the Linking Group shown below;
(Linking Group)
a single bond, —O—, —CO—, —NR$^4$— where R$^4$ represents a hydrogen atom, an alkyl group, an aryl group or an aralkyl group, —S—, —SO$_2$—, —P(=O)(OR$^5$)— where R$^5$ represents an alkyl group, an aryl group or an aralkyl group, an alkylene group and arylene group;
Q represents a carboxyl group (—COOH) or a salt thereof, a sulfo group (—SO$_3$H) or a salt thereof or a phosphonoxy group {—OP(=O)(OH)$_2$} or a salt thereof.

3. The composition of claim 1, wherein the liquid crystal compound is a discotic compound.

4. The composition of claim 3, wherein the discotic compound is triphenylene liquid crystal.

5. The composition of claim 1, wherein the polymer comprises a repeating unit derived from a monomer having a fluoro-aliphatic group in an amount of 40 wt % or more.

6. The composition of claim 1, wherein the weight-average molecular weight of the polymer is 100,000 or less.

7. The composition of claim 1, further comprising a second polymer comprising a repeating unit derived from a monomer having a fluoro-aliphatic group represented by a formula (A):

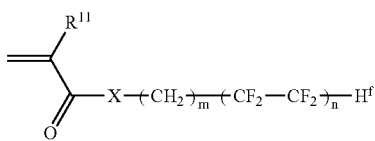

Formula (A)

wherein $R^{11}$ represents a hydrogen atom or a methyl group; X represents an oxygen atom, a sulfur atom or —N($R^{12}$)— where $R^{12}$ represents a hydrogen atom or a $C_{1-4}$ alkyl group; $H^f$ represents a hydrogen atom or a fluorine atom; m is an integer from 1 to 6 and n is an integer from 2 to 4.

8. The composition of claim 7, wherein the second polymer further comprises a repeating unit derived from a monomer represented by a formula (B):

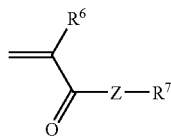

Formula (B)

wherein $R^6$ represents a hydrogen atom or a methyl group; Z represents a divalent group; $R^7$ represents an optionally substituted poly (alkyleneoxy) group or an optionally substituted linear, branched or cyclic $C_{1-20}$ alkyl group.

9. An optical film comprising an optically anisotropic layer formed of a composition of claim 1.

10. The optical film of claim 9, wherein the composition comprises a discotic compound as a liquid crystal compound, and a tilt angle θ1 of molecules of the discotic compound at an interface satisfies 0°≦θ1≦30° and a tilt angle θ2 of molecules of the discotic compound at another interface satisfies 50°≦θ2.

11. A liquid crystal display comprising at least one optical film of claim 9.

12. An optical film comprising
an optically anisotropic layer formed of a composition comprising at least one liquid crystal compound and at least one polymer having a fluoro-aliphatic group and a hydrophilic group selected from the group consisting of a carboxyl group (—COOH), a sulfo group (—SO₃H), a phosphono group {—PO(OH)₂} and salts thereof; and
a substrate supporting the layer, wherein the polymer comprises at least one repeating unit derived from a monomer having at least one fluoro-aliphatic group, represented by a formula (A1):

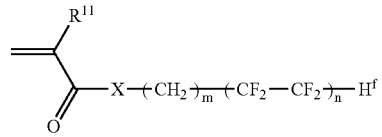

Formula (A1)

wherein $R^{11}$ represents a hydrogen atom or a methyl group; X represents an oxygen atom, a sulfur atom or —N($R^{12}$)— where $R^{12}$ represents a hydrogen atom or a $C_{1-4}$ alkyl group; $H^f$ represents a hydrogen atom or a fluorine atom; m is an integer from 1 to 6 and n is an integer from 2 to 4.

13. The optical film of claim 12, wherein the polymer has the hydrophilic group at the end of main chain.

14. The optical film of claim 12, wherein the polymer was produced by polymerization initiated by a polymerization initiator having at least one hydrophilic group selected from the group consisting of a carboxyl group (—COOH), a sulfo group (—SO₃H), a phosphono group {—PO(OH)₂} and salts thereof.

15. The optical film of claim 12, wherein the polymer further comprises at least one repeating unit derived from a monomer represented by a Formula (B 1);

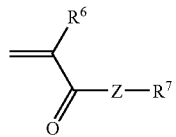

Formula (B1)

wherein $R^6$ represents a hydrogen atom or a methyl group; Z represents a divalent linking group, $R^7$ represents an optionally substituted poly (alkyleneoxy) group or an optionally substituted linear, branched or cyclic $C_{1-20}$ alkyl group.

16. The optical film of claim 12, wherein the liquid crystal compound is a discotic liquid crystal compound.

17. A polarizing plate comprising a polarizing film and an optical film of claim 12.

18. A polarizing plate comprising a polarizing film and an optical film of claim 9.

19. A liquid crystal display comprising an optical film of claim 12.

* * * * *